United States Patent [19]

Armstrong et al.

[11] Patent Number: 4,805,095
[45] Date of Patent: Feb. 14, 1989

[54] CIRCUIT AND A METHOD FOR THE SELECTION OF ORIGINAL DATA FROM A REGISTER LOG CONTAINING ORIGINAL AND MODIFIED DATA

[75] Inventors: Rolf D. Armstrong, Escondido; Jon M. Corcoran, Romona; Victor F. Cole, Santee, all of Calif.

[73] Assignee: NCR Corporation, Dayton, Ohio

[21] Appl. No.: 812,882

[22] Filed: Dec. 23, 1985

[51] Int. Cl.[4] .............................................. G06F 11/00
[52] U.S. Cl. .................................................. 364/200
[58] Field of Search ... 364/200 MS File, 900 MS File; 371/37, 38, 12

[56] References Cited

U.S. PATENT DOCUMENTS

| 3,940,736 | 2/1976 | Inaba et al. ................... 340/146.1 A |
| 4,044,337 | 8/1977 | Hicks et al. ............................. 364/200 |
| 4,493,035 | 1/1985 | MacGregor et al. .............. 364/200 |
| 4,654,819 | 3/1987 | Stiffles et al. ....................... 364/900 |
| 4,672,612 | 6/1987 | Shishikura et al. ................. 371/37 |

Primary Examiner—Raulfe B. Zache
Assistant Examiner—Ayni Mohamed
Attorney, Agent, or Firm—Wilbert Hawk, Jr.; Edward Dugas; Jack R. Penrod

[57] ABSTRACT

A circuit for maintaining copies of original index registers and copies of modified index registers such that in the event original copies of the index registers are needed, they may be restored. The circuit is for use in a fault tolerant system wherein in the event of a rollback, original copies of the index registers may be restored to a processor, even if some of the index registers were modified in the previous execution of a command by the processor.

9 Claims, 57 Drawing Sheets

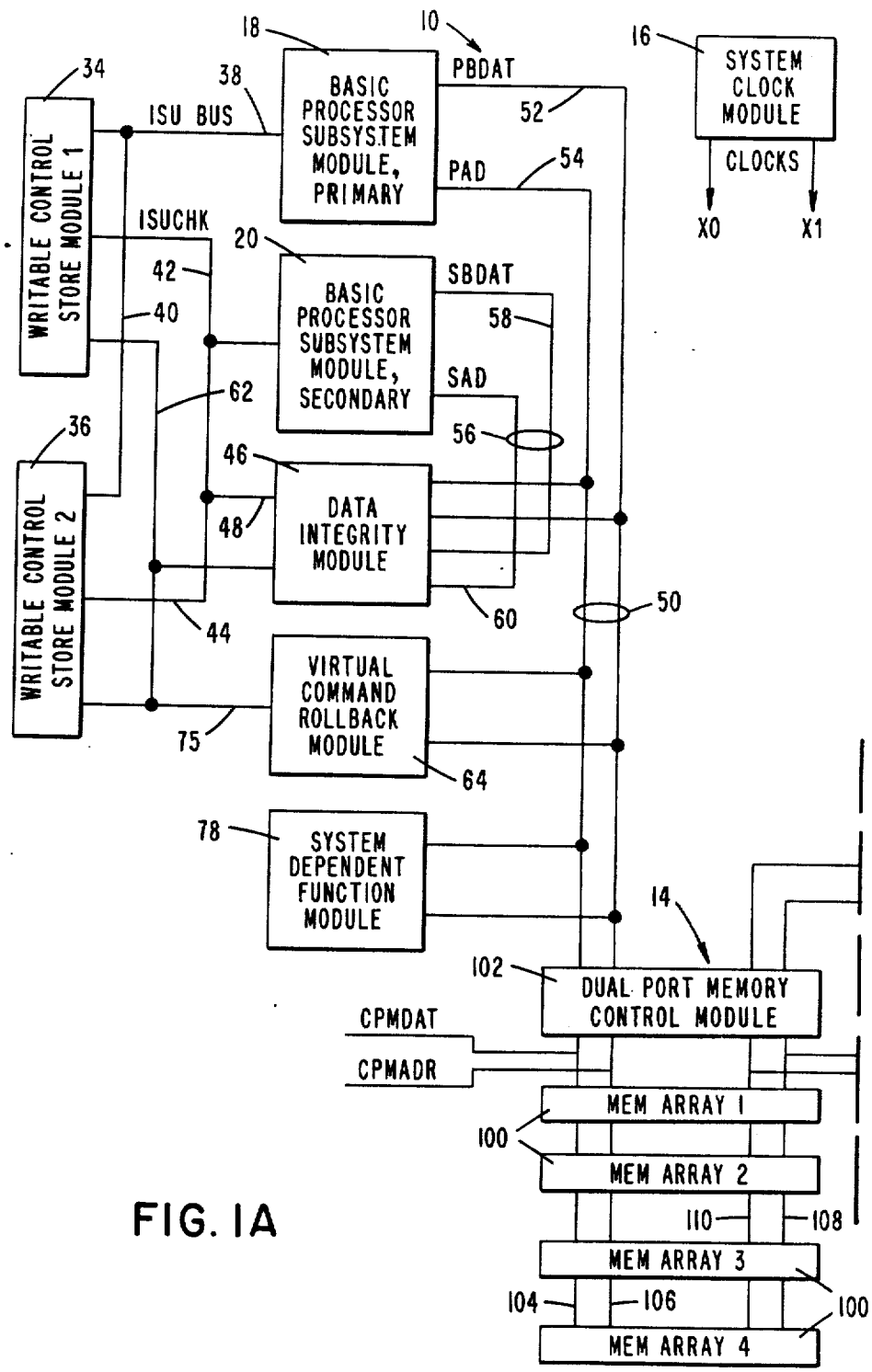
FIG. IA

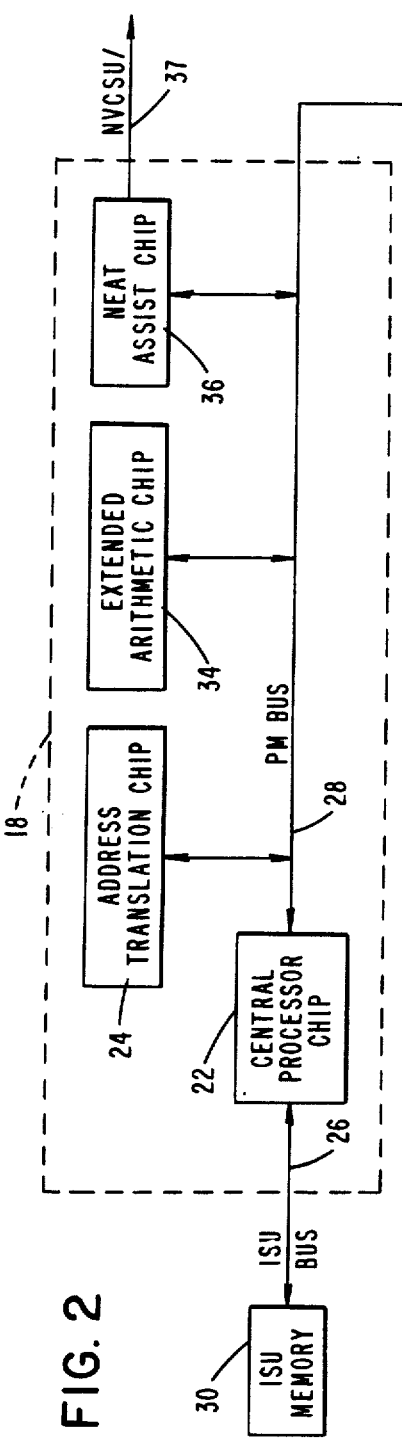

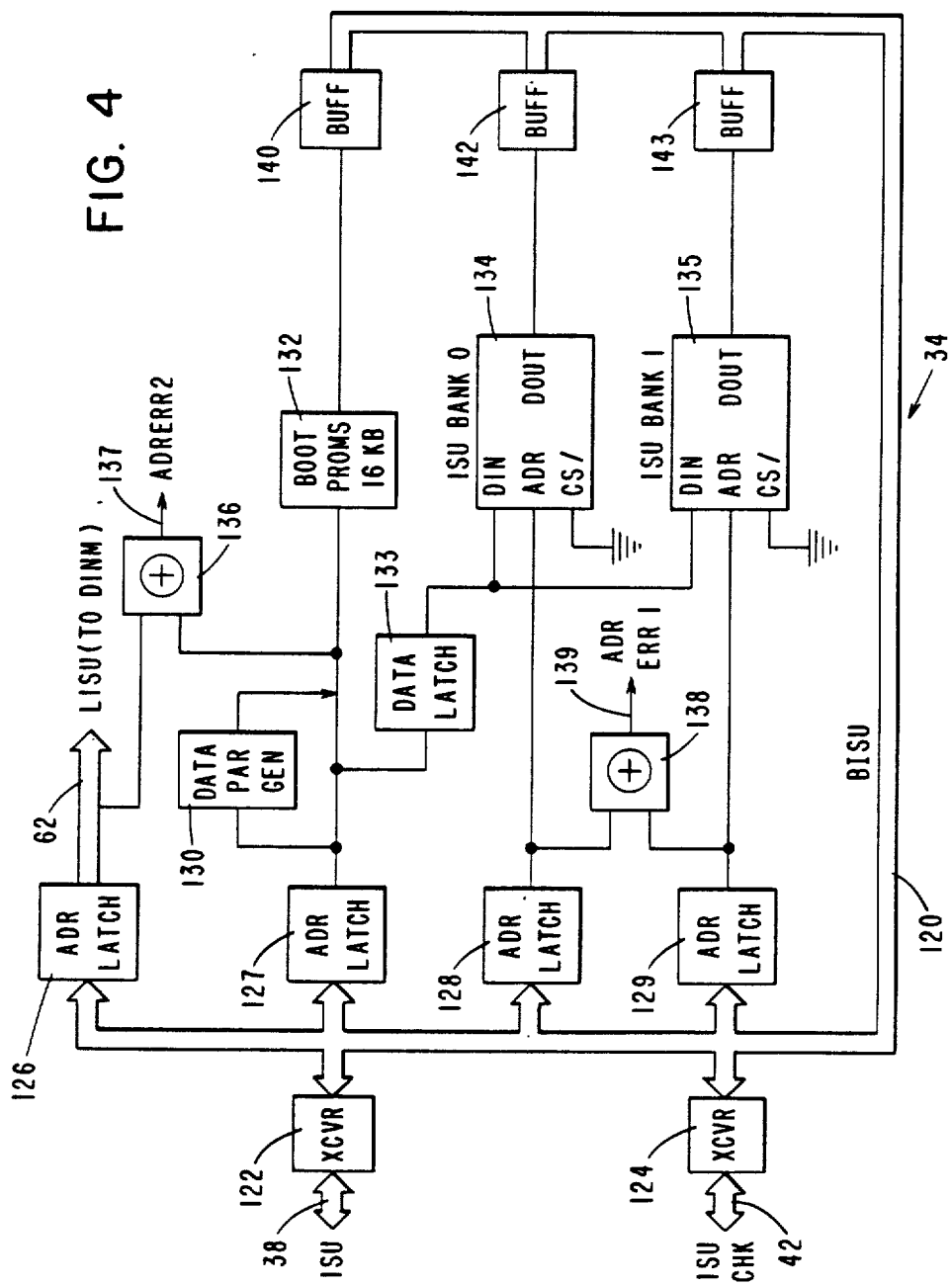

FIG. 9
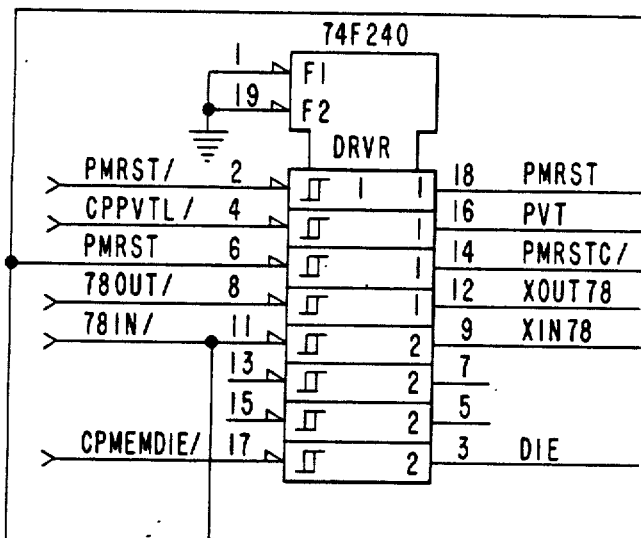
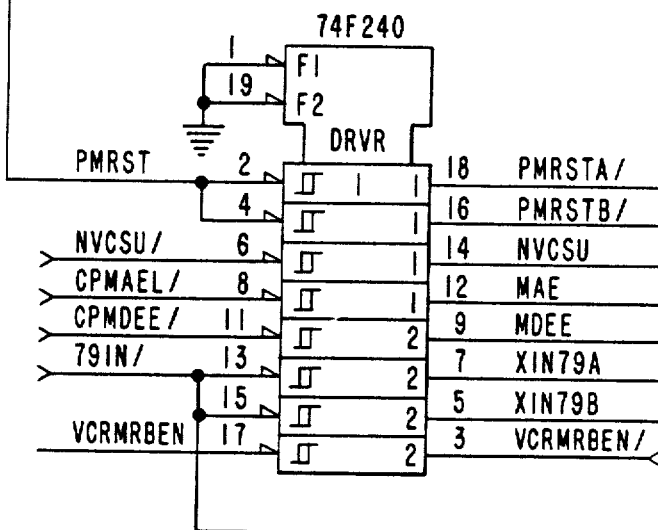

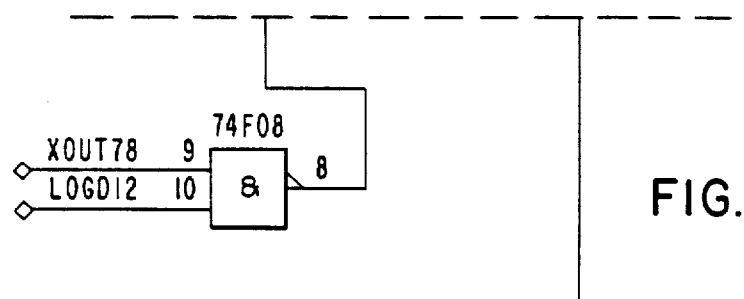
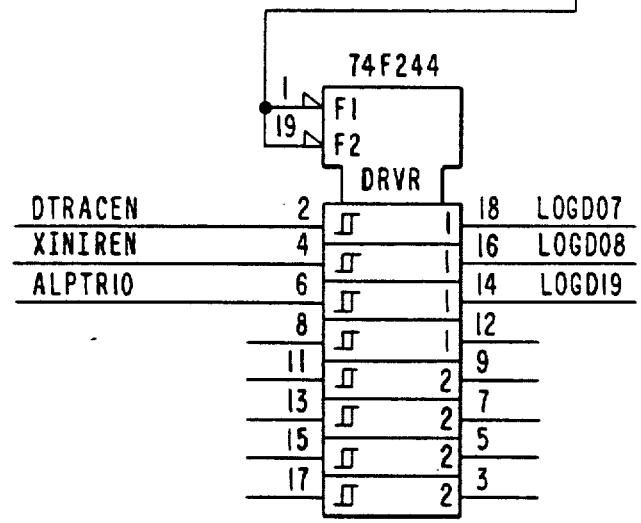
FIG. 13C
FIG. 13
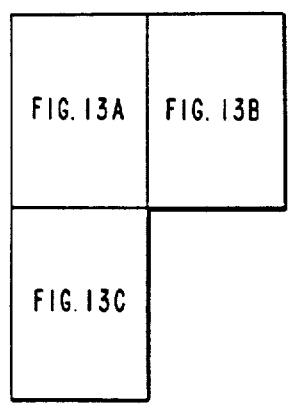

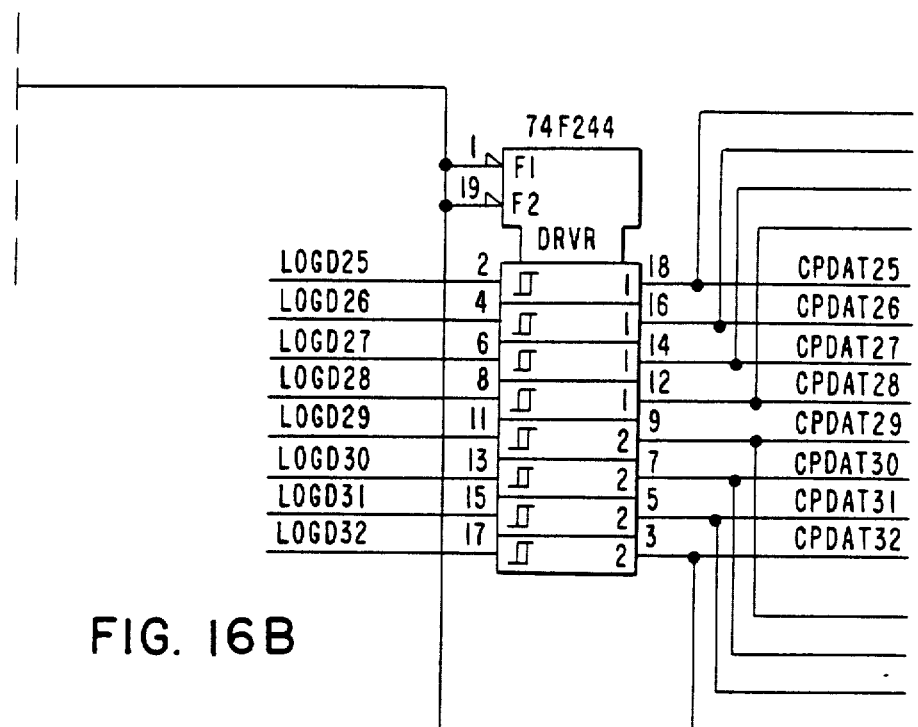
FIG. 16B
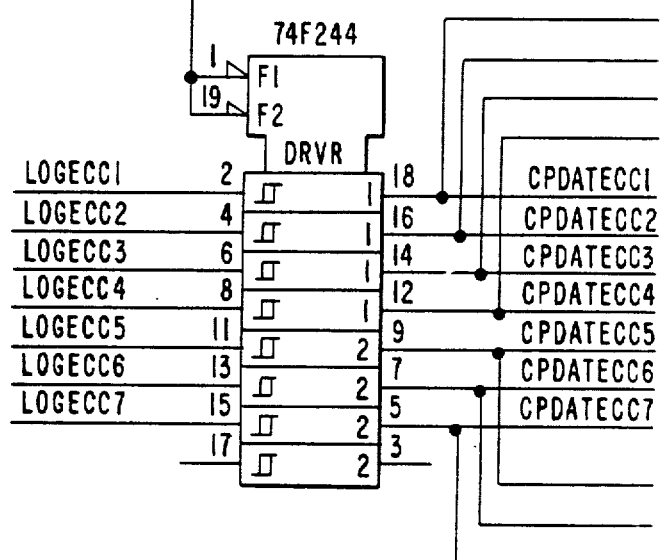

FIG. 20A
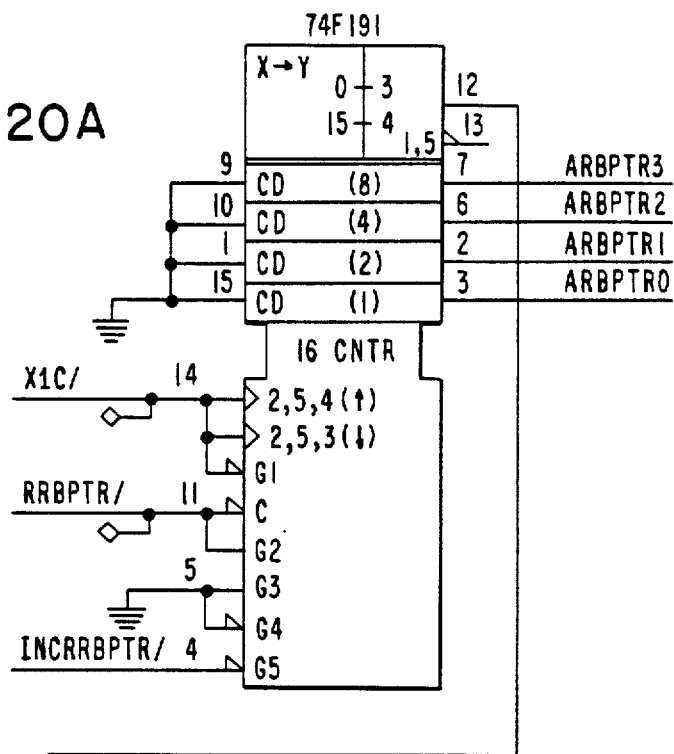
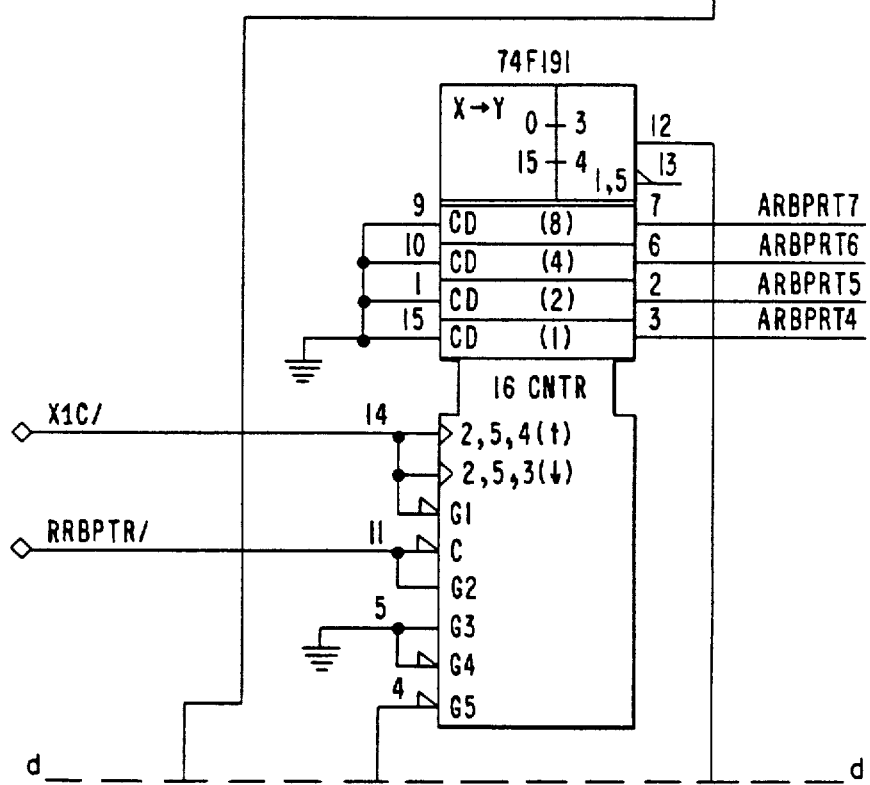

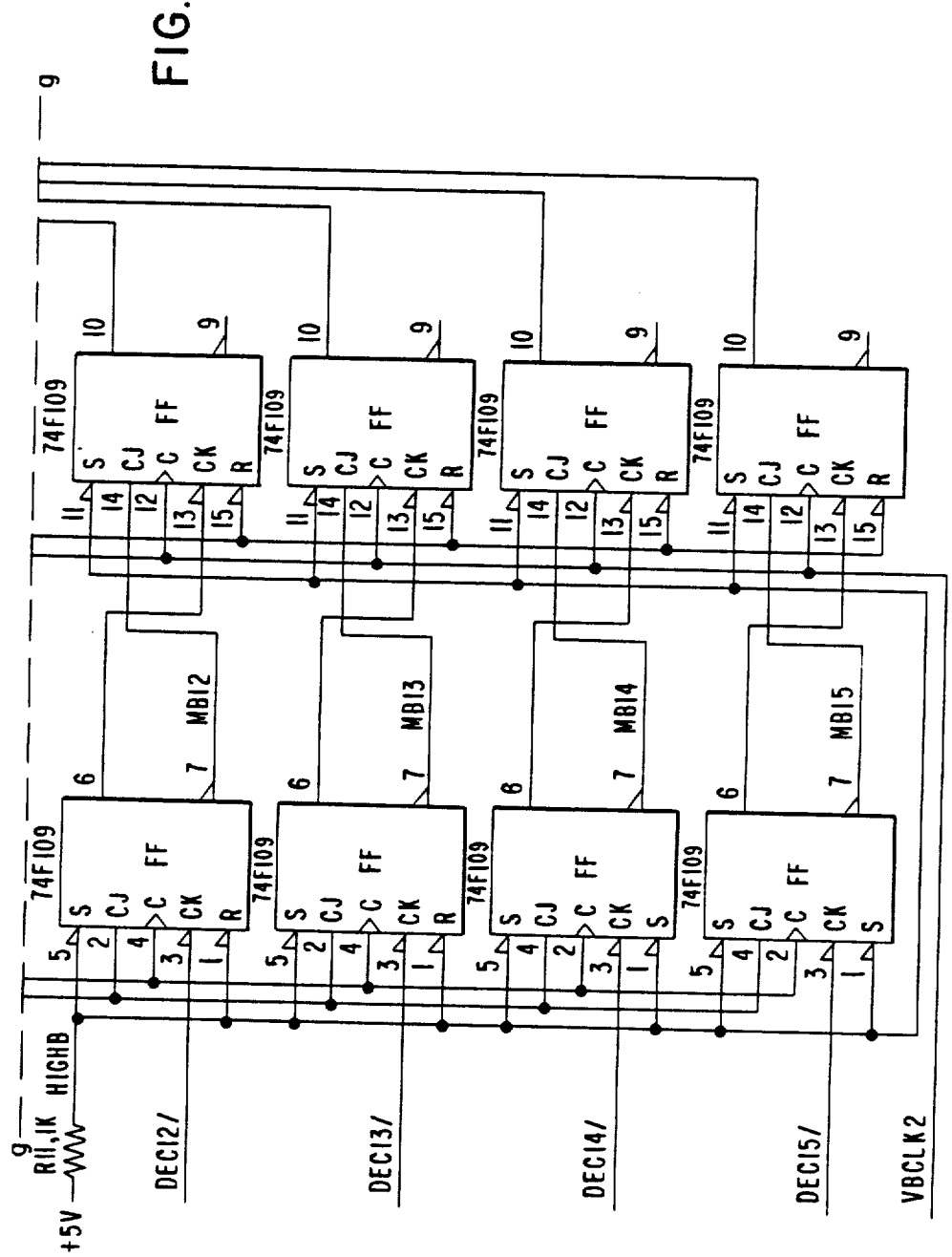

FIG. 44A

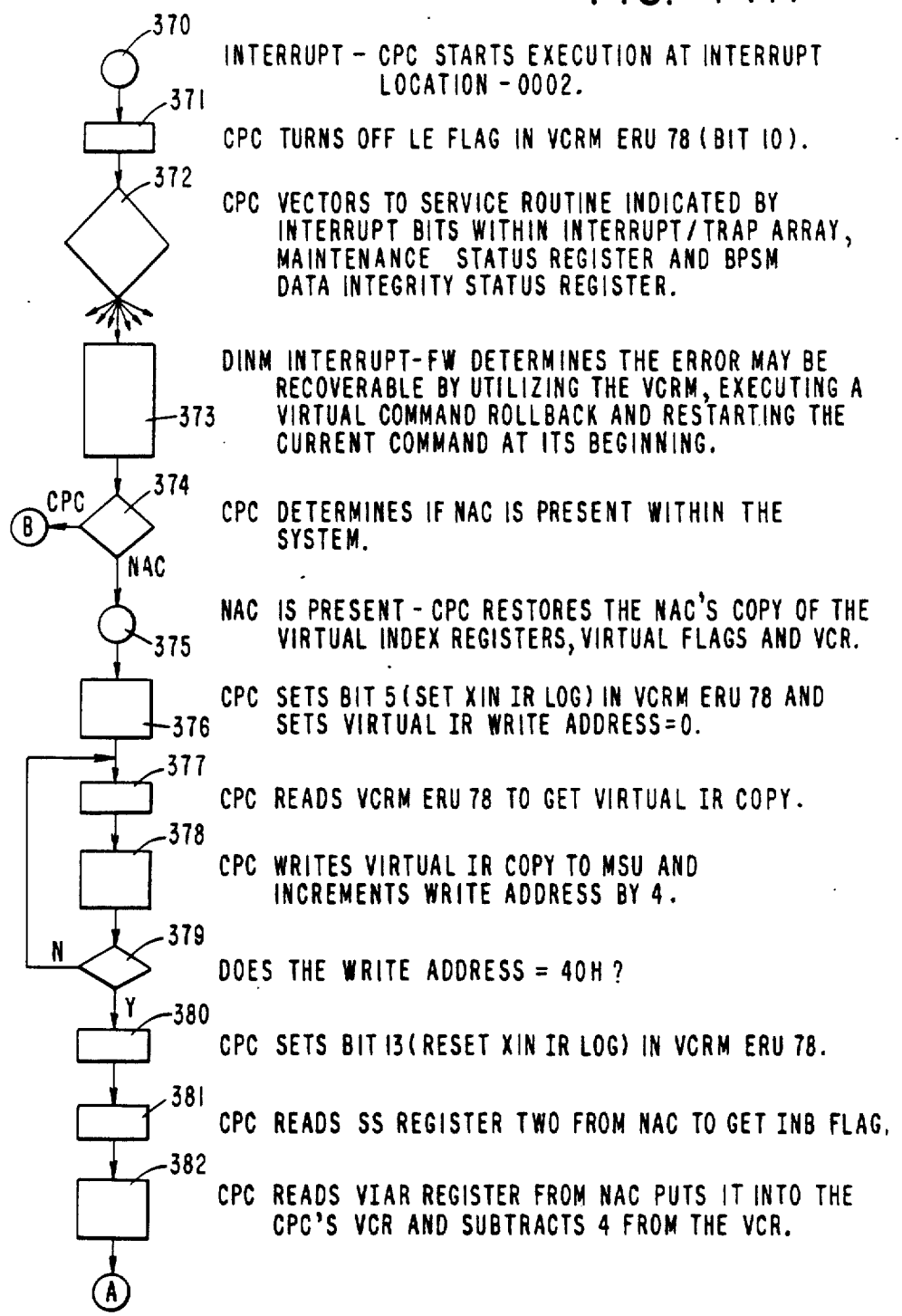

370 — INTERRUPT — CPC STARTS EXECUTION AT INTERRUPT LOCATION - 0002.

371 — CPC TURNS OFF LE FLAG IN VCRM ERU 78 (BIT 10).

372 — CPC VECTORS TO SERVICE ROUTINE INDICATED BY INTERRUPT BITS WITHIN INTERRUPT/TRAP ARRAY, MAINTENANCE STATUS REGISTER AND BPSM DATA INTEGRITY STATUS REGISTER.

373 — DINM INTERRUPT-FW DETERMINES THE ERROR MAY BE RECOVERABLE BY UTILIZING THE VCRM, EXECUTING A VIRTUAL COMMAND ROLLBACK AND RESTARTING THE CURRENT COMMAND AT ITS BEGINNING.

374 — CPC DETERMINES IF NAC IS PRESENT WITHIN THE SYSTEM.

375 — NAC IS PRESENT - CPC RESTORES THE NAC'S COPY OF THE VIRTUAL INDEX REGISTERS, VIRTUAL FLAGS AND VCR.

376 — CPC SETS BIT 5 (SET XIN IR LOG) IN VCRM ERU 78 AND SETS VIRTUAL IR WRITE ADDRESS = 0.

377 — CPC READS VCRM ERU 78 TO GET VIRTUAL IR COPY.

378 — CPC WRITES VIRTUAL IR COPY TO MSU AND INCREMENTS WRITE ADDRESS BY 4.

379 — DOES THE WRITE ADDRESS = 40H ?

380 — CPC SETS BIT 13 (RESET XIN IR LOG) IN VCRM ERU 78.

381 — CPC READS SS REGISTER TWO FROM NAC TO GET INB FLAG.

382 — CPC READS VIAR REGISTER FROM NAC PUTS IT INTO THE CPC'S VCR AND SUBTRACTS 4 FROM THE VCR.

CIRCUIT AND A METHOD FOR THE SELECTION OF ORIGINAL DATA FROM A REGISTER LOG CONTAINING ORIGINAL AND MODIFIED DATA

BACKGROUND OF THE INVENTION

The present invention is related to general purpose digital computer systems, and is more particularly related to a circuit and its method for selecting original data from a register log during rollback or fault tolerant computer systems.

A number of fault tolerant systems have recently been developed. Some such systems offer pure softwere solutions for non-stop operation by requiring the user to program checkpoints into the data processing routines wherein results from a processor of the system can be compared by software to determine if the system is continuing to operate correctly and without error.

Other systems offer complete hardware solutions, including redundant logic with total transparency to software on all solid failures. However, processing in such systems cannot continue on a unit when a transient error occurs because special diagnostics must be invoked to determine if, in fact, the error is a transient error rather than a solid failure. Many times, a second processor is required to ensure non-stop operation on both transient errors and solid failures. With two processors in the system, only 50% of the potential computational power of each processor is utilized, because both processors must be executing identical tasks in parallel to provide continued operation in the event of a failure. When a detected failure is corrected in the faulty unit of such a system, the two processors typically must be resynchronized to continue parallel operations.

Such systems generally require significant overhead on transient errors (which statistically occur from 10-100 times more frequently than hard errors) and have a period of vulnerability on the order of one million machine cycles (the time required to bring the first processor back on-line). A transient error occurring in the second processor during this period of vulnerability will bring the system down.

U.S. Pat. No. 4,453,215 to Reid issued June 5, 1984 for "Central Processing Apparatus for Fault-Tolerant Computing" discloses a fault tolerant computer system in which the information-handling parts of the system have a duplicate partner. Error detectors check the operation of the system to provide information transfers only on fault-free bus conductors and between fault-free units.

Other patents which show the state of the art include U.S. Pat. No. 4,165,533 to Jonsson issued Aug. 21, 1979 for "Identification of a Faulty Address Decoder in a Function Unit of a Computer Having a Plurality of Function Units With Redundant Address Decoders"; U.S. Pat. No. 4,453,210 to Suzuki et al. issued June 5, 1984 for "Multiprocessor Information Processing System Having Fault Detection Function Based on Periodic Supervision Of Updated Fault Supervising Codes"; U.S. Pat. No. 4,453,213 to Romagosa issued June 5, 1984 for "Error Reporting Scheme"; and U.S. Pat. No. 4,456,993 to Taniguchi et al. issued June 26, 1984 for "Data Processing System With Error Processing Apparatus and Error Processing Method."

The present invention is particularly useful with a fault tolerant computer system of the type described in an allowed co-pending patent application U.S. Ser. No. 748,361 filed June 24, 1985 by Corcoran et al. for "Virtual Command Rollback in a Fault Tolerant Data Processing System" which application is assigned to the assignee of the present invention. Such a system includes a processor which contains copies of the most used index registers such that during execution of a command, the processor may use the copies of the index registers rather than going to the main memory to fetch them. However, during the execution of the command, the index registers may be changed. If the fault tolerant system rolls back to re-execute the command, the index registers must be restored before the command may be re-executed. The present invention maintains copies of the original index registers and copies of the modified index registers, such that in the event of a rollback, original copies of the index register may be restored to the processor.

Patents which show the state of the art in maintaining copies of data in separate registers include U.S. Pat. No. 4,008,460 to Bryant et al. issued Feb. 15, 1977 for "Circuit For Implementing A Modified LRU Replacement Algorithm For A Cache," U.S. Pat. No. 4,024,508 to Bachman et al. issued May 17, 1977 for "Database Instruction Find Serial," U.S. Pat. No. 4,157,586 to Gannon et al., issued June 5, 1979 for "Technique For Performing Partial Stores In Store-Thru Memory Configuration," U.S. Pat. No. 4,168,541 to DeKarske issued Sept. 18, 1979 for "Paried Least Recently Used Block Replacement System," U.S. Pat. No. 4,250,546 to Boney et al. issued Feb. 10, 1981 for "Fast Interrupt Method," U.S. Pat. No. 4,336,588 to Vernon et al., issued June 22, 1982 for "Communication Line Status Scan Technique For A Communications Processing System," U.S. Pat. No. 4,425,618 to Bishop et al., issued Jan. 10, 1984 for "Method And Apparatus For Introducing Program Changes In Program—Controlled Systems," U.S. Pat. No. 4,439,829 to Tsiang issued Mar. 27, 1984 for "Data Processing Machine With Improved Cache Memory Management," and U.S. Pat. No. 4,464,712 to Fletcher issued Aug. 7, 1984 for "Second Level Cache Replacement Method and Apparatus.

SUMMARY OF THE INVENTION

In a system having a plurality of modifiable data registers, specific embodiments of a circuit and a method of restoring the contents of the data registers to their original contents are disclosed which include a plurality of memory locations, each of which correspond to a data register to be restored. Each memory location has two data storage devices, a first data storage device for storing the original contents of its corresponding data register, and a second data storage device for storing the modified contents of its corresponding data register. A plurality of modified bit registers are also included, one corresponding to each of said memory locations. Each of the modified bit registers includes a circuit for selectively enabling a modified bit when the modified contents of the data register of its corresponding memory location is stored in one of its corresponding data storage devices. A plurality of valid bit registers are included, each having an input connected to a corresponding one of the modified bit registers, and an output connected to its corresponding memory location. Each valid bit register contains a valid bit whose condition is indicative of which of the two data storage devices of the corresponding memory location contains the original contents of the corresponding data register, and a circuit for toggling the condition of the valid bit responsive to the enabling of the modified bit of the corresponding modified bit register.

Thus, it is an object of the present invention to provide a circuit and a method for maintaining copies of original index registers and copies of modified index registers such that in the event original copies of the index registers are needed, they may be restored.

It is also an object of the present invention to provide a circuit and a method for maintaining original and modified copies of index register, and a valid bit for each index register such that if original copies of the index registers are needed, they may be determined by interrogating the condition of the valid bits.

It is also an object of the present invention to provide a circuit and a method for changing valid bits indicating modified copies index registers to valid bits indicating original copies and index registers, as desired.

It is also an object of the present invention to provide a fault tolerant rollback system and a method wherein in the event of a rollback, original copies of index registers may be restored to a processor, even if some of the index registers were modified in the previous execution of a command by the processor.

These and other objects of the present invention will become more apparent from the description of the preferred embodiment and the drawings disclosed herein.

BRIEF DESCRIPTION OF THE DRAWINGS

FIG. 2 is a block diagram showing one of the basic processor subsystem modules of FIGS. 1A and 1B;

FIG. 4 is a block diagram of one of the writable control store modules of FIGS. 1A and 1B;

FIG. 5 is a block diagram of a portion of the data integrity module of FIGS. 1A and 1B for comparing primary and secondary data;

FIG. 9 is a schematic diagram of a register for receiving input signals for the virtual command rollback module;

FIGS. 20A and 20B, when joined along line d—d, form a schematic diagram of a portion of a counter of the fetch log of the virtual command rollback module;

FIGS. 29A and 29B, when joined along line g—g, form a schematic diagram of a portion of the valid bit and modified bit flip/flops of the index register log of the virtual command rollback module;

FIGS. 44A and 44B, when joined at connectors A and B, form a flow chart for effecting a rollback operation.

DESCRIPTION OF THE PREFERRED EMBODIMENT

Figure 1:
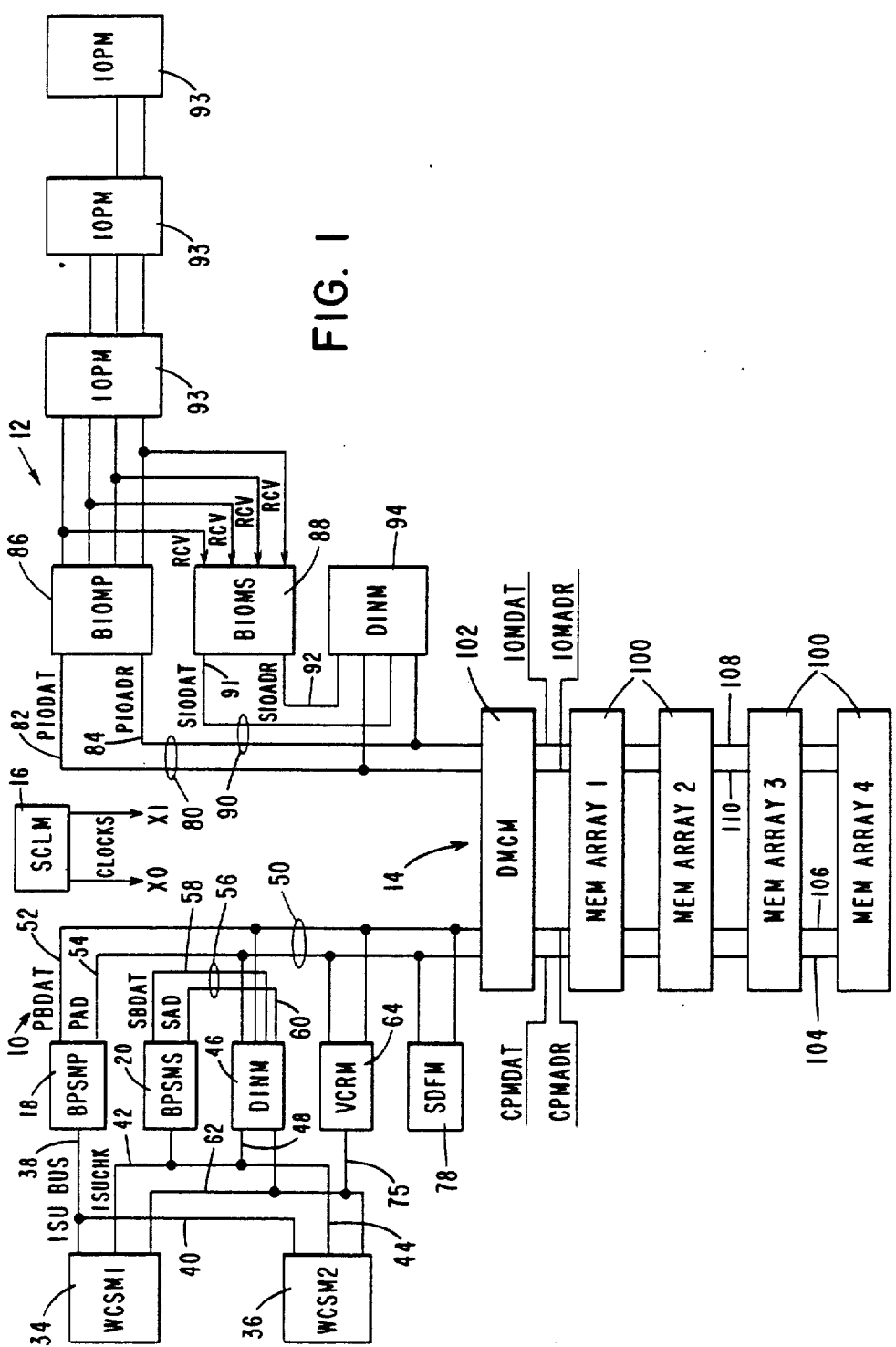
FIGS. 1A and 1B when formed form a block diagram of a general purpose data processing system including the present invention.
Figure 1B:
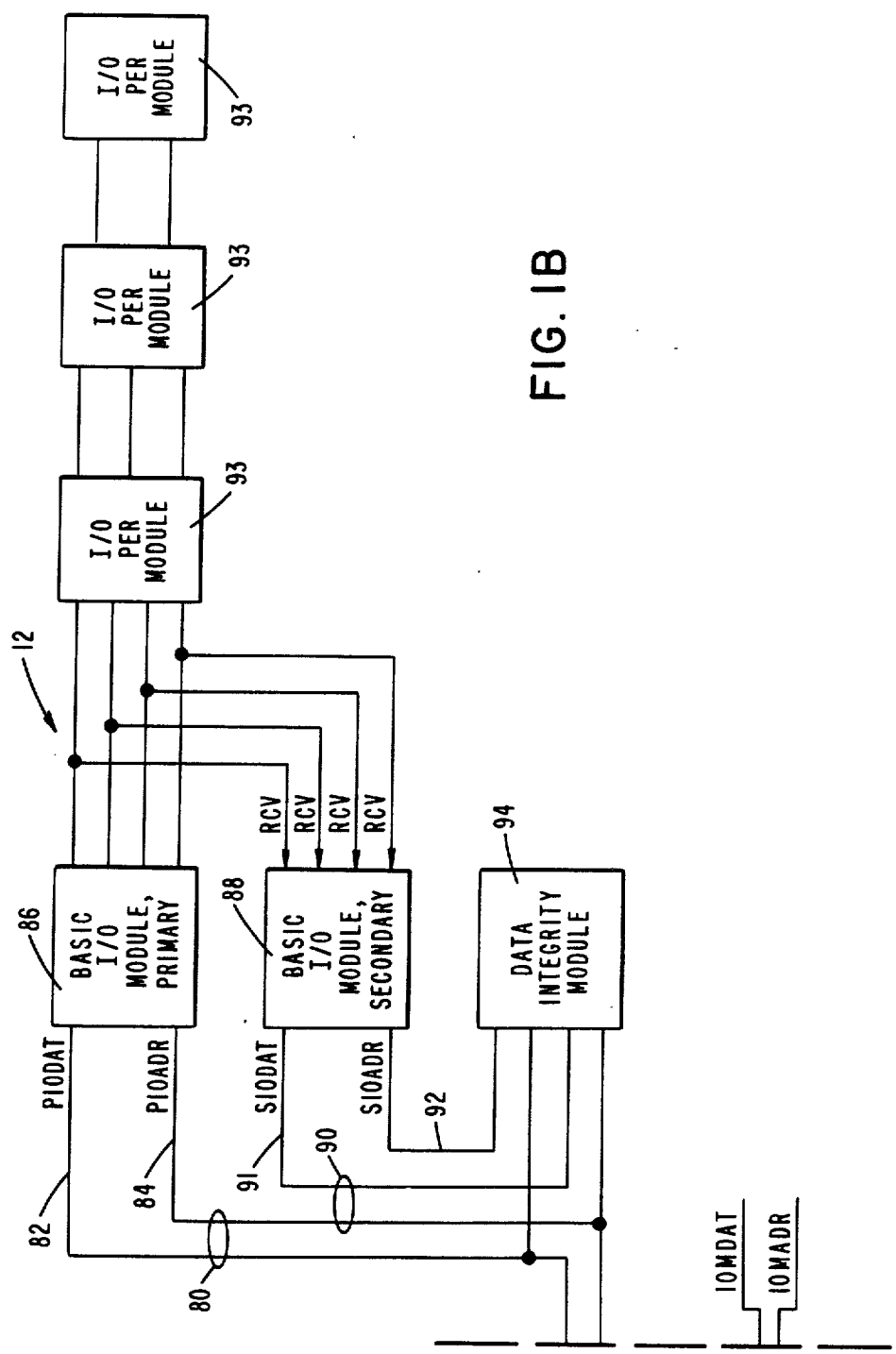

FIGS. 1A and 1B is a block diagram of a general purpose data processing system including the present invention, and includes a virtual command processor subsystem 10, an input/output (I/O) subsystem 12, and a memory subsystem 14. The subsystems 10, 12 and 14 are further divided into modules, with certain modules being duplicated to provide data integrity and command retrying capabilities of the data processing system, as will be explained. A system clock module (SCLM) 16 is provided. The principal timing of the disclosed system is maintained through the use of a two-phase clock having an X0 output and and X1 output, which are derived from a single crystal oscillator, not shown. The system bus clock, not shown, is also included in the SCLM module 16. The generation of clock signals and their distribution and utilization are well understood in the art and will not be discussed further.

The virtual command processor subsystem 10 includes a pair of basic processor subsystem modules (BPSM) 18 and 20, one, 18, being the primary module (BPSMP) and the other, 20, being the secondary module (BPSMS). Each of the modules 18 and 20 include very large scale integration circuit (VLSI) chips from the NCR 32 bit chip set, as explained in the NCR/32 General Information Publication available from VLSI Processor Products, NCR Microelectronics Division, Colorado Springs, Colo., under the Stock No. ST-2104-23.

Referring to FIG. 2, each of the BPSM modules 18 and 20 may include a central processor chip (CPC) 22 and an address translation chip (ATC) 24, as fully explained in the mentioned NCR/32 General Information Publication. The CPC 22 is connected to an instruction storage unit (ISU) bus 26 and processor-memory (PM) bus 28. As is known, the CPC 22 places instruction addresses on the ISU bus 26, on X0 of the clock SCLM 16, to an ISU memory 30, and receives instructions back from ISU memory 30 on X1 of the clock SCLM 16. Addresses for memory operations are also placed on the address portion of the PM bus 28, and data is either fetched from or written into a main memory 32 at the given address. It will be understood that in the system of FIG. 1A and 1B, the memory subsystem 14 includes the main memory 32 of FIG. 2.

Figure 3:
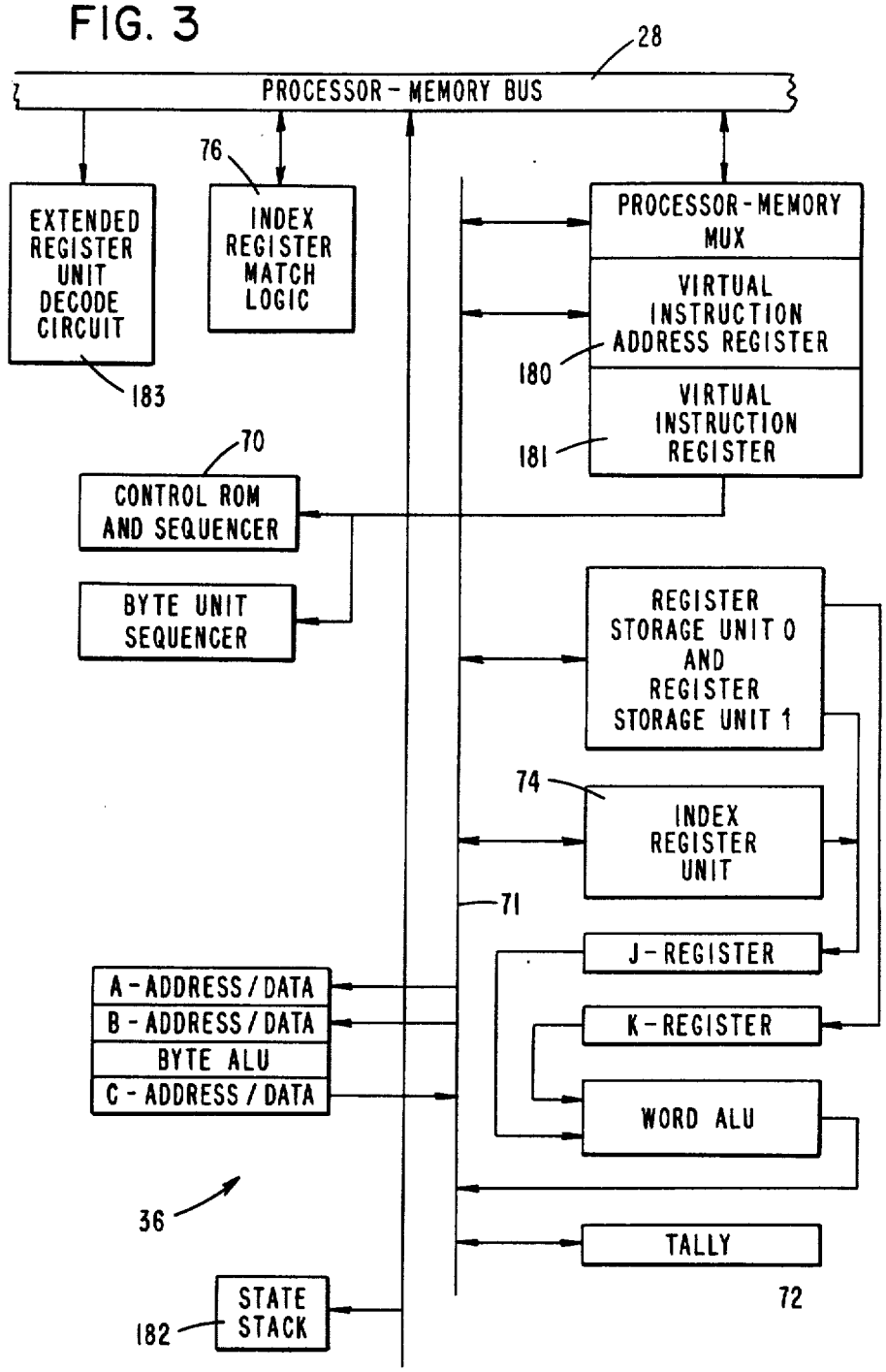
FIG. 3 is a block diagram of a NEAT assist chip of FIG. 2.

The BPSMP module 18 and the BPSMS module 20 may also contain specialized hardware enhancement chips, such as an extended arithmetic chip (EAC) 34 of FIG. 2 which provides specialized hardware for floating point arithmetic, and a NEAT assist chip (NAC) 36 which provides a self-contained firmware on-chip processor which executes a subset of NEAT commands. The NAC 36 of FIG. 2 is an NCR 9000 Series NEAT assist chip, whose block diagram is shown in FIG. 3. Without the NAC 36, the CPC 22 is the main element which subordinates activities to the ATC 24 and the EAC 34. When emulating, for instance, NEAT commands, the CPC 22 interprets and executes the NEAT commands by accessing routines in the ISU memory 30. When a NAC 36 is present, the NAC becomes the master. The NEAT virtual command to be executed is then fetched from the main memory 32 of FIG. 2 by the NAC 36, a command set up is performed, and then, only if the NAC 36 does not support the execution of that particular command, is control passed to the CPC 22. When a NAC 36 is present, the CPC 22 only invokes the use of the ATC 24 or EAC 34 as requested by the NAC 36. While the NAC 36 is executing virtual NEAT commands, the CPC is available to service I/O interrupts or time-of-day interrupts concurrent to the operations being performed by the NAC 36.

Referring to FIG. 3, the NAC 36 does not use any off-chip control store. All storage needed to execute the virtual NEAT commands supported by the NAC 36, is stored in a central read-only memory (ROM) 70. Microinstructions in the NAC 36 are executed within a two-stage pipeline having interpret and execute stages. In the interpret stage, whose start is indicated by the NVCSU/signal on the conductor 37 of FIG. 2, the ROM address for the beginning microinstruction to emulate the virtual NEAT command is determined, and the number of bytes affected by the virtual instructions is stored in the tally 72. A copy of the first 15 index registers in the main memory 32 of FIG. 2 is kept in an index register unit (IRU) 74. This is done by monitoring the PM bus 28 (see FIG. 2) with index register match logic 76, which causes the storage of the contents of any of the first 15 index registers fetched or modified by appropriate instructions over the PM bus 28 to the first 15 virtual addresses of the main memory 32, to be stored in the IRU 74. Thus, during the interpret and execute stages of the NAC 36, acces may be made directly to the ISU 74 in the NAC 36, without having to fetch any of the first 15 registers from the main memory 32.

In the execution stage, the ROM 70 is addressed for the beginning microinstruction of the NEAT command being emulated, and the proper index register in the IRU 74, or any other register in the NAC 36 or other device in the system attached to the PM bus 28, as may be appropriate, is accessed to execute the microinstruction. The count in the tally 72 is then decremented as each byte affected by the virtual command is processed. During execution, the contents of the index register may be modified. Any such modifications are made to the index register in main memory 32 by the NAC 36 over the PM bus 28. The index match logic 76 of FIG. 3 sees any writes to the first 15 virtual index registers, and modifies the NAC copy of the modified index register in the IRU 74 such that the index registers in the IRU 74 are always kept current. Thus, modifying any of the first fifteen index registers in the main memory 32 of FIG. 2 by the NAC 36 during emulation of a NEAT command, will also modify the copy of the modified index register in the ISU 74 of the NAC 36. Only the first fifteen index registers are kept in the ISU 74 because it has been determined that about 98% of the microinstructions of the NAC 36 utilize only those registers.

The NAC 36 also contains a virtual instruction address register (VIAR) 180 in which the address of the next virtual command to be fetched is stored, and a virtual instruction register 181 (VIR) in which is stored the virtual command last fetched by the NAC 36. The NAC 36 also contains a state stack 182, which is actually four 32-bit ERU registers, all of which are connected directly to the PM bus 28. Access to the state stack 182 is controlled by the ERU decode circuit 183 in a well known manner.

The first state stack register (SSR1) of 182 will contain one of two different words of information, depending on why the NAC 36 is passing control to the CPC 22. When control is transferred because of a non-supported command, the SSR1 of 182 will contain a control transfer word, which includes the virtual Op-Code to be executed by the CPC 22 at bits 25-32, the virtual tally field defining the length of the operand at bits 17-24, and virtual indicator bits 1-8 which are set and reset by the NAC 36 during virtual command execution, as required by the command being emulated. When the NAC 36 transfers control because of a condition which it can not handle, the SSR1 of 182 will contain an exception condition word. The second register of the state stack (SSR2) contains various codes and flags for the operation of the NAC 36 in the emulation of a NEAT command, including an INB flag at bit 26 which is modified by the NAC 36 during set-up, and reflects whether the NAC is in the first or second word setup of a two word NEAT command. The third register of the state stack (SSR3) contains various internal indicators, a trap link register and a retry link register. The fourth register of the state stack (SSR4) contains a copy (old copy) of the virtual indicators from the SSR1 as they were loaded into the SSR1 during setup time.

It will be understood that the NAC 36 provides an enhancement of the system only, and that the data processing system utilizing the present invention may be operated without the NAC 36 discussed in connection with FIGS. 2 and 3.

The processors (CPC 22 or NAC 36) of the BPSMP module 18 and the BPSMS module 20 are synchronized to execute commands in parallel, including fetching data from the main memory, and manipulating the data in accordance with instructions either from the ISU memory or the control ROM of the NAC, and then storing the manipulated data back in the main memory. The operations of the processors will be compared at all times, as will be explained, and upon a microcomparison, the processors will be instructed to re-execute their last virtual command until an equal comparison is obtained, or a determination is made that a hard error has occurred.

Returning to FIGS. 1A and 1B, a pair of writable control store modules (WCSM) 34 and 36 are provided. Each WCSM includes 8K bytes of read-only memory (ROM) which provide power-up, boot and start-of-day programs, and 64K bytes (32K words) each of random access memory (RAM) which are used for ISU memory (30 of FIG. 2). The ROM programming provides that instructions in the form of data may be fetched from the main memory of the system, and stored in the RAM devices in a WCSM load program. It will be understood that 32K words of ISU instructions will be stored in the WCSM 34, and 32K words will be stored in the WCSM 36. The BPSMP module 18 is connected to the WCSM modules 34 and 36 by an ISU bus 38 and extension bus 40. The BPSMS module 20 is connected to the WCSM modules 34 and 36 by an ISU check (ISUCHK) bus 42 and 44, and to a data integrity module (DINM) 46, to be explained later, by an extension 48 of the ISUCHK bus 42.

A PM bus 50, which is the same as bus 28 explained in connection with FIG. 2, is connected between the BPSMP module 18 and the memory subsystem 14, and includes a data portion 52 for primary processor data (PBDAT) and an address portion 54 for primary processor addresses (PAD). A second PM bus 56 is connected between the BPSMS module 20 and the DINM module 46, and includes a data portion 58 for secondary processor data (SBDAT) and an address portion 60 for secondary addresses (SAD). The DINM module 46 is also connected to the PBDAT bus 52 and the PAD bus 54.

As will be explained, ISU addresses to the WCSM modules 34 and 36, and ISU instructions from the WCSM modules 34 and 36 are latched onto a latched ISU (LISU) bus 62 connected between the WCSM modules 34 and 36, and the DINM module 46. Among the functions of the DINM module 46, is the comparison of the calculated results after the manipulation of data by either the CPC 22 or the NAC 36 of both of the PBSM modules 18 and 20. If the resultants from the modules 18 and 20 are not the same, the processors (either CPC 22 or NAC 36) which were executing virtual commands are rolled back to retry the last virtual command in which the error occurred. During the retry operation, the data originally fetched in the first try of the execution is resupplied to the executing processors. A virtual command rollback module (VCRM) 64 is provided to store all fetched data and associated error correction code (ECC) check bits from the memory subsystem 14, referred to herein as a fetch log. To accomplish this, the VCRM 64 is connected to the PBDAT bus 52, and has sufficient RAM to store 2K of fetched data entries.

As explained in FIG. 3, the NAC 36 keeps its own copy of the first 15 index registers, and any fetches to be made during the emulation of a virtual command to any of these first 15 index registers will be made over an internal bus 71 (see FIG. 3) in the NAC 36 to the NAC's copy of the register in the IRU 74. Thus, it will be understood that any fetches from the first 15 index registers during the NAC virtual command emulation will not appear in the fetch log. Since the index registers may be modified during the execution of an instruction, the contents of the index register in the IRU 74 of the NAC 36 may not be the same as when the command was first tried. Thus, the VCRM 64 also contains an index register log (IR log) which contains an original copy of the first 15 index registers of the main memory 32 of FIG. 2, as those index registers appeared in the interpret stage of the NAC 36 for the current virtual command, and a second or modified copy of the first 15 index registers as they may be modified during the instruction stage. If the virtual command is successfully executed, the modified copy in the IR log becomes the original copy for the subsequent virtual command, and the original copy is used to record modifications during the execution of that subsequent command. If the virtual command execution is not successful, firmware restores the contents of the original copy of the IR log to the main memory 32, which is simultaneously stored in the IRU 74 by the IR match logic 76 of FIG. 3. The NAC 36 is then returned to its interpret stage, and the execution of the virtual command is retried. It will thus be understood that the IR log described will not be needed in the case of CPC virtual command execution because data fetched from the first 15 index registers will appear, in that case, in the data fetch log.

The VCRM 64 is also connected to the LISU bus 62 by a bus extension 75. The VCRM 64 contains a RAM for storing the ISU addresses provided by the BPSMP 18 in a trace log, which may be used by firmware for diagnostic purposes. The trace log RAM stores up to 2K of ISU address entries while trace is enabled. The trace log may also be used, if desired, for backing up the CPC pipeline.

As discussed in the aforementioned NCR/32 General Information publication, the CPC 22 of FIG. 2 uses external registers (ERUs) to, among other things, provide for communication between the 32 bit chip set devices of the processor modules 18 and 20, and for user-defined control signals to be set and monitored by the CPC 22. The other devices of the 32 bit chip set, the ATC 24, EAC 34 and NAC 36, and various modules of the system have similar ERU capabilities. A system dependent function module (SDFM) 78 is provided which includes ERU registers (not shown) for accepting, modifying and displaying individual bits of a selected ERU by a user for the operation and control of the data processing system of FIGS. 1A and 1B.

The I/O subsystem 12 of FIGS. 1A and 1B includes a primary I/O bus 80 having a primary I/O data (PIODAT) portion 82 and a primary address (PIOADR) portion 84. A pair of basic I/O modules (BIOM) 86 and 88 are provided, one being a primary module (BIOMP) and one being a secondary (BIOMS) module. Each BIOM module 86 and 88 includes an ATC chip, which is the same as the ATC 24 of FIG. 4, and two NCR/32-500 system interface controllers (SIC) chips, as described in U.S. Pat. No. 4,387,441, issued June 7, 1983 to Kocol et al. for "Data Processing System Wherein At Least One Subsystem Has A Local Memory and A Mailbox Memory Within The Local Memory for Storing Header Information," and which is owned by the assignee of the present invention. The BIOMS module 88 has a second I/O bus 90 having an I/O data (SIODAT) portion 91 and an I/O address (SIOADR) bus 92. A DINM module 94 (which is similar to the DINM module 46 of the processor subsection 10) is connected between the primary I/O bus 80 and the secondary I/O bus 90 for providing data integrity checks in the I/O subsystem 12. Various I/O personality modules 93 may be connected to the BIOMP 86 to provide selected system-to-system or peripheral interface channels of various bandwidths and using various protocols.

The main memory subsystem 14 includes a plurality of memory arrays 100, and a dual-port memory control (DMCM) 102. Each memory array 100 has a central processor path having a data portion (CPMDAT) 104 and an address portion (CPMADR) 106, and an I/O path having a data portion (IOMDAT) 108 and an address portion (IOMADR) 110. Thus, the DMCM 102 may allow one of the BPSM modules 18 or 20 to access one memory array 100, while allowing one of the BIOM modules 86 or 88 to access another memory array 100. The DMCM 102 also includes a prefetch circuit which is disclosed in co-pending former application U.S. Ser. No. 770,459 filed Aug. 29, 1985, now U.S. Pat. No. 4,722,047 issued Jan. 22, 1988, titled "Prefetch Circuit for a Virtual Command Emulator" by Chan et al., and which is owned by the assignee of the present invention.

FIG. 4 is a block diagram of one of the WCSM modules 34 or 36 of FIGS. 1A and 1B. It will be understood that the WCSM modules 34 and 36 are identical. A bidirectional BISU bus 120 is internal to the WCSM module 34 for providing communication between various elements, to be described. The ISU bus 38, shown in FIGS. 1A and 1B, is connected to a transceiver 122, which is connected to the BISU bus 120. Also, the ISUCHK bus 42 shown in FIGS. 1A and 1B is connected to a transceiver 124, also connected to the BISU bus 120. The transceivers 122 and 124 may be 74F245 devices available from Fairchild. A plurality of address latches 126, 127, 128 and 129 have their inputs connected to the BISU bus 120. Each of the address latches 126–129 may be formed of 74F373 devices available from Fairchild. The output of the address latch 126 is connected to the LISU bus 62, shown in FIGS. 1A and 1B. The output of the address latch 127 is connected to a data parity generator 130, a prom 132, and data latch 133. The output of the data latch 133 is connected to the data inputs of a pair of memory bans 134 and 135. The output of the address latch 128 is connected to the address inputs of the memory bank 134, and the output of the address latch 139 is connected to the address inputs of the memory bank 135. A first comparator 136 compares the output of the address latch 126 on LISU bus 62, with the output of the address latch 127. If the comparison is not equal, an error signal (ADRERR2) is placed on its output 137. A second comparator 138 compares the output of address latch 128 with the output of address latch 129. If the comparison is not equal, an error signal (ADRERR1) is placed on its output 139. The parity generator 130 may be formed of 74S280 devices available from Fairchild, and the data latch 133 may be formed of 74F374 devices available from Fairchild, the boot prom 132 is formed by 82S191 devices available from Fairchild to form a 16K by 16 bit programmable read only memory for containing boot routines. The comparators 136 and 138 may be formed of 74F521 devices of available from Fairchild. The memory banks 134 and 135 each may be formed of a 16383 devices available from Mitsubishi, wherein each memory bank 134 and 135 forms a 16K by 18 bit memory bank. The data outputs of the prom 132 is connected to a data buffer 140, and the outputs of the memory banks 135 and 135 are connected the data buffers 142 and 143 respectively. The outputs of the data buffers 140, 142 and 143 are connected to the BISU bus 120. The data buffers 140, 142 and 143 may be formed of 74F244 devices available from Fairchild.

After the prom 132 has been programmed in a well known manner, a CPC 22 of FIG. 2 may execute a boot program from prom 132 by placing a prom address on the ISU bus 38. The transceiver 132 places the prom address on the BISU bus 120 which is latched into latches 126 and 127. The prom address is then directed to the prom 132, and the microinstruction to be executed is outputted by the prom 132 to the buffer 140, which places the microinstruction on the BISU bus 120. The transceiver 122 then places the microinstruction on the ISU bus 38 for execution by the CPC 22 of FIG. 2. During the boot routine in prom 132, microinstructions to be stored in the ISU banks 134 and 135 are fetched from the main memory 32 by the CPC 22 and placed on the ISU bus 38 of FIGS. 1A and 1B and 4. The microinstruction data is then placed by transceiver 122 of FIG.

4 on the BISU bus 120 and latched into latches 126 and 127. A parity generator 130 then adds a parity bit to the microinstruction data, which is stored in data latch 133 to be inputted into one of the memory banks 134 or 135. The address of the microinstruction is placed by the CPC 22 of FIGS. 1A and 1B on the ISU bus 38 and placed by the transceiver 122 on the BISU bus 120 and latched into latches 128 and 129. The output of the latches 128 and 129 is then addressed to the memory banks 134 and 135, and the memory bank address stores the data in data latch 133 at the outputted address. If the comparator 136 gets a miscompare showing that either the prom address outputted by latch 126 and 127 or the microinstruction data also outputted by latch 126 and 127 is not the same, an error signal is asserted on conductor 137 to show that a data integrity error exists. The comparator 138 compares the memory bank address outputted by latches 128 and 129 and if a miscomparison is found, a data error is raised on conductor 139 to show that a data integrity error in the ISU memory address exists. Later, when the CPC 22 of FIG. 2 is emulating a virtual command, the address of a microinstruction is placed on ISU bus 38 of FIG. 4. The transceiver 122 then places the address on the BISU bus 120 to be latched into address latches 128 and 129. The address memory bank 134 or 135 places the microinstruction on its respective output, which is buffered either in buffer 142 or 143, and placed on the BISU bus 120 for transmission by transceiver 122 back to the CPC 22 over ISU bus 38. If an error occurs by misoperation of either latch 128 or 129, the comparison by the comparator 138 will not be equal raising a data integrity error condition on conductor 139. The same description of the operation of a CPC in the secondary BPSMS modules 20 can be made wherein the ISUCHK bus 42 and the transceiver 124 are used instead of the previously described ISU bus 38 and transceiver 122.

Figure 6:
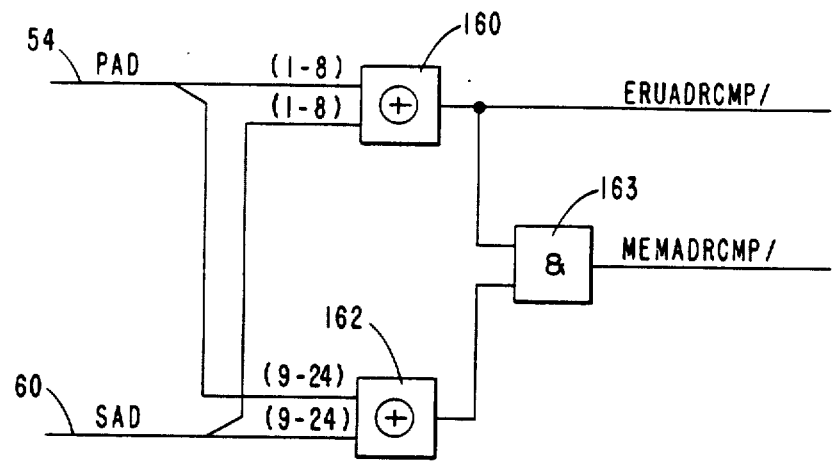
FIG. 6 is a block diagram of another portion of the data integrity module of FIGS. 1A and 1B for comparing primary and secondary addresses.
Figure 7:
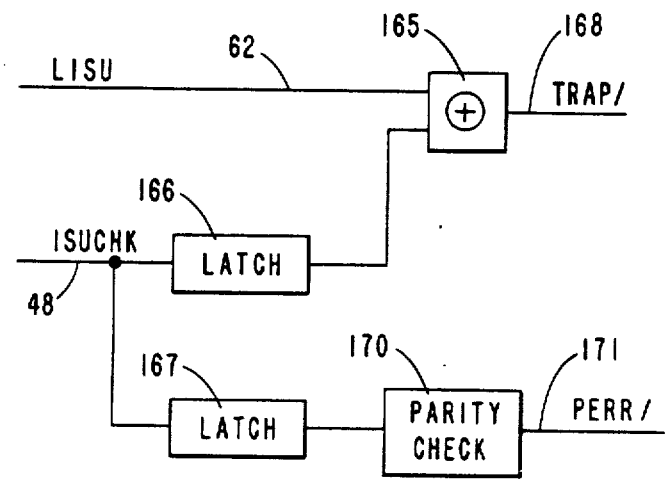
FIG. 7 is a block diagram of still another portion of the data integrity module of FIGS. 1A and 1B for comparing addresses and microinstructions of the instruction storage unit.
Figure 8A:
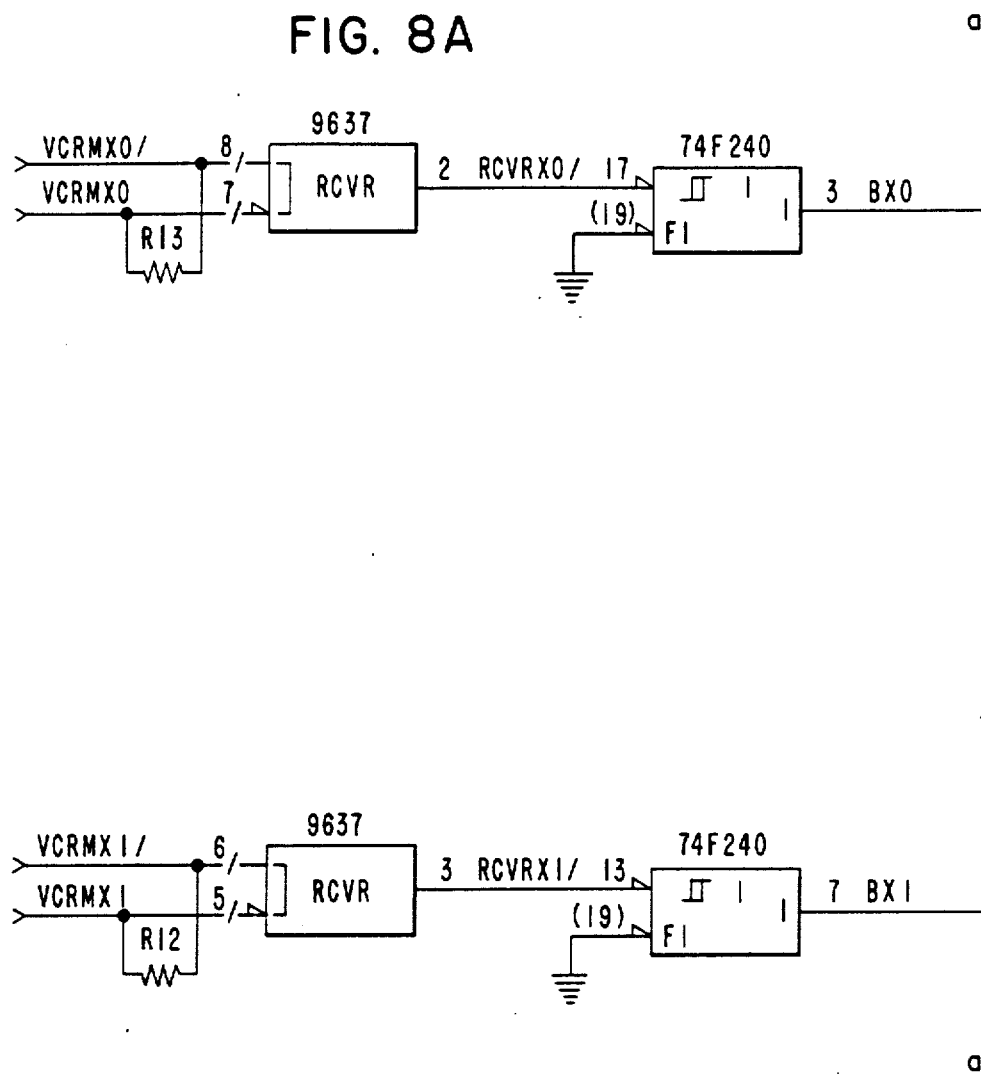
FIGS. 8A and 8B, when joined along line a—a, forms a schematic diagram of a clock distribution circuit of a virtual command rollback module of FIGS. 1A and 1B.
Figure 8B:
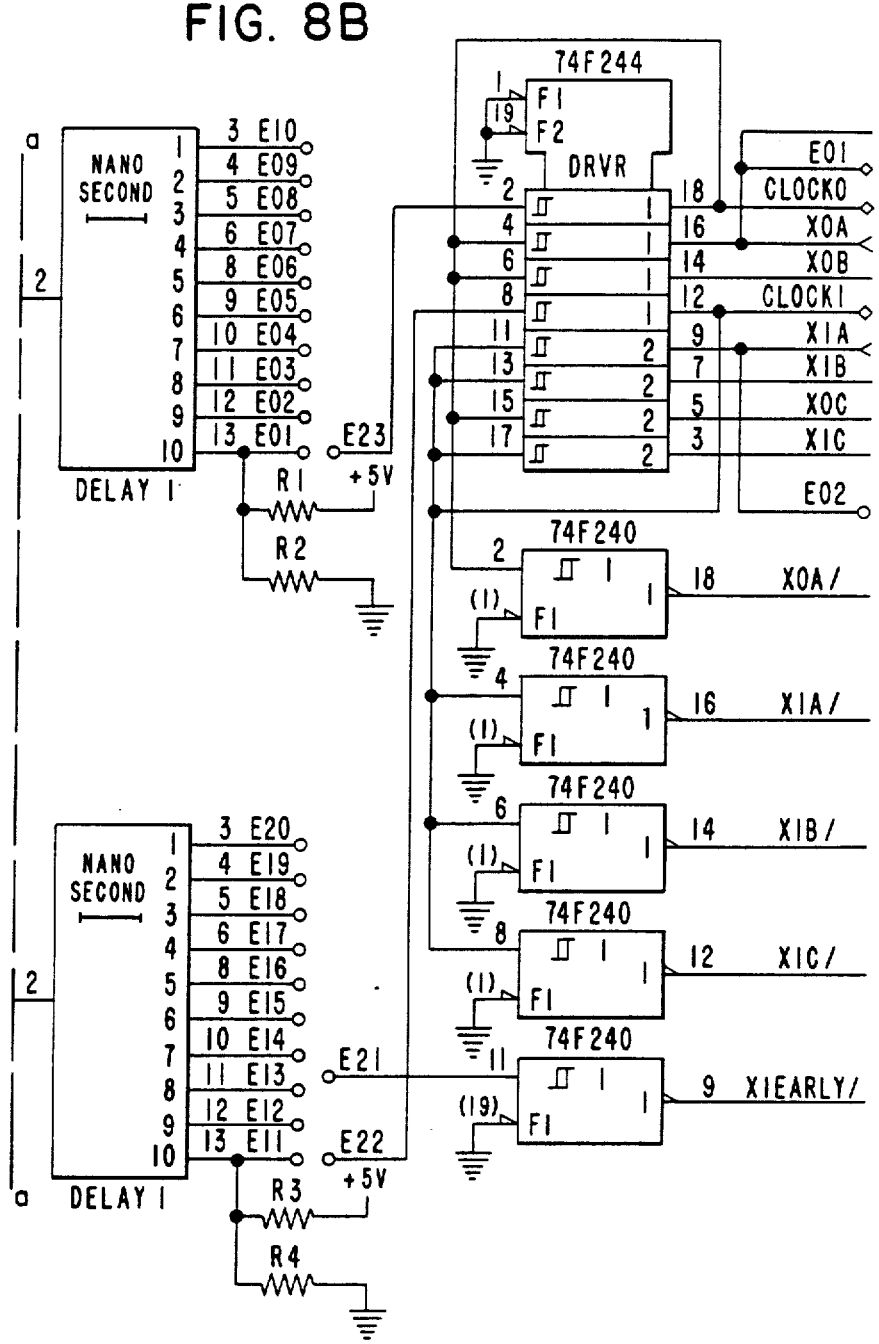
Figure 10:
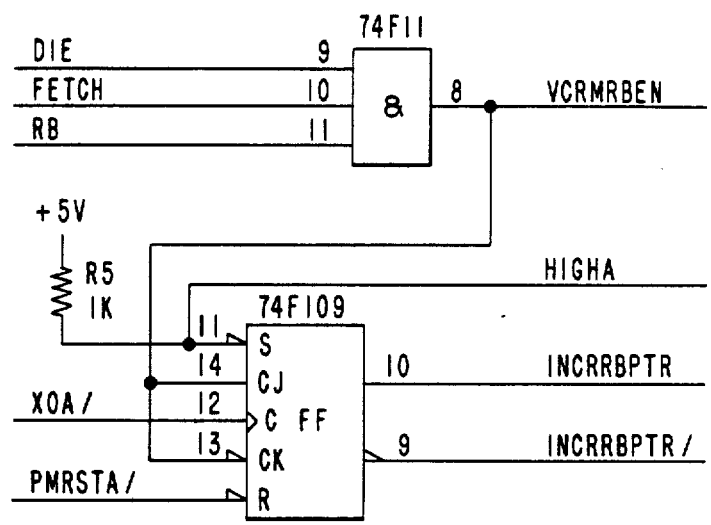
FIG. 10 is a schematic diagram of a portion of the control circuitry of the virtual command rollback module.
Figure 11:
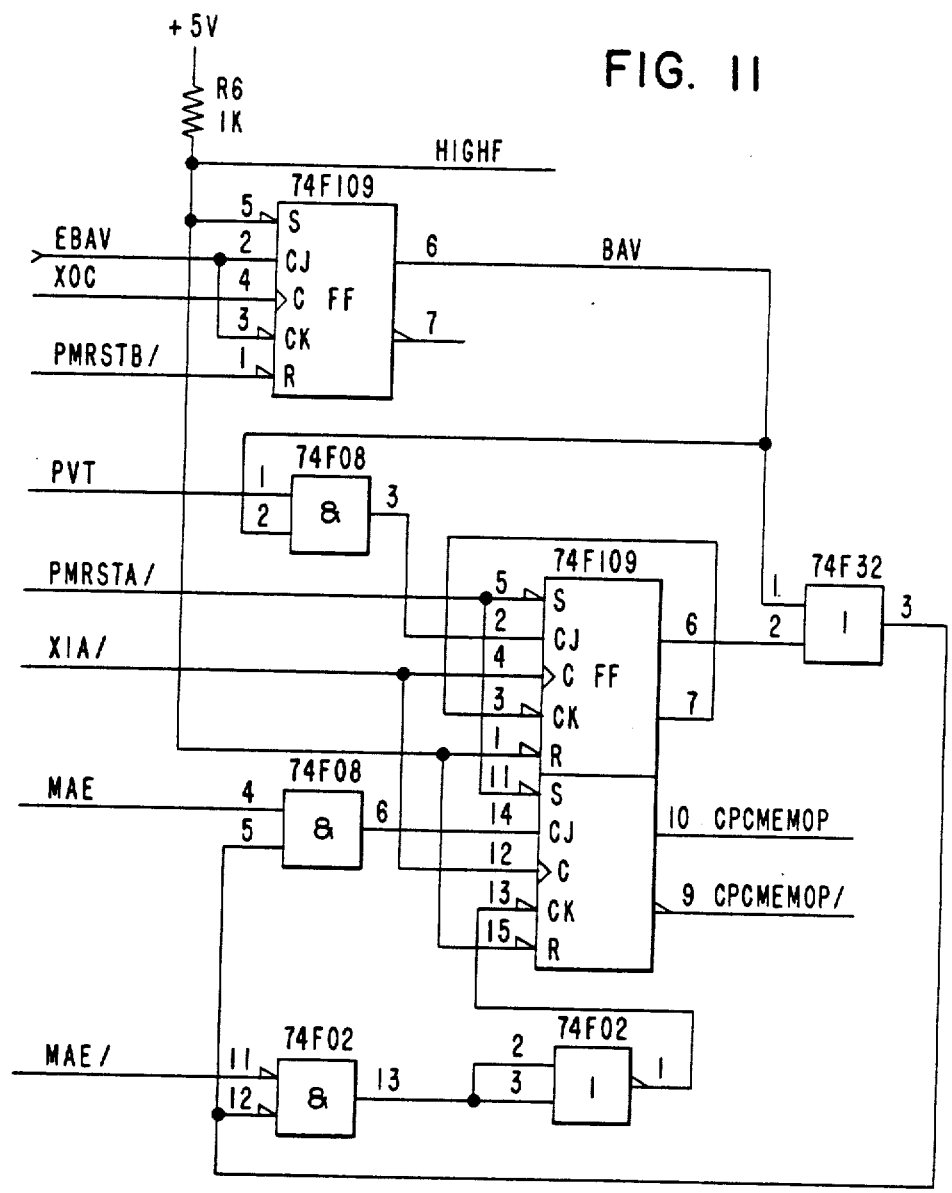
FIG. 11 is a schematic diagram of another portion of the control circuitry of the virtual command rollback module.
Figure 12A:
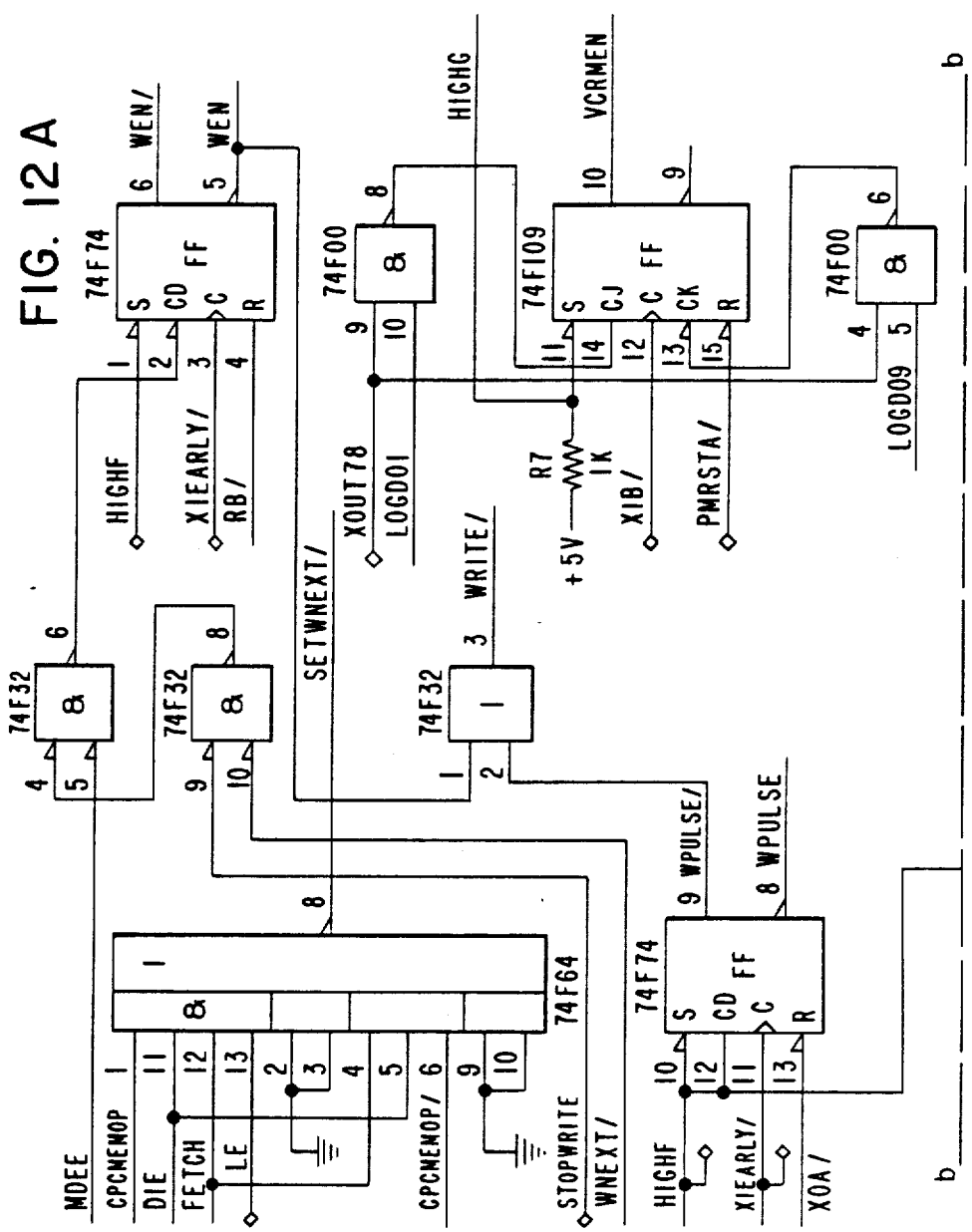
FIGS. 12A and 12B, when joined along line b—b, form a schematic diagram of another portion of the control circuitry of the virtual command rollback module.
Figure 12B:
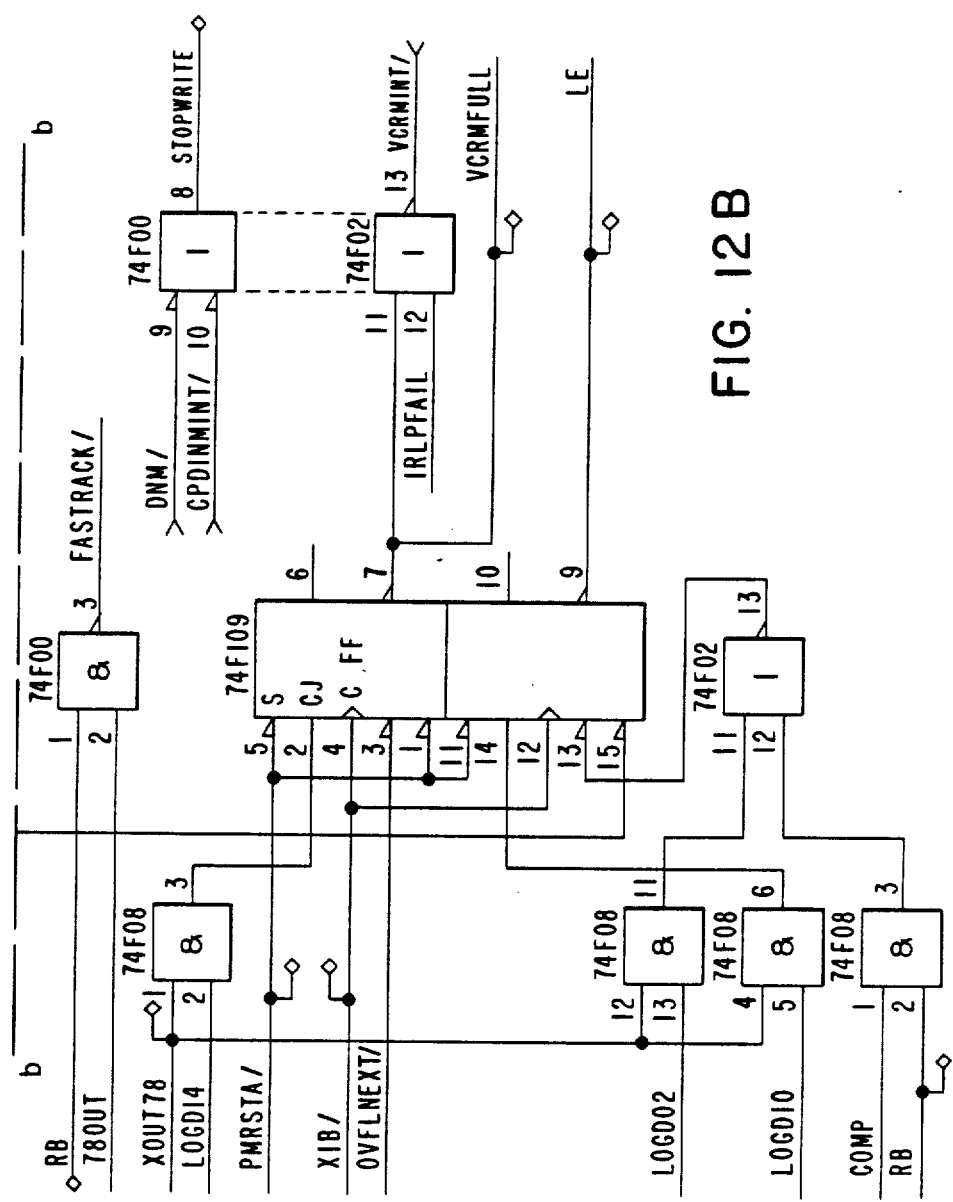

FIGS. 5, 6 and 7 are block diagrams of components of the DINM modules 46 of FIGS. 1A and 1B. FIG. 5 is a block diagram of a circuit in the DINM 46 for making a data compare. The PBDAT bus 52 of the PM bus 50 of FIGS. 1A and 1B is connected to a transceiver 150, whose output is connected to a latch 151 and the input of a driver circuit 152. The output of latch 151 is connected to one input of a comparator circuit 153. The SBDAT bus 58 of the secondary PM bus 56 of FIGS. 1A and 1B is connected to a transceiver 154 whose output is connected to a second input of the comparator input 153. The output of the driver circuit 152 is connected by bus 155 to the transceiver circuit 154. When data is to be sent from the virtual command processor subsystem 10 of FIGS. 1A and 1B to the memory subsystem 14, the data is placed on the PBDAT bus 52 by the BPSMP modules 18, and the same data is placed on the SBDAT bus 58 by the BPSMS modules 20. The transceiver 150 of FIG. 5 takes the data from the PBDAT bus 52 and places it in the latch 151 and on one input of the comparator circuit 153. The transceiver 154 takes the data from the SBDAT bus 58 and places it on the other input of the comparator 153. If the data does not compare, an error signal (DATACMP/) is placed on an output 156 of the comparator circuit 153. When data is fetched by the virtual command processor subsystem 10 from the memory subsystem 14 of FIGS. 1A and 1B, the data is actually fetched over the PBDAT bus 52 of the primary PM bus 50. A driver 152 is included in the circuit of FIG. 5 to take the data received by the transceiver 150 from the PBDAT bus 52 and place it over bus 155 to the transceiver 154 to be placed on SBDAT bus 58, such that both of the processor subsystem modules BPSMP 18 and BPSMS 20 may receive the same data. In this case, the processor of both modules 18 and 20 issue, for instance, fetch commands to the main memory, and receive data back from the main memory such that the processor in the modules 18 and 20 may continue with their execution, even though only the fetch command from the processor of module 18 actually fetched the data from the memory subsystem 14. The transceivers 150 and 154 may be made from 74F245 devices available from Fairchild, the latch 151 may be 74F534 devices available from Fairchild, the driver 152 may be 74F244 devices available from Fairchild, and the comparator circuit 153 may be made from 74F521 devices available from Fairchild.

FIG. 6 is a block diagram of a circuit for comparing the addresses outputted by the BPSMP module 18 with the addresses outputted by the BPSMS module 20 of FIGS. 1A and 1B. The PAD bus 54 of the primary PM bus 50 has its first 8 bits connected to one input of a comparator 160, and bits 9-24 connected to one input of a second comparator 162. The SAD bus 60 of the secondary PM bus 56 has its first 8 bits connected to the other input of comparator 160, and bits 9-24 connected to the other input of comparator 162. The output of comparator 160 provides a comparison signal (ERUADRCMP/) for addresses over the PM buses 50 and 56 directed to an external register unit (ERU). An AND gate 163 has its inputs connected to the comparator circuit 160 and 162, and its output provides a comparison signal (MEMADRCMP/) for addresses directed to the memory subsystem 14 of FIGS. 1A and 1B. The comparator circuit 160 and 162 may be formed of 74F521 devices available from Fairchild.

FIG. 7 is a block diagram of a circuit for providing comparisons of addresses from the processor subsystem modules BPSMP 18 and BPSMS 20 to the instruction storage unit of the WCSM modules 34 and 36. The LISU bus 62 of FIGS. 1A and 1B is connected to one input of a comparator circuit 165, and ISUCHK bus 48 of FIGS. 1A and 1B is connected to the inputs of the latches 166 and 167. The output of latch 166 is connected to another input of the comparator circuit 165. Returning to FIG. 4, it can be seen that addresses placed on the ISU bus 38 will be passed to the LISU bus 62 through latch 126. Looking at FIGS. 1A and 1B, ISU addresses placed on the ISUCHK bus 42 by the BPSMS modules 20 are directed to the DINM module 46 by the bus 48. Returning the FIG. 7, a primary ISU address is inputted into the comparator circuit 165 over bus 62 and a secondary ISU address is inputted into the comparator 165 over bus 48 through latch 166. A miscompare by the comparator circuit 165 raises an trap signal (TRAP/) on conductor 168 which causes a trap for both of the processors in the modules 18 and 20. The ISUCHK bus 48 is also connected to a latch 167, as explained, whose output is connected to a parity error checker circuit 170. If a parity error is discovered by circuit 170, a parity error signal (PERR/) is asserted on conductor 171. Thus, the circuit of FIG. 7 detects ISU address errors, and parity errors within the ISU addresses. The comparator circuit 165 may be made up of 74F521 devices available from Fairchild, latches 166 and 167 may be made up of 74F373 devices available from Fairchild, and the parity error detection circuit 170 may be made up of 74S200 devices available from Fairchild.

Returning to FIG. 5, an ERU register 175 is provided which receives the comparison signals from the comparators of FIGS. 5, 6 and 7. The ERU 175 may be interrogated by the CPC 22 of FIG. 2 to determine the correct error recovery routine to execute depending on the miscomparison found. It will be noted that the latch 151 is connected in such a way that it may latch data either from the PBDAT bus 52 received by the transceiver 157, or data from the ERU register 175 to be placed on the PBDAT bus 52. The ERU register 175 may be formed of 74F240 devices available from Fairchild.

It will be understood that similar comparator circuits may be connected to the control portion of the PM busses 50 and 56 of FIGS. 1A and 1B (not shown) to detect miscomparison and control signals from the processor subsystem modules PBSMP 18 and PBSMS 20. Also, selected bits of the PBDAT bus 52 and the SBDAT bus 58 may be separately compared to determine miscomparison on ERU write data, although the comparison circuit FIG. 5 will detect ERU data miscompares. Any of the miscompare signals discussed in connection with FIGS. 5, 6 and 7 causes an interrupt to the processors of the BPSMP modules 18 and the BPSMS modules 20, and the miscompare signals are placed in an ERU register such that the interrupted processors may query the interrupt signals. It will be noted that the processors of both of the BPSMP modules 18 and BPSMS modules 20 are interrupted and perform a proper interrupt routine in parallel to correct a detected miscompare. As previously mentioned, the DINM module 94 of FIGS. 1A and 1B is similar to the DINM module 46 for detecting miscompares in the IO subsystem 12. However, the ISU comparison of FIG. 7 is not used in the DINM module 94, as only the IO data and IO addresses are being compared.

FIGS. 8A-41B, when taken together, form a schematic diagram of the VCRM module 64 of FIGS. 1A and 1B. All of the input and output lines of FIGS. 8A-41B have been labeled to assist in their correct connection. Each element is shown using its standard symbol, including pin numbers, and labeled with its industry standard part number. The symbols for the two-state devices are from the IEEE Standard Graphic Symbols for Logic Diagrams (Two-State Devices), IEEE 91-1973, ANSI Y32.14-1973, published by the Institute of Electrical and Electronics Engineers, 345 East 47th Street, New York, N.Y. 10017.

Figure 13A:
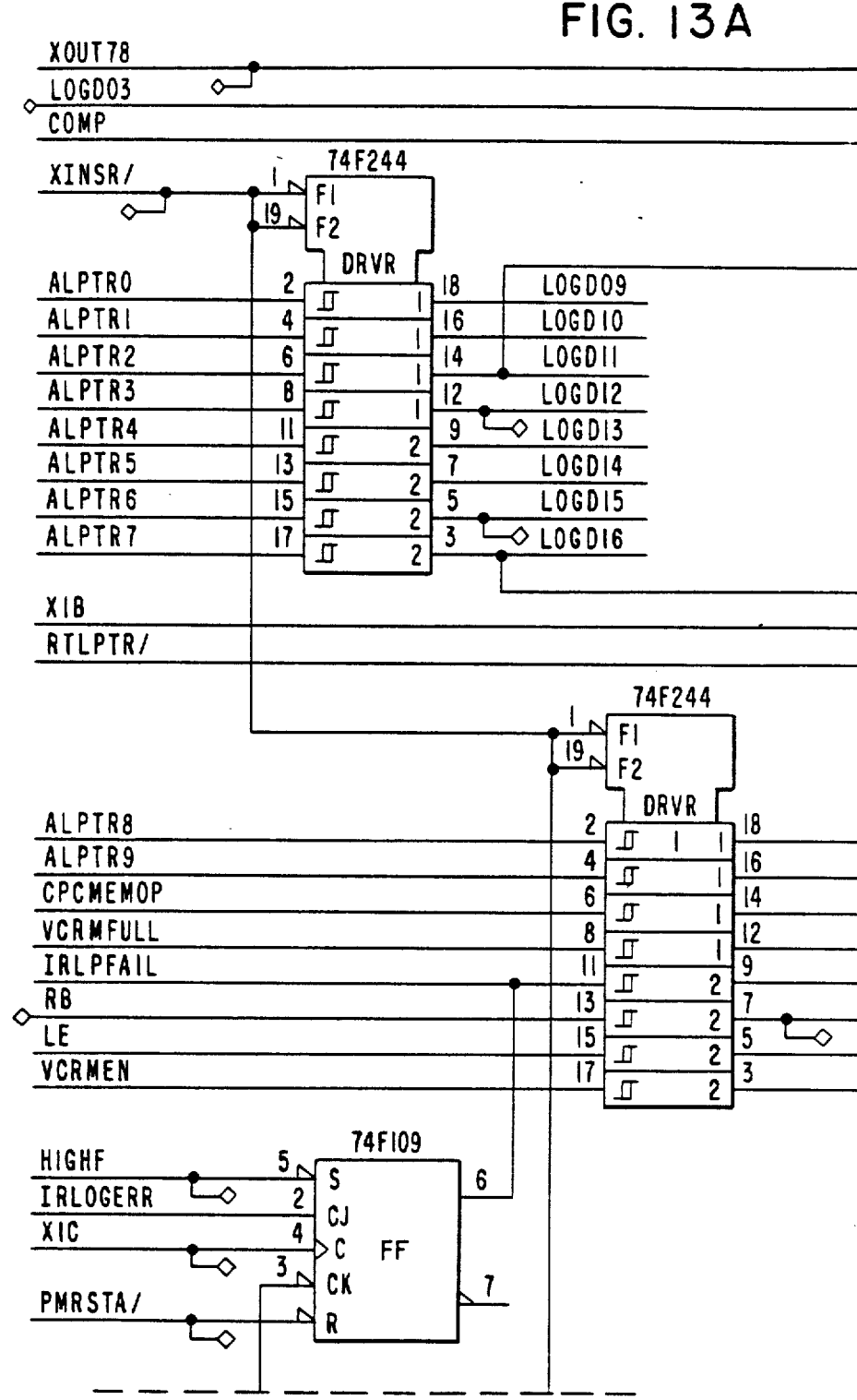
FIG. 13 is a map which shows the relationship of FIGS. 13A, 13B and 13C, which, when taken together, form a schematic diagram of a status register of the virtual command rollback module.
Figure 13B:
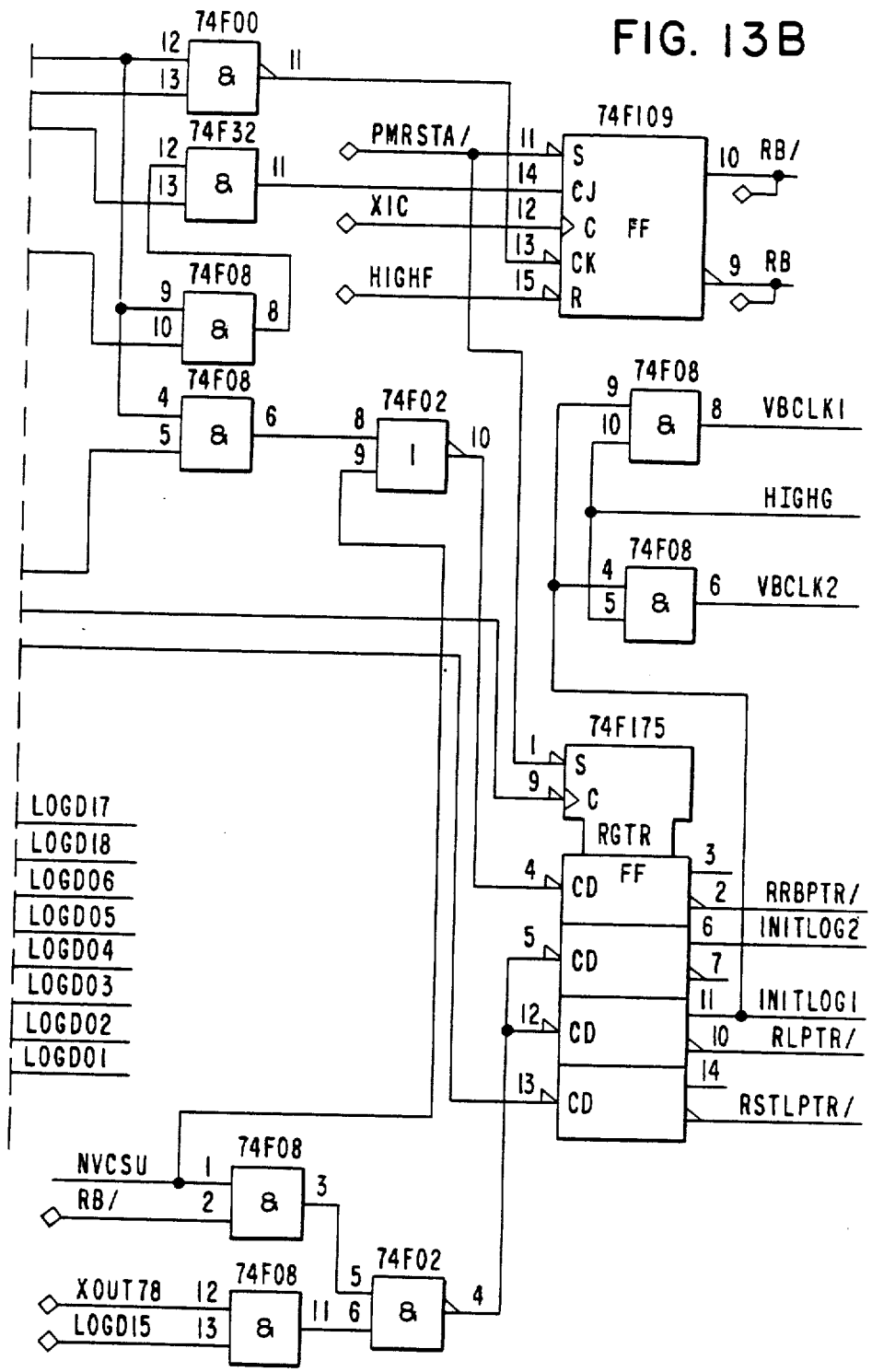
Figure 14A:
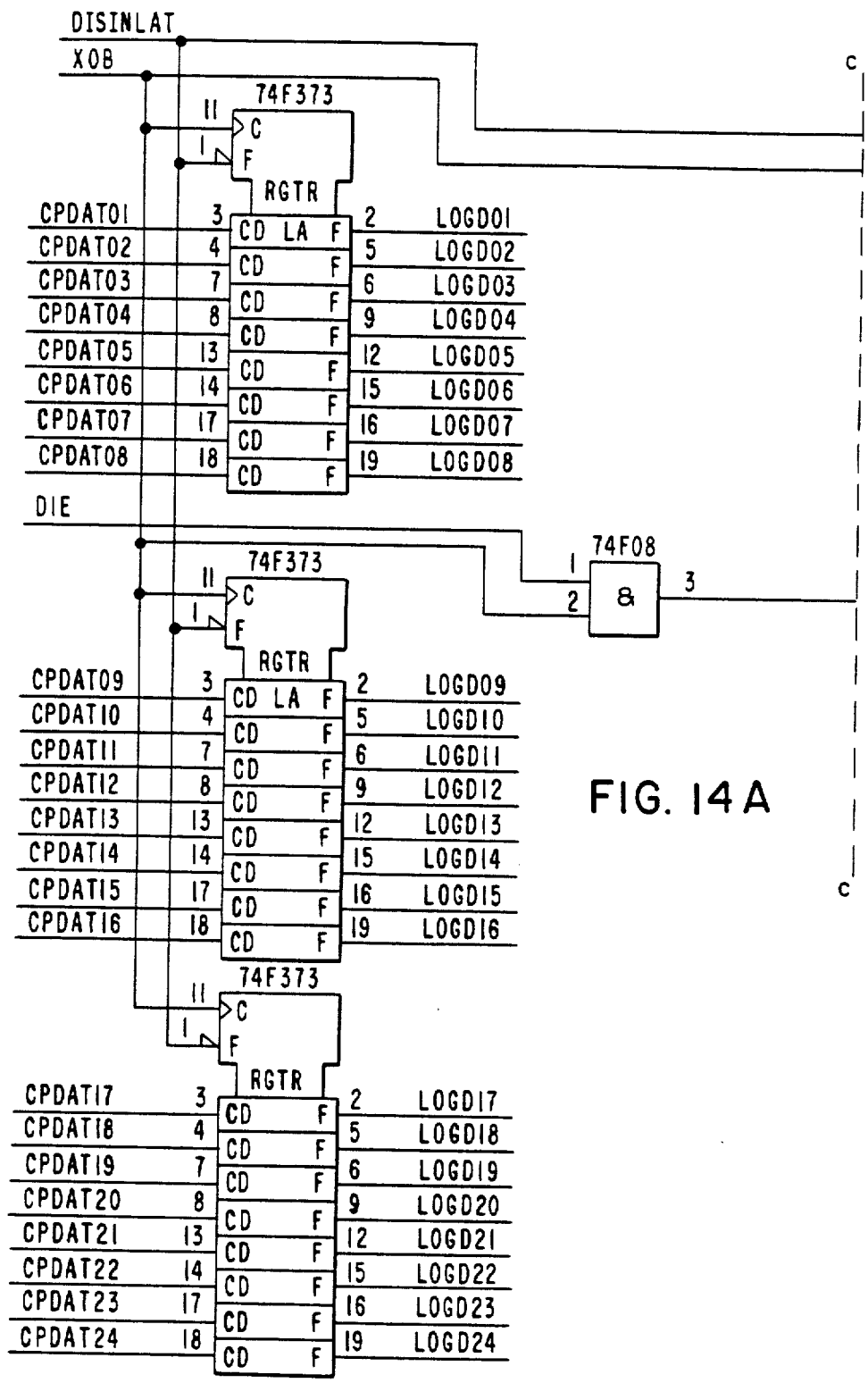
FIGS. 14A and 14B, when joined along line c—c, form a schematic diagram of a data input register of the virtual command rollback module.
Figure 14B:
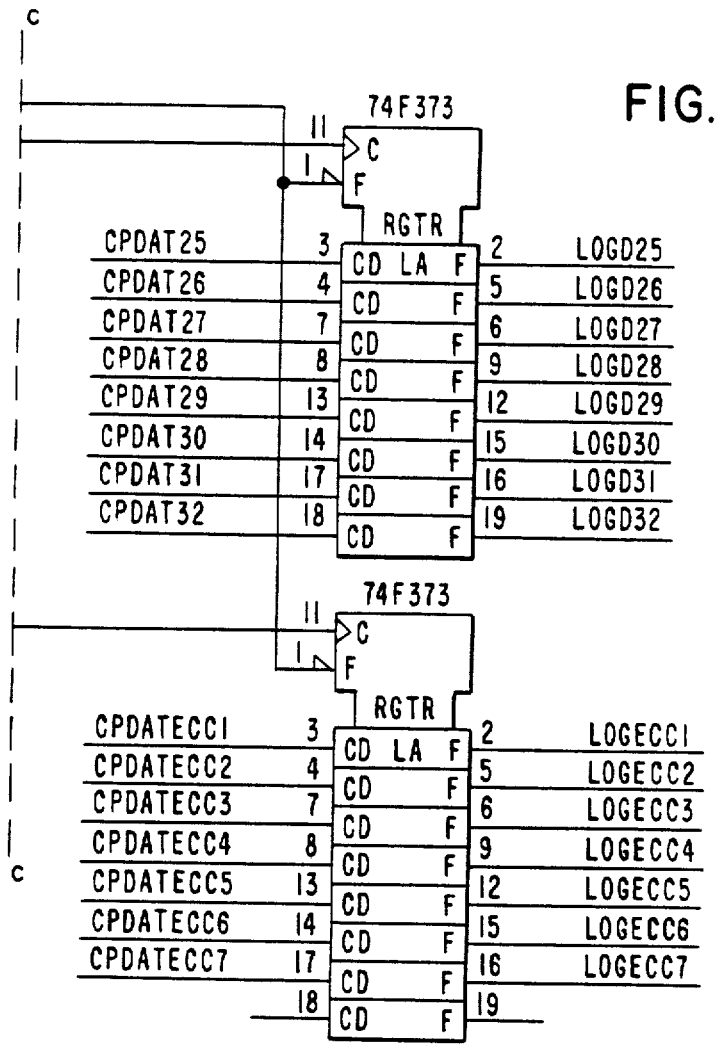
Figure 15:
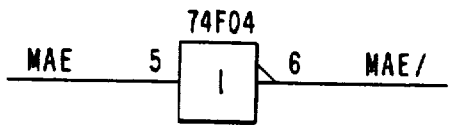
FIG. 15 is an inverter which is a part of the control circuitry of the virtual command rollback module.

FIGS. 13A-13C, when assembled as shown in FIG. 13, is a schematic diagram of an ERU register which is used as a status register, ERU 78IN. Status register ERU 78IN may be interrogated by any module or VLSI chip having ERU communication capabilities to receive the status of the VCRM module 64. FIGS. 14A and 14B, when joined along line c—c, form a schematic diagram for an input latch for receiving data from the PBDAT bus 52 of FIGS. 1A and 1B (labeled CPDAT0-1-CPDAT32). FIGS. 16A-16D, when assembled in accordance with FIG. 16, form a schematic diagram of a driver circuit for outputting data on the PBDAT bus 52.

Figure 18:
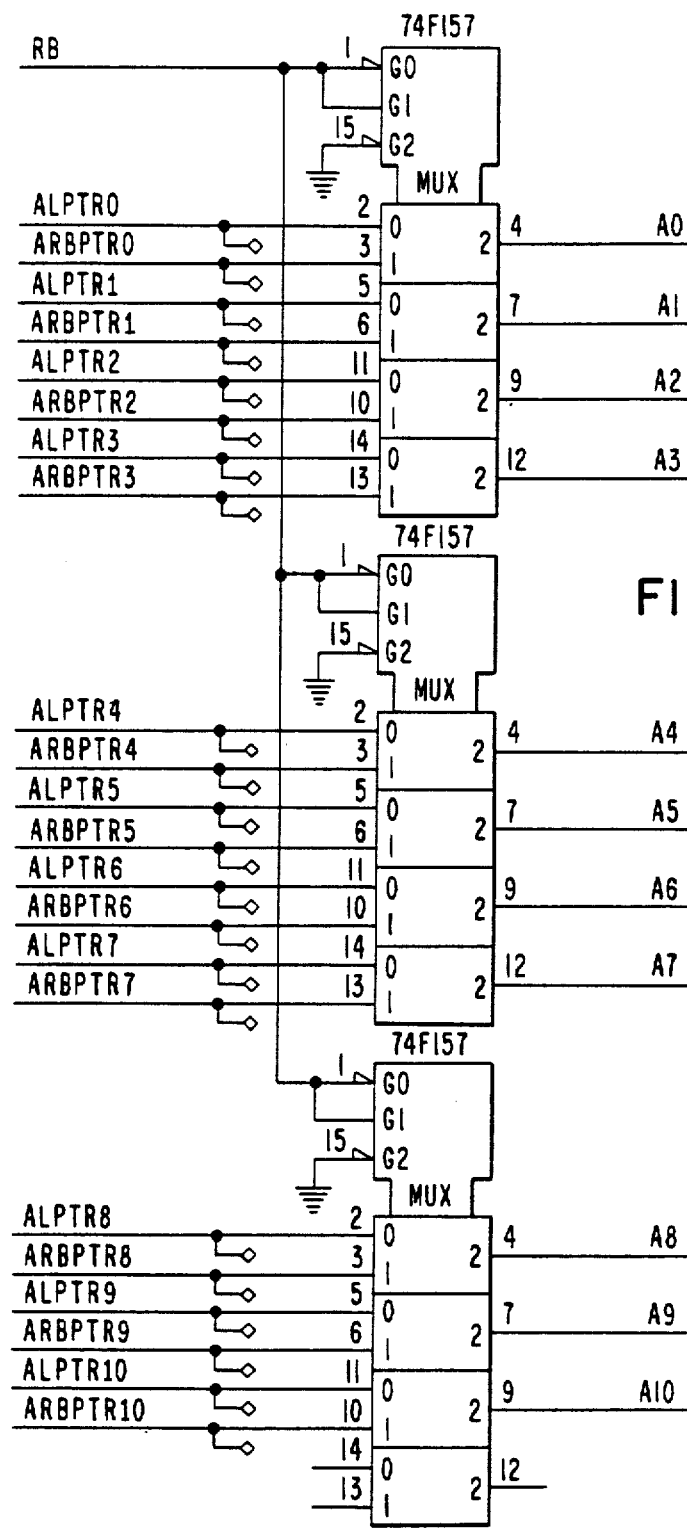
FIG. 18 is a schematic diagram of a multiplexer of a fetch log of the virtual command rollback module.
Figure 19:
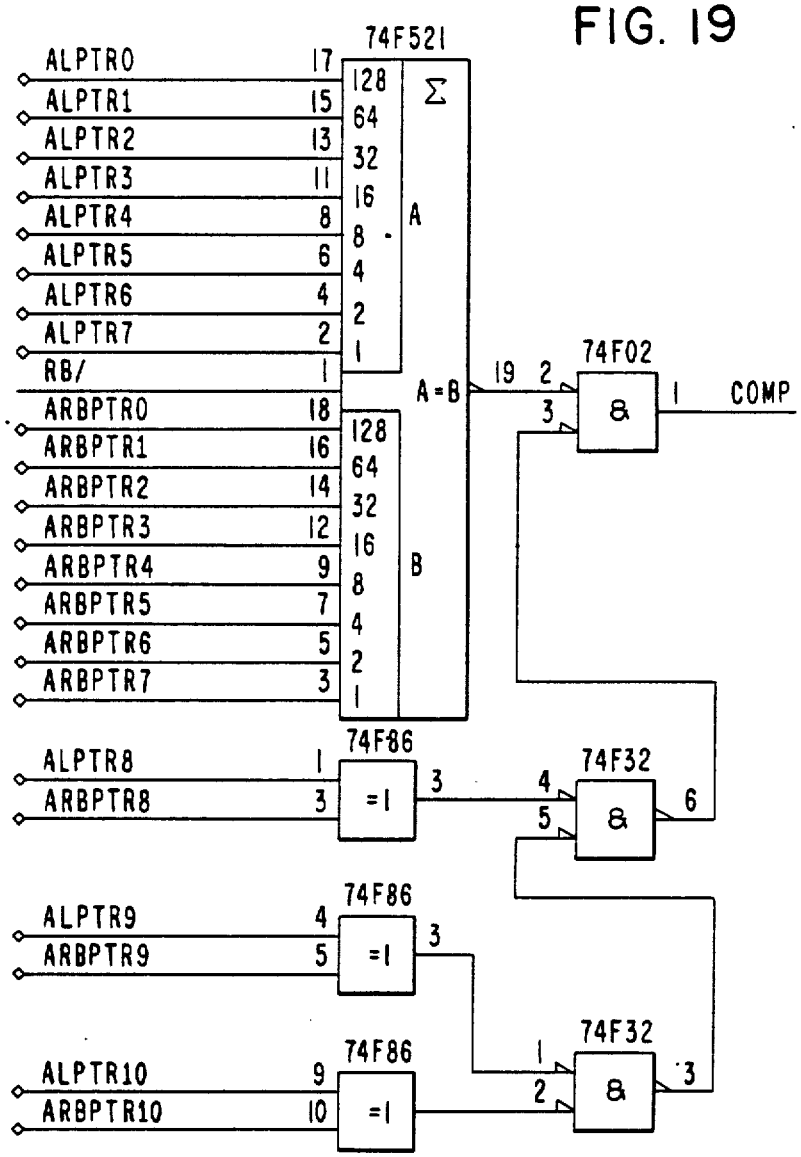
FIG. 19 is a schematic diagram of a comparator of the fetch log of the virtual command rollback module.
Figure 20B:
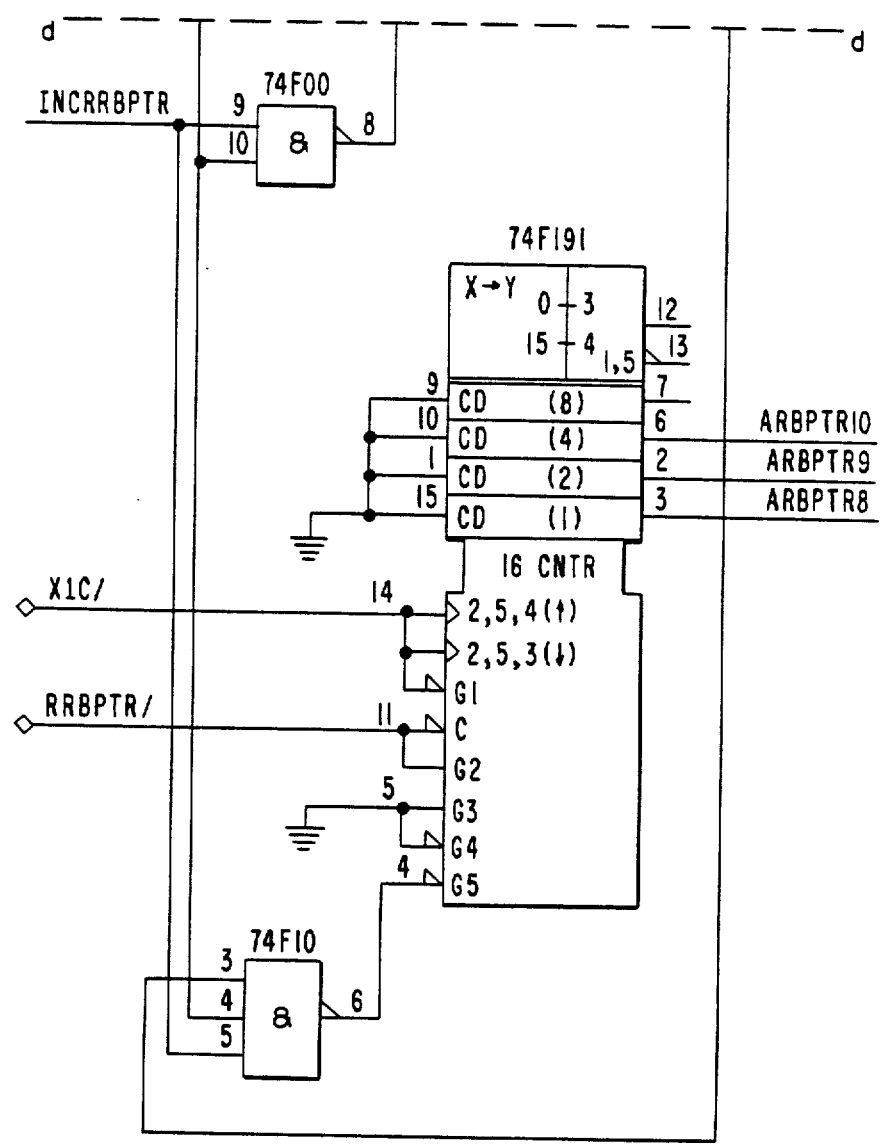
Figure 21A:
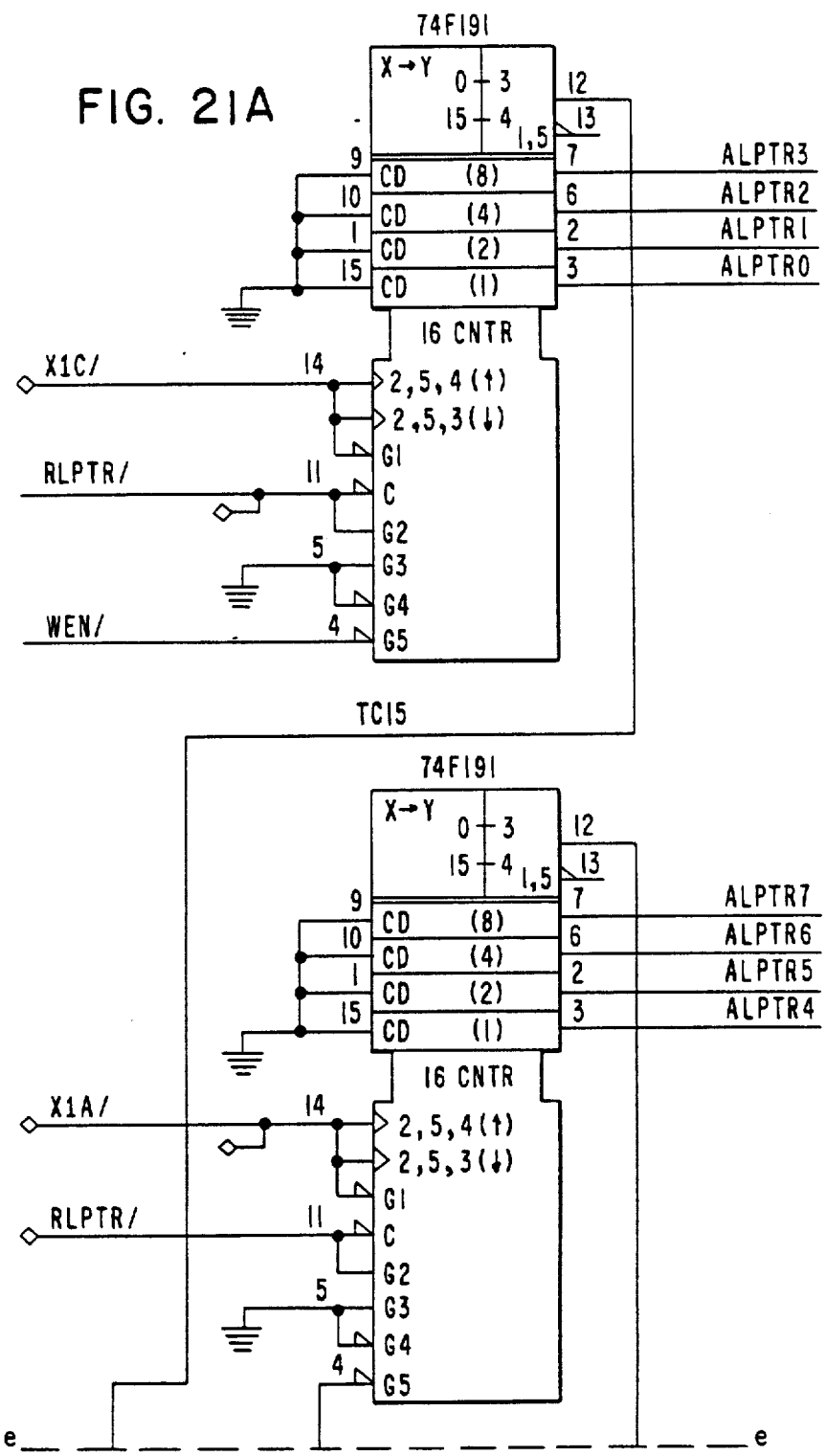
FIGS. 21A and 21B, when joined along line e—e, form a schematic diagram of another portion of the counter of FIGS. 20A and 20B.
Figure 21B:
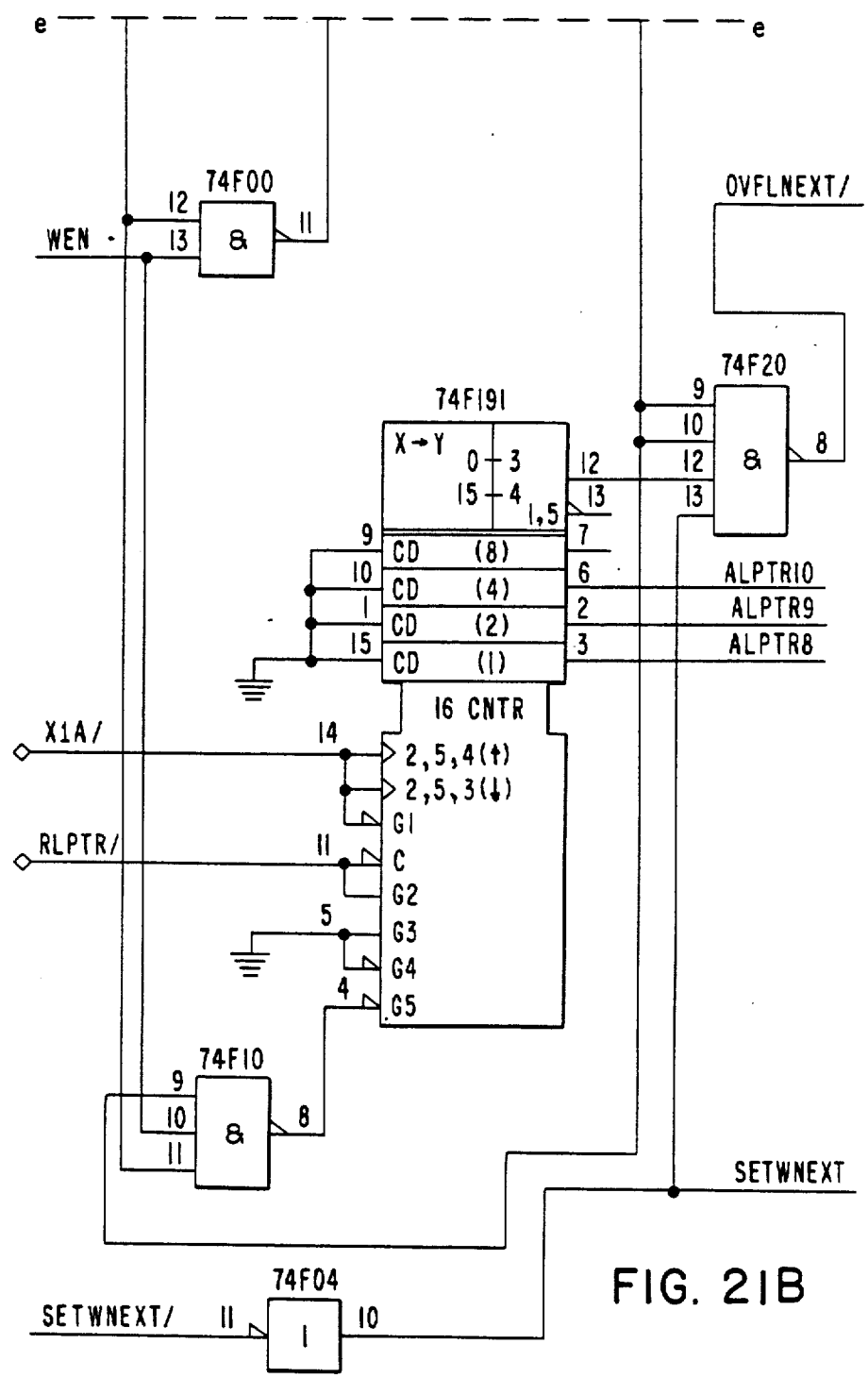
Figure 22:
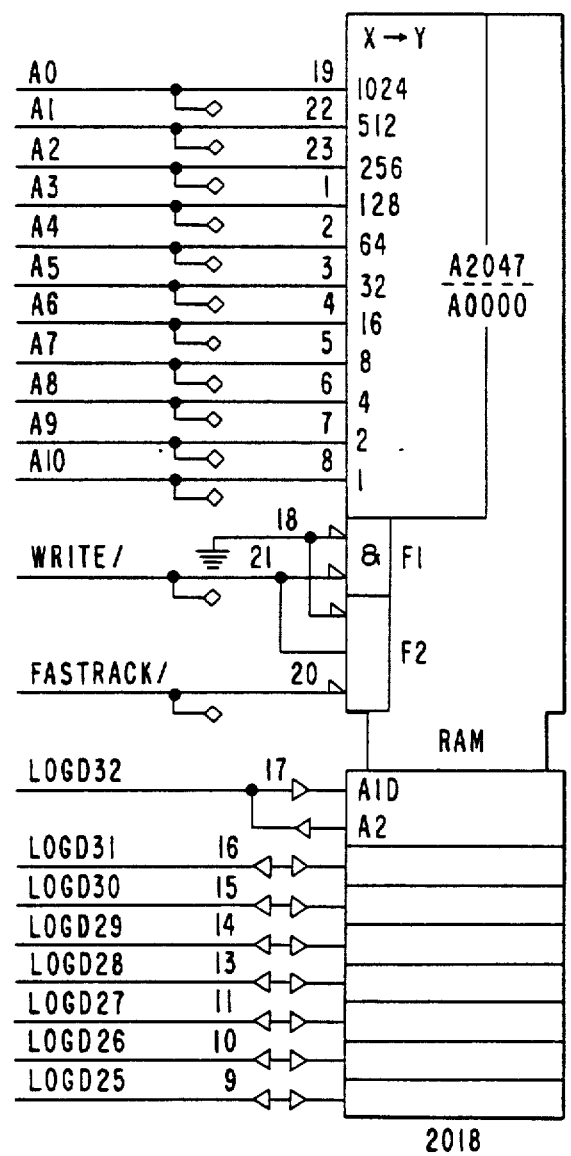
FIG. 22 is a schematic diagram of a portion of the memory of the fetch log of the virtual command rollback module.
Figure 23:
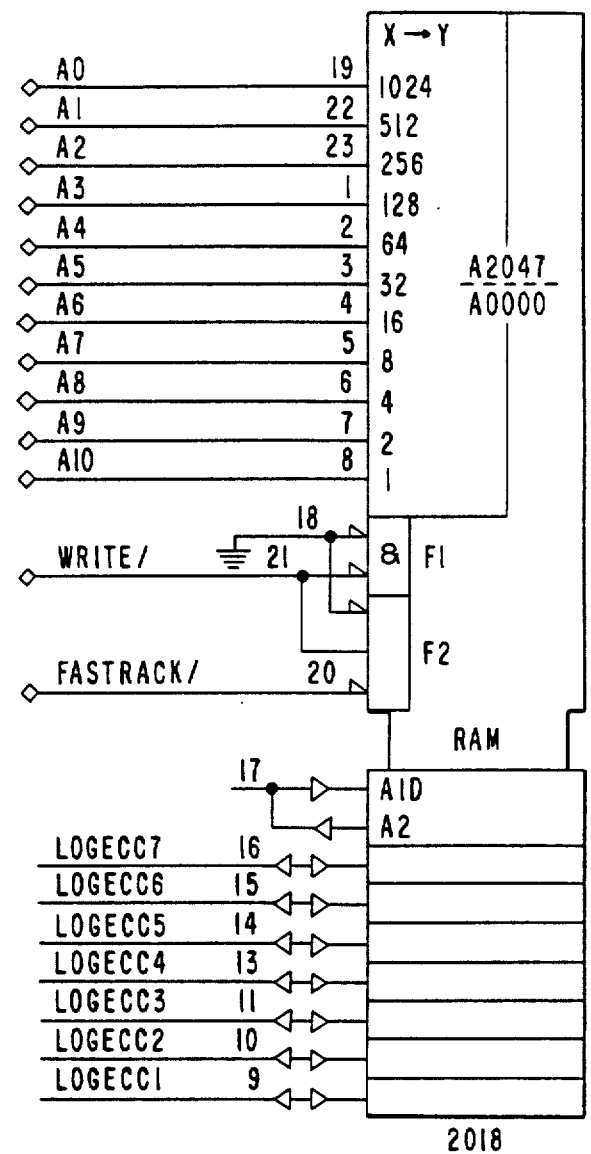
FIG. 23 is a schematic diagram of another portion of the memory of FIG. 22.
Figure 24:
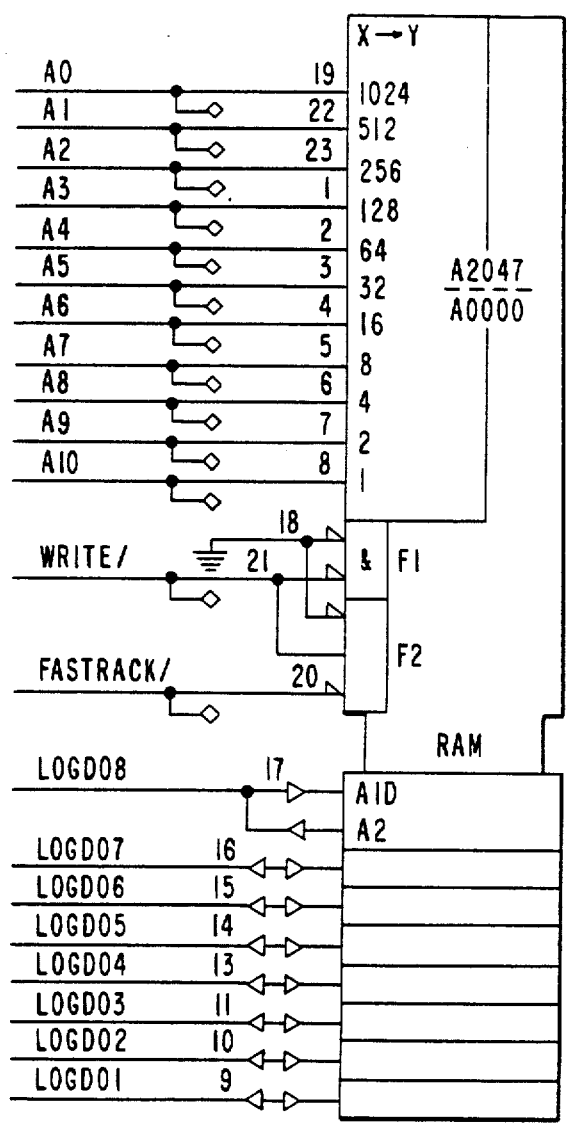
FIG. 24 is a schematic diagram of another portion of the memory of FIG. 22.
Figure 25:
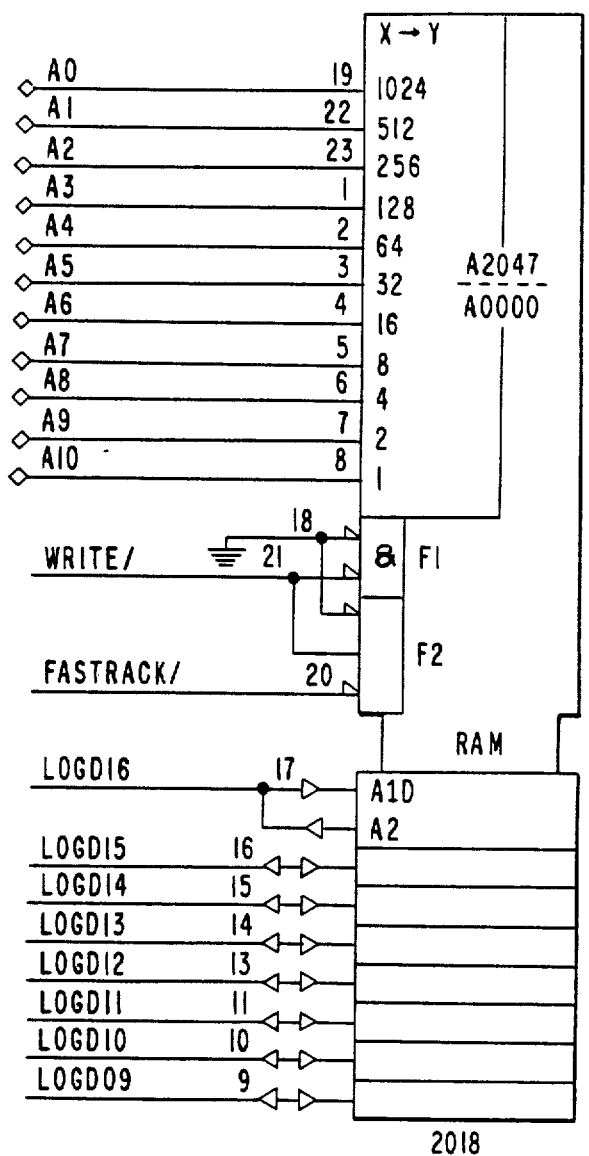
FIG. 25 is a schematic diagram of another portion of the memory of FIG. 22.
Figure 26:
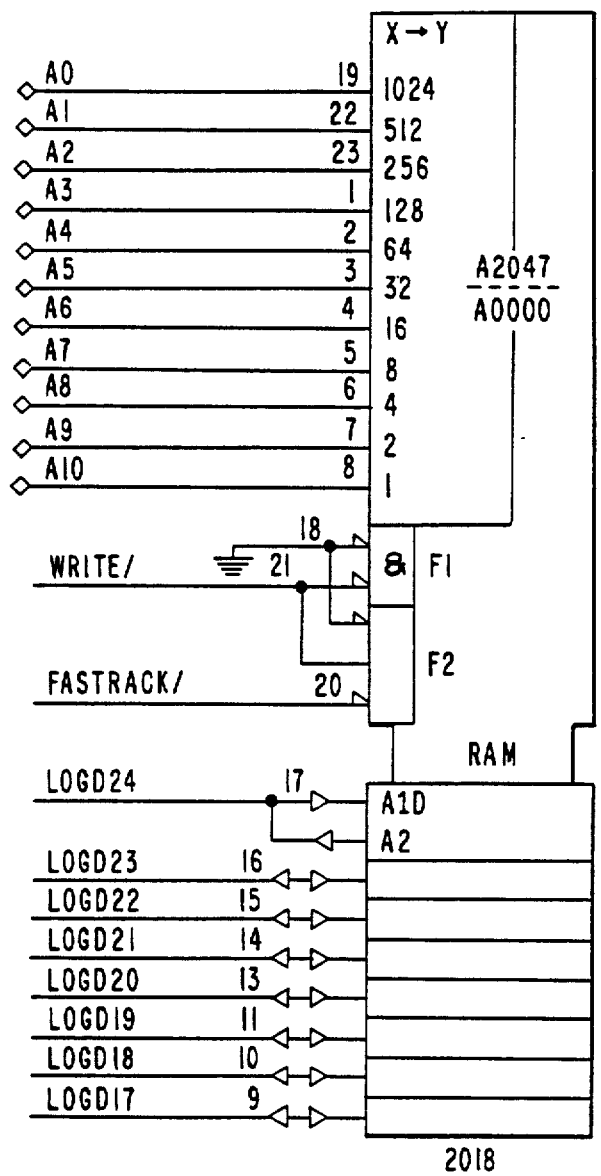
FIG. 26 is a schematic diagram of another portion of the memory of FIG. 22.
Figure 27:
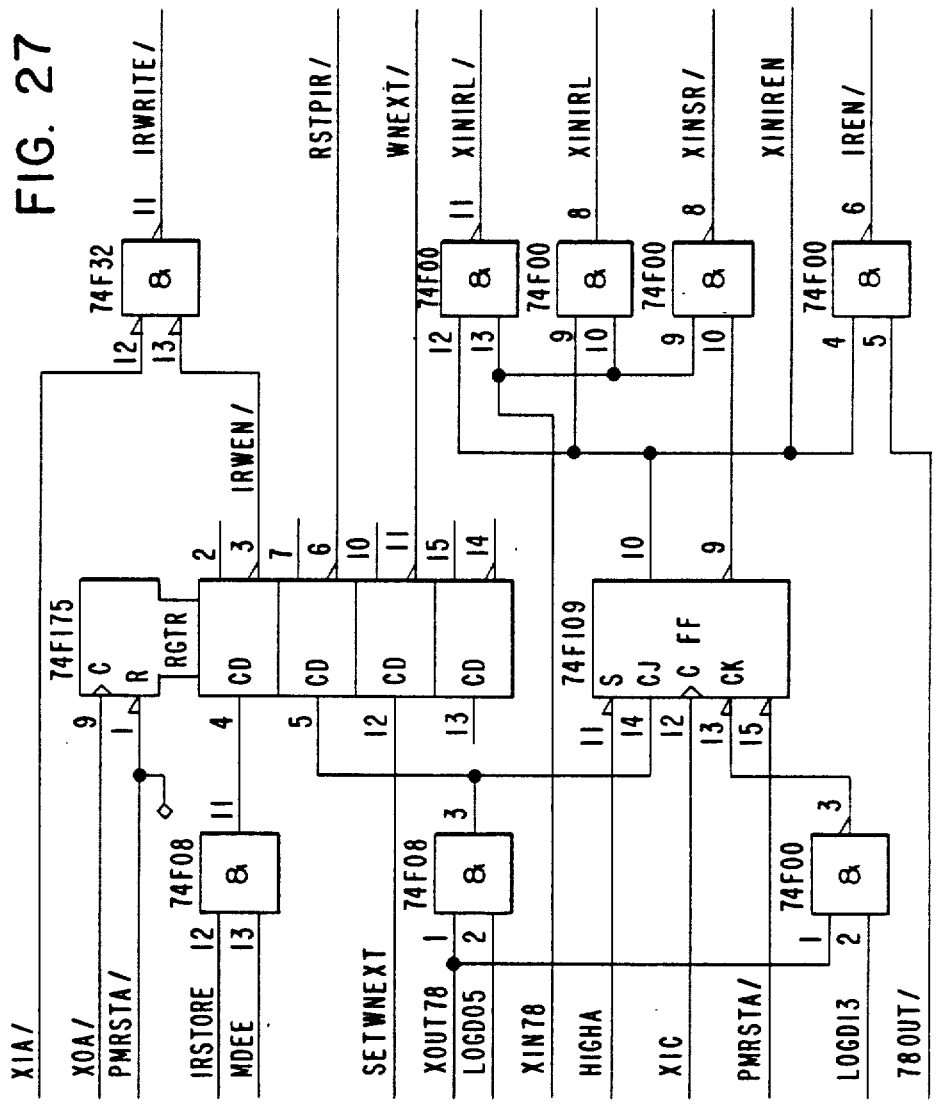
FIG. 27 is a schematic diagram of a portion of the control circuit of the virtual command rollback module.

FIGS. 22-26 are schematic diagrams of the RAM chips which form the aforementioned fetch log of the VCRM 64. It will be noted in FIGS. 22-26, that the address for the fetch log is made up of signals A0-A10. FIG. 18 is a schematic diagram of a multiplexer for multiplexing one of either the signals ALPTR0-ALPTR10 or the signals ARBPTR0-ARBTR10 to the A0-A10 signals. The ALPTR0-ALPTR10 signals are used to form the fetch log address until a miscompare is found. The logic of the VCRM module 64 then rolls back the address of the fetch log, using the ARBPTR0-ABRPTR10 signals for the address. If the ARBPTR address is increased until it reaches the ALPTR address, as determined by the comparator of FIG. 19, without another error occurring, the rollback is complete and the processor continues as it was before rollback. FIGS. 20A and 20B, joined along line d—d, is a schematic of a counter for counting the ARBPTR address. FIGS. 21A and 21B, joined along line e—e, is a schematic of a counter for counting the ALPTR address.

FIGS. 31-35 are schematic diagrams of the RAM chips which form the aforementioned index register log of the VCRM module 64. These RAM chips provide a memory which stores two sets of 15 registers, each 32 bits and 4 parity bits wide. As mentioned, one set of registers is for storing copies of the original index registers at the start of a virtual command, and one set of registers is for storing copies of any index registers which are modified during execution of the virtual command. It will be noted that the address for the RAM chips of FIGS. 31-35 is formed by the IRA0-IRA4 signals. The IRA0 bit determines which one of the two index registers at each location in the IR log is the original or valid index register, and which one is the modified copy of an index register.

Figure 28A:
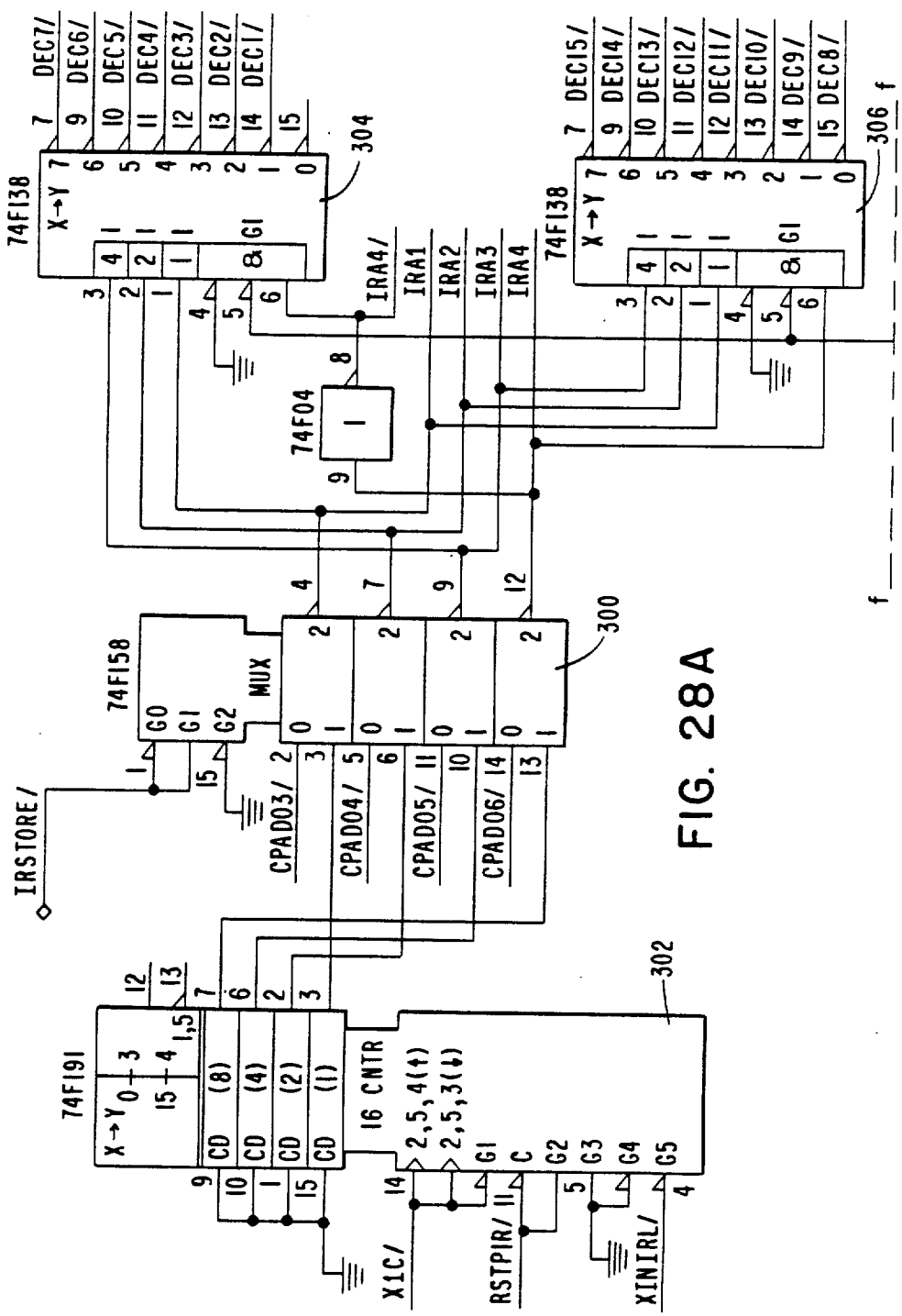
FIGS. 28A and 28B, when joined along line f—f, form a schematic diagram of a decoder circuit for decoding an address for use by an index register log of the virtual command rollback module.
Figure 28B:
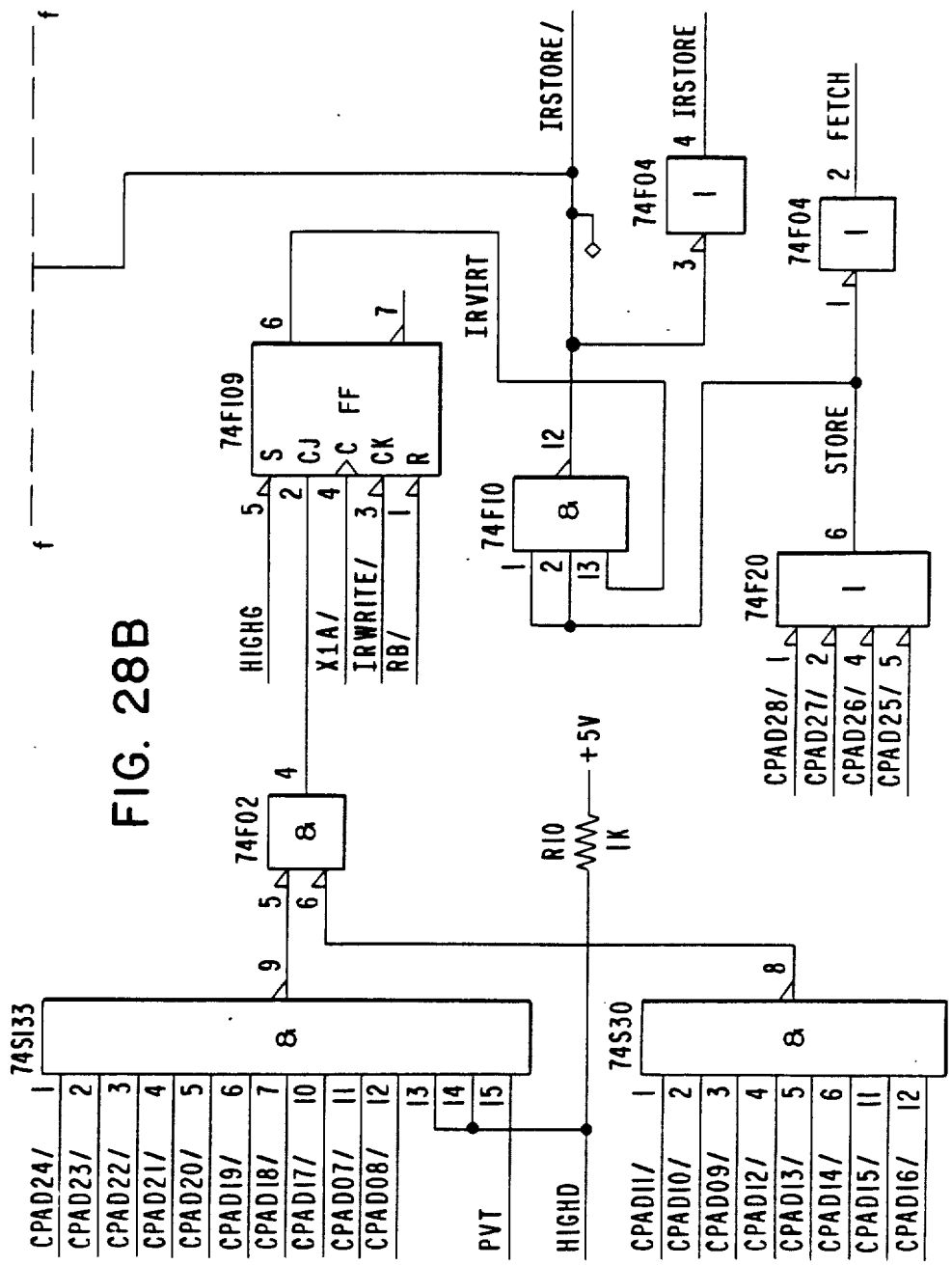
Figure 29A:
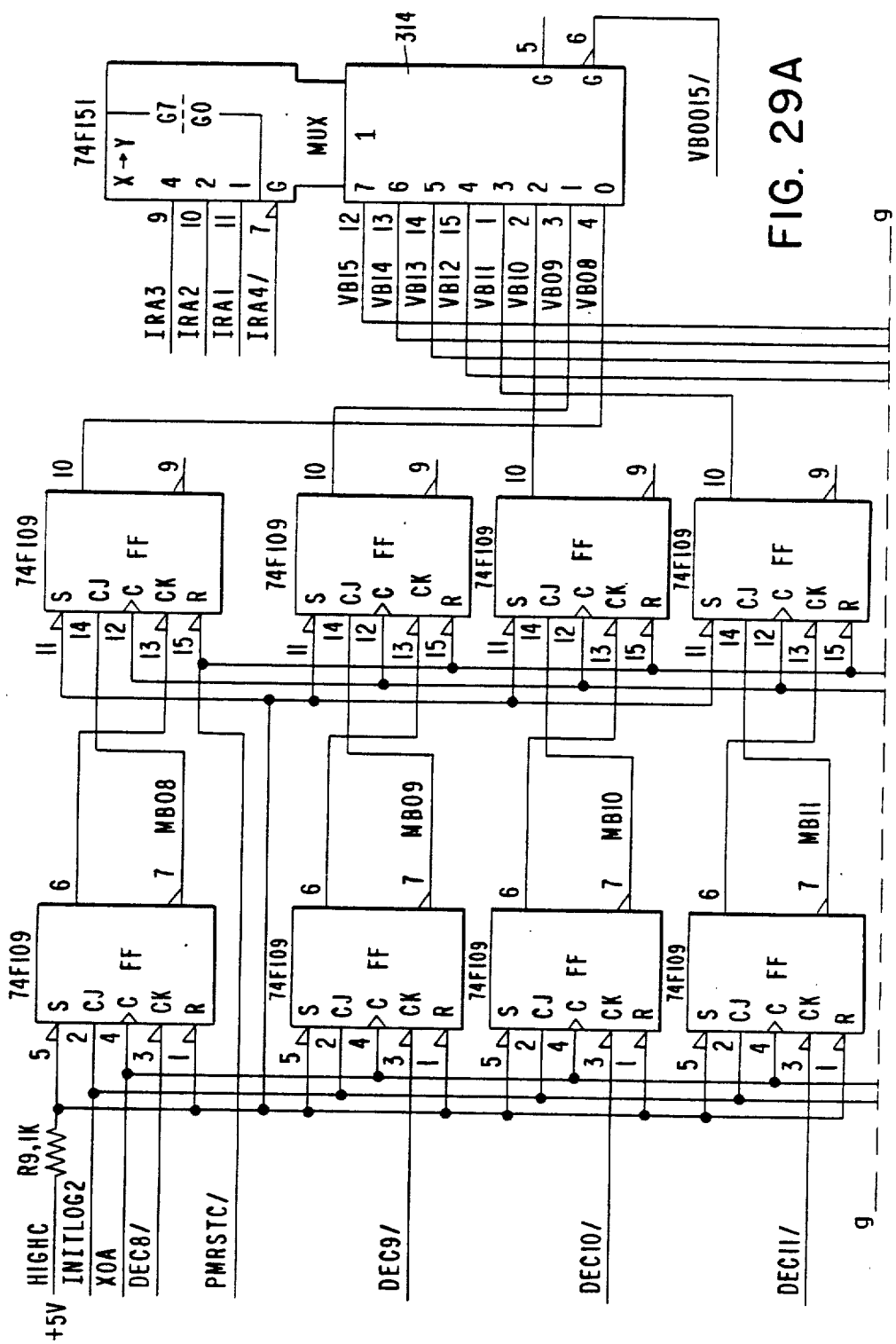
Figure 30A:
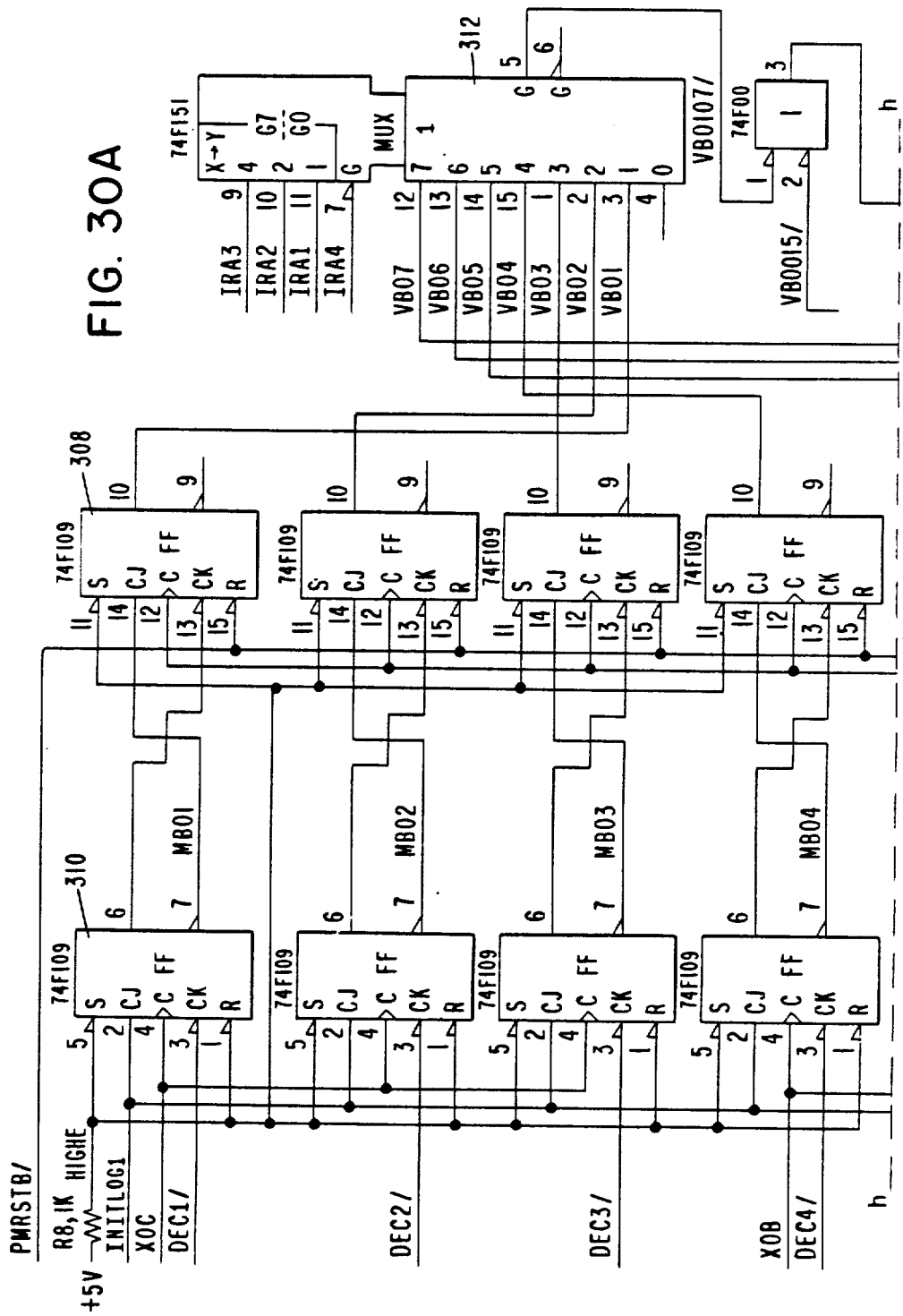
FIGS. 30A and 30B, when joined along line h—h, for a schematic diagram of another portion of the flip/flops of FIGS. 29A and 29B.
Figure 30B:
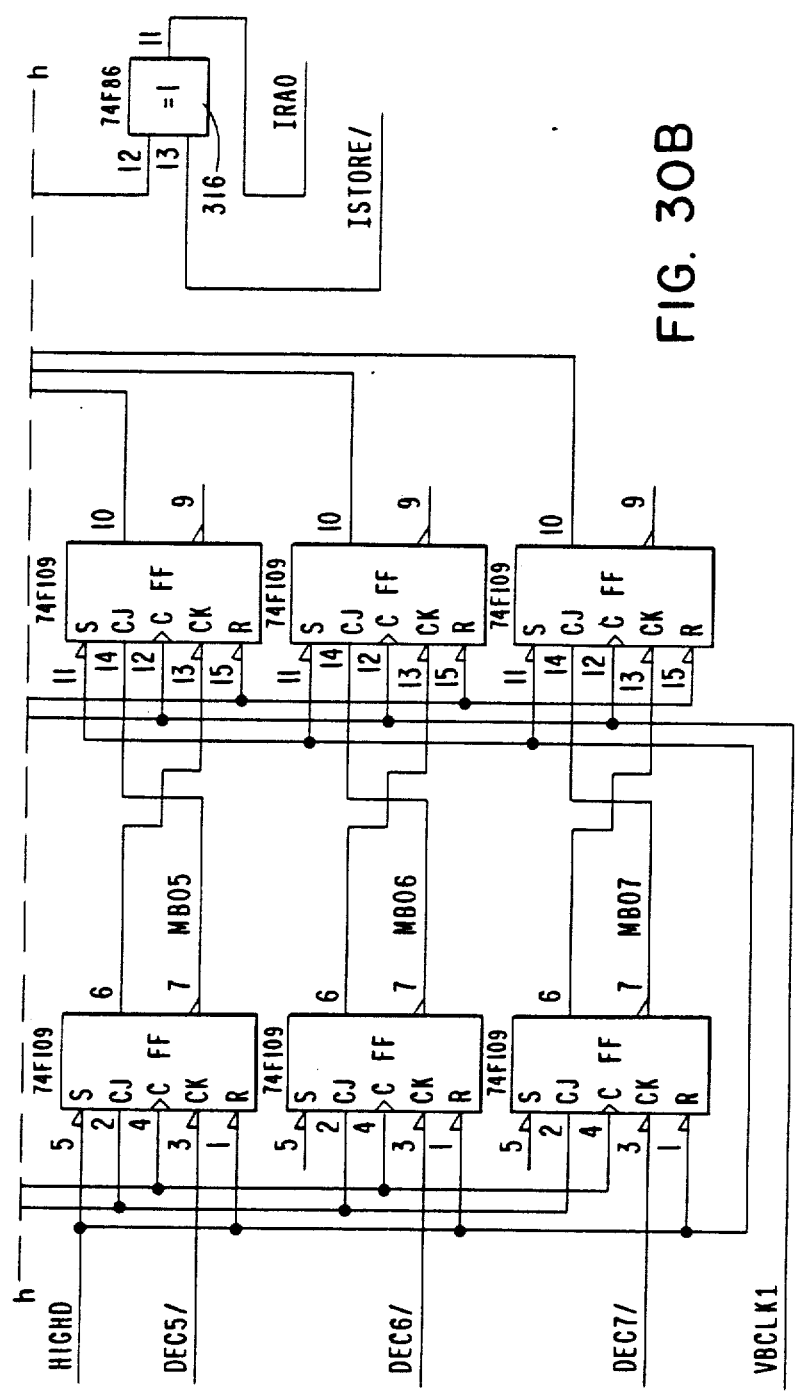
Figure 31:
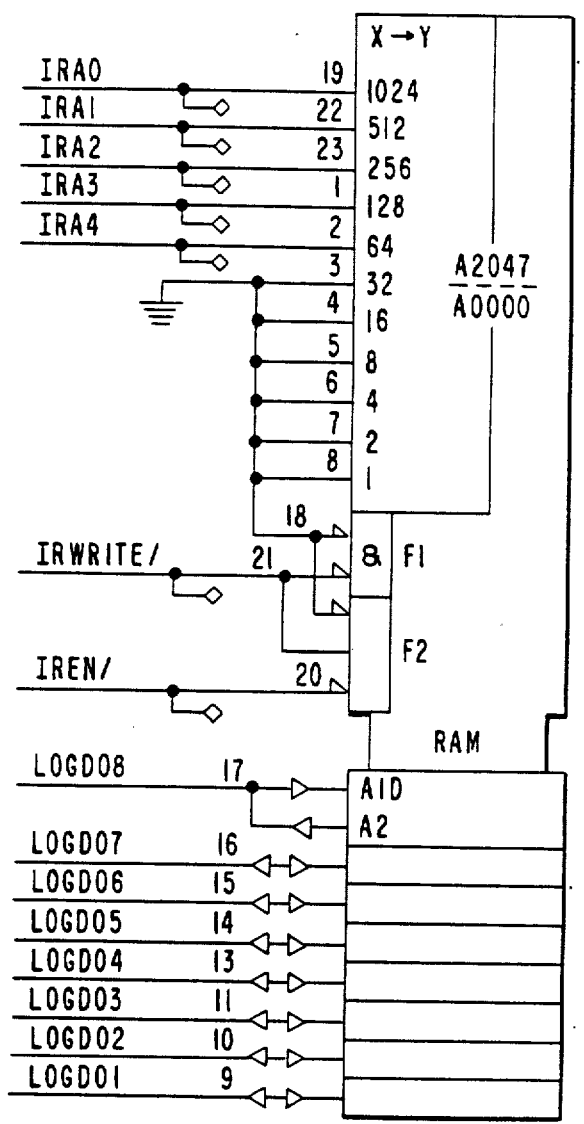
FIG. 31 is a schematic diagram of a portion of the memory of the index register log of the virtual command rollback module.
Figure 32:
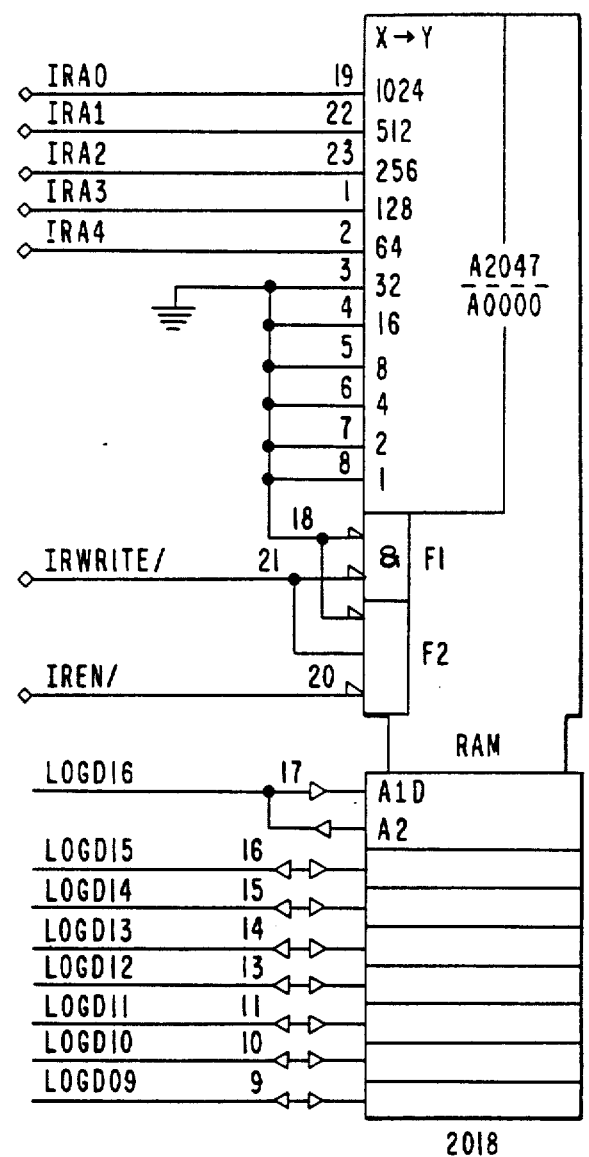
FIG. 32 is a schematic diagram of another portion of the memory of FIG. 31.
Figure 33:
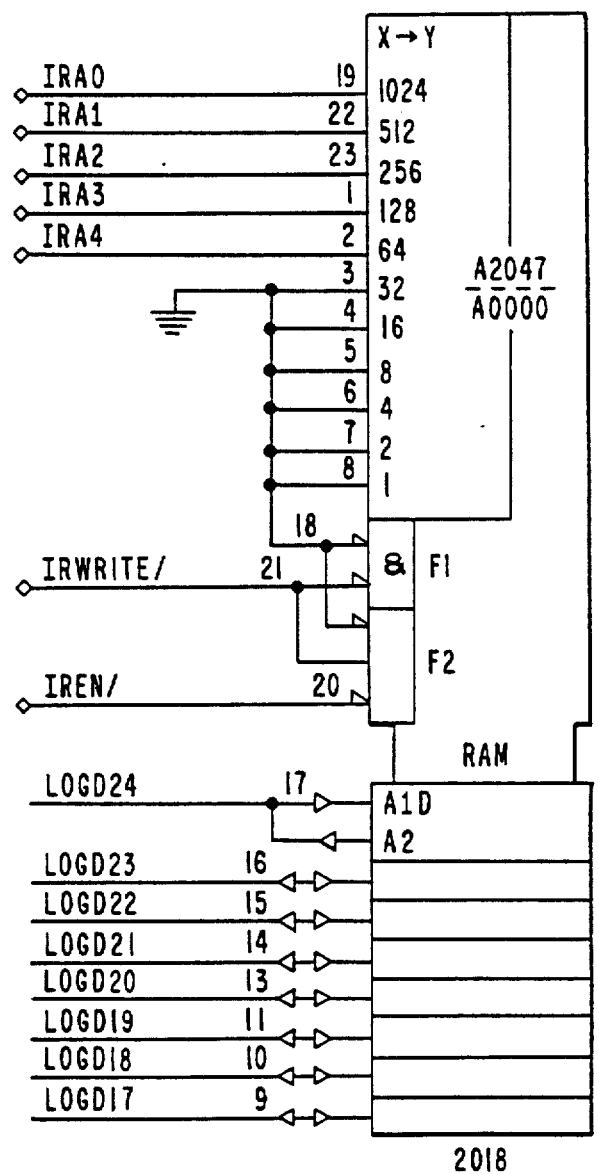
FIG. 33 is a schematic diagram of another portion of the memory of FIG. 31.
Figure 34:
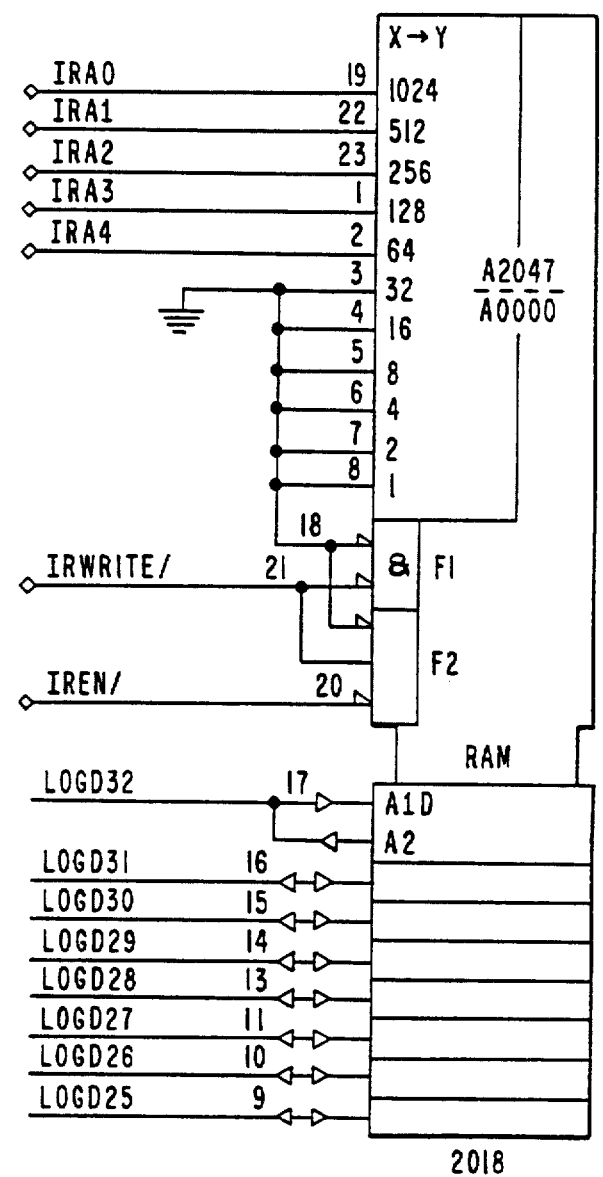
FIG. 34 is a schematic diagram of another portion of the memory of FIG. 31.
Figure 35:
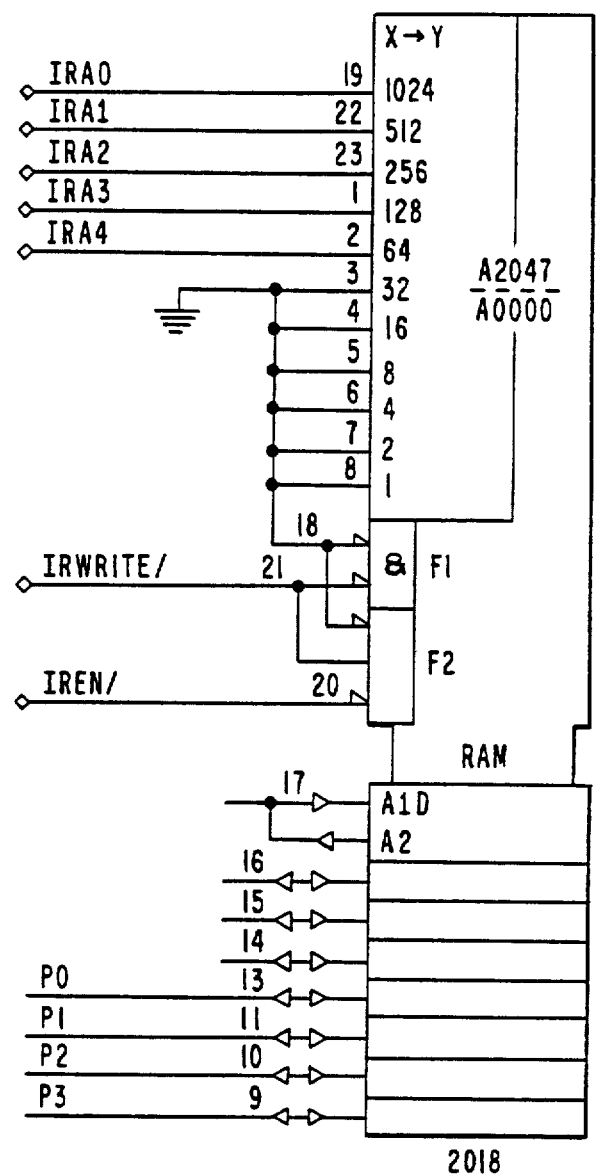
FIG. 35 is a schematic diagram of another portion of the memory of FIG. 31.
Figure 36A:
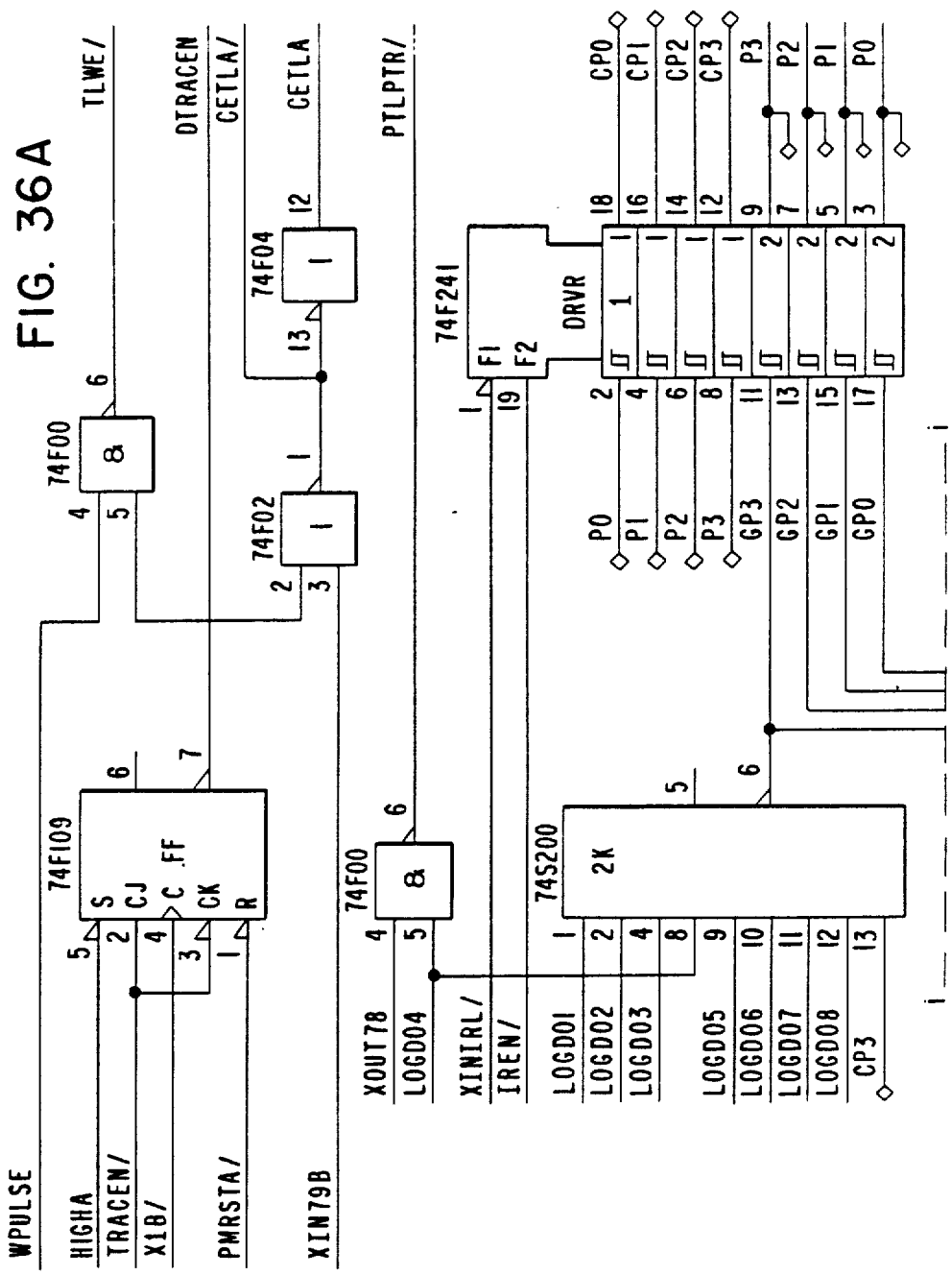
FIGS. 36A and 36B, when joined along line i—i, form a schematic diagram of another portion of the control circuitry of the virutal command rollback module.
Figures 36B, 37:
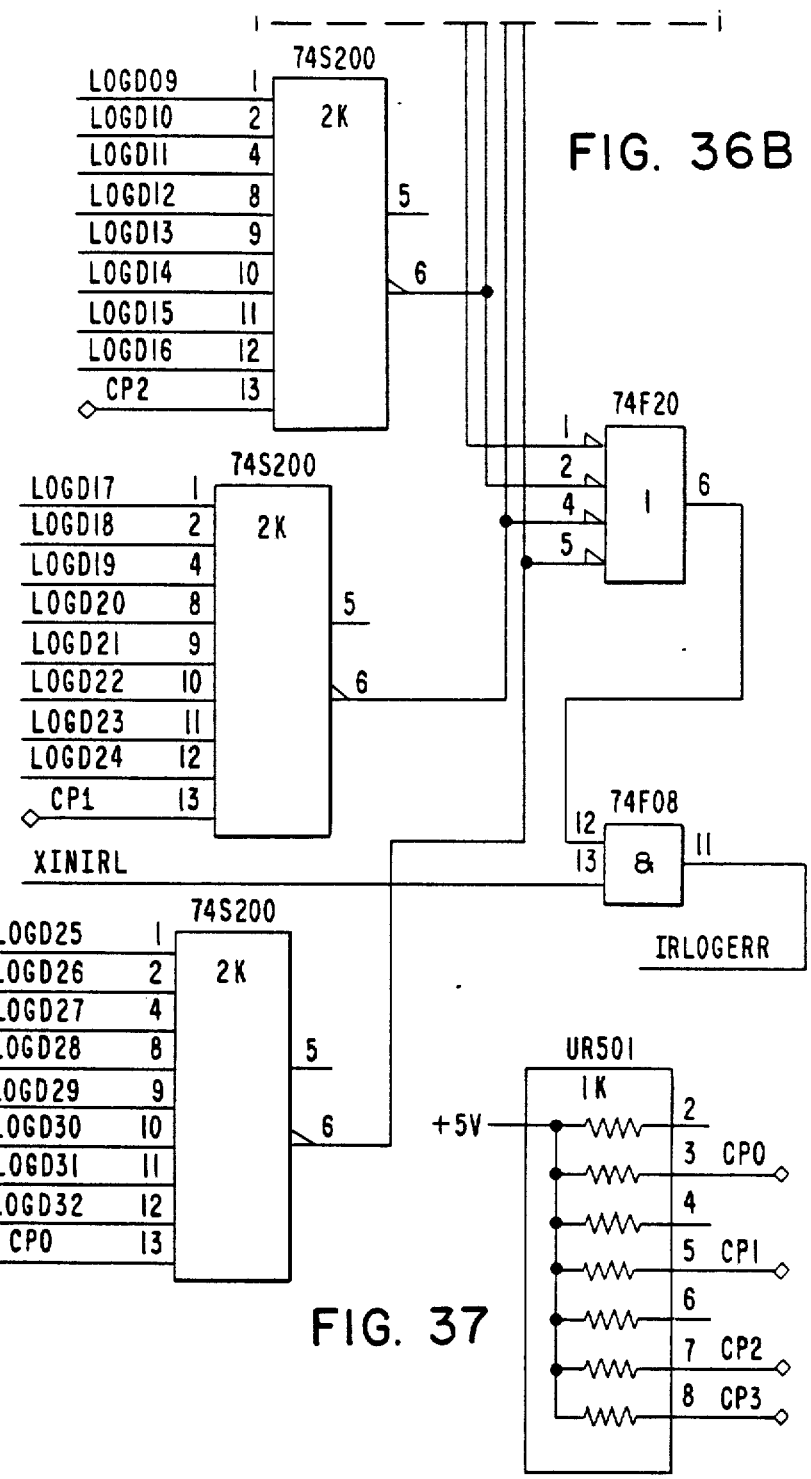
FIG. 37 is a resistor array of the control circuitry of the virtual command rollback module.

FIGS. 28A and 28B, joined along line f—f, is a schematic diagram of a decoder circuit for decoding an address on the PAD address bus 54, of FIGS. 1A and 1B. The circuit of FIG. 28B determines if the index registers should be stored in IR log from the CPDAT bus 52, or if the index registers should be placed on the CPDAT bus 52 for transfer to the IRU 74 of the NAC 36 (see FIG. 3). If it is determined that the index register is to be stored in the IR log, the IRSTORE/ signal is "0", and a multiplexer 300 of FIG. 28 A multiplexes the CPAD03/-CPAD06/ signals (the index register number) from the PAD bus 56 as the IRA1-IRA4 address signals. If the index registers in the IR log are to be placed on the CPDAT bus 52, the IRSTORE/ signal is a "1", and a counter 302 of FIG. 28A supplies an address to the multiplexer 300 to be multiplexed as the address IRA1-IRA4 to the IR log RAM's of FIGS. 31-35. A pair of decoders 304 and 306 decode the address IRA1-IRA4 to a single bit DEC1-DEC15 dependent on the numeric value of the IRA1-IRA4 address. FIGS. 30A and 30B, joined along line h—h, and FIGS. 29A and 29B, joined along line g—g, together form a schematic diagram of a pair of columns of flip/flops, the first column having modified bit (MB01-MB15) outputs, and the second column having valid bit (VB01-VB15) outputs. During rollback, the valid bit flip/flop, for instance flip/flop 308 of FIG. 30A for register 1, will indicate which of the two index registers stored in the RAM chips 31-35 for index register 1 is the original or valid register to be placed on the PBDAT bus 52. This is done by the action of a multiplexer 312 of FIG. 30A, and a multiplexer 314 of FIG. 29A, which together select the proper valid bit for the addressed register and uses this valid bit to form IRA0 through the exclusive OR gate 316 of FIG. 30B. If the output of the flip/flop 308 is "0", the first of the two index registers at the address formed by IRA1-IRA4 in the IR log will be used, and if the output of the flip/flop 308 is "1", the second will be used.

The modified bit of a flip/flop 310 of FIG. 30A for register 1 indicates whether the index register 1 has been modified during the current virtual command execution, "0" for "no" and "1" for "yes". At the successful completion of the virtual command execution, all valid bits having a turned on modified bit are toggled (thus making their modified index registers the new original registers) and their modified bits turned off.

The operation of the index register log and its control circuitry of FIGS. 28A-35 will now be described. At power-up of the system of FIGS. 1A and 1B, the PMRSTB/ signal of FIG. 30A and the PMRSTC/ signal of FIG. 29A is enabled responsive to the PMRST/ signal (see FIG. 9). The PMRSTB/ and PMRSTC/ signals reset the valid bit flip/flops (for example flip/flop 308) of FIGS. 30A-30B and FIGS. 29A-29B, respectively. When the valid bit flip/flops are reset, their noninverted outputs (VB01-VB15) are low. At the beginning of each command sequence, the INTILOG1 and VBCLK1 signals of FIGS. 30A and 30B, respectively, and the INITLOG2 and VBCLK2 signals of FIGS. 29A and 29B, respectively, are pulsed (see the timing circuit of FIG. 13B). The CJ terminals of the modified bit flip/flops (for instance flip/flop 310 of FIG. 30A) is connected to the INTILOG1 or INITLOG 2 signals. When the INITLOG1 and INITLOG2 signals are pulsed at the beginning of a command sequence, the modified bit flip/flops are set with their inverted outputs (MB01-MB15) low and their non-inverted outputs high.

During a command sequence when the index registers may be modified, the IRSTORE1 signal (see FIG. 28B) is low or "0". As previously explained, this causes the index register number bits (CPAD03/-CPAD06/) to be multiplexed by multiplexer 300 of FIG. 28A to the decoders 304 and 306. The corresponding modified bit flip/flop of FIGS. 29A-30B is then selected by one of the decoded bits DEC1/-DEC15/, which are normally low. When selected by the decoders 304 and 306, the selected decoded bit goes high. The S and R terminals of the modified bit flip/flops are tied high, their CJ terminals are connected to the INITLOG1 or INITLOG2 signals, as previously explained, their clock or C terminals are connected to an X0 signal (X0A of FIGS. 29A-29B, and X0C of FIGS. 30A-30B), and their CK terminals are connected to one of the decoded bits DEC1/-DEC15/. Thus, when a modified bit flip/flop is selected by its DEC1/-DEC15/ bit, all of the input terminals of that modified bit flip/flop are high. At X0, the selected modified bit flip/flop will be reset such that its inverted output will be high and its non-inverted output will be low.

The S and R terminals of the valid bit flip/flops of FIGS. 29A-30B (see flip/flop 308 of FIG. 30A) are tied high, their CJ terminals are connected to the inverted outputs (MB01-MB15) of their corresponding modified bit flip/flops, their CK terminals are connected to the non-inverted outputs of their corresponding modified bit flip/flops, and their clock or C terminals are connected to either the VBCLK1 (see FIG. 30A) or the VBCLK2 (see FIG. 29A) signals. Thus, at the beginning of a command sequence, those valid bit flip/flops having modified bits MB01-MB15 at their CJ terminals which are turned on or high, will be toggled at the receipt of the VBCLK1 or VBCLK2 pulses since their S, R and CJ terminals will be high, and their CK terminals will be low. Also, at the beginning of a command sequence, the pulses of the INITLOG1 and INITLOG2 signals will toggle those modified bit flip/flops which had their modified bits MB01-MB15 turned on in the previous command execution, such that all of the MB01-MB15 signals are again low.

During either a read sequence to read data from the RAM chips of FIGS. 31-35, or a write sequence to write data to the RAM chips, the multiplexers 312 of FIG. 30A and 314 of FIG. 29A act as decoders to decode the condition of the valid bits VB01-VB15 of the valid bit flip/flops of FIGS. 29A-30B. The decoder circuit of FIGS. 28A-28B includes an input/output control generating the IRSTORE/ signal for controlling the input and output of data to and from the RAM chips of FIGS. 31-35, as previously discussed. During a read sequence caused by a rollback, the address bits IRA1-IRA4 are supplied by the counter 302 through the multiplexer 300 of FIG. 28A, and the original index register data is read from the proper register of the RAM chips of FIGS. 31-35, as indicated by the address bits IRA1-IRA4, and the signal IRA0 derived from the corresponding valid bit VB01-VB15. The original index register data is then placed on the PM bus 28 of FIG. 2, to be used by the CPC 22 and firmware to roll back the command to the state at the beginning of the failed command, to be explained.

Figure 38A:
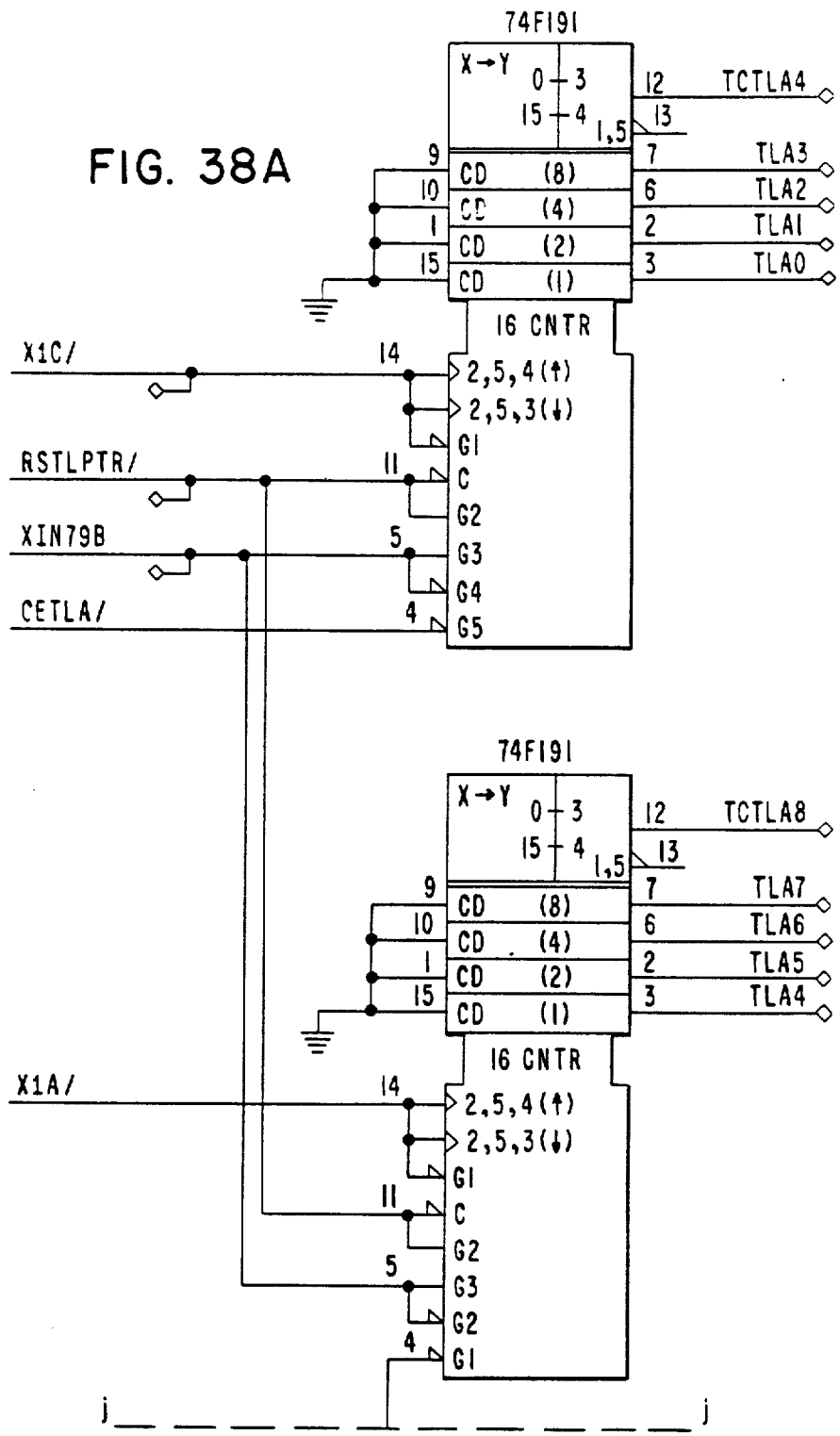
FIGS. 38A and 38B, when joined along line j—j, form a schematic diagram of a counter of a trace log of the virtual command rollback module.
Figure 38B:
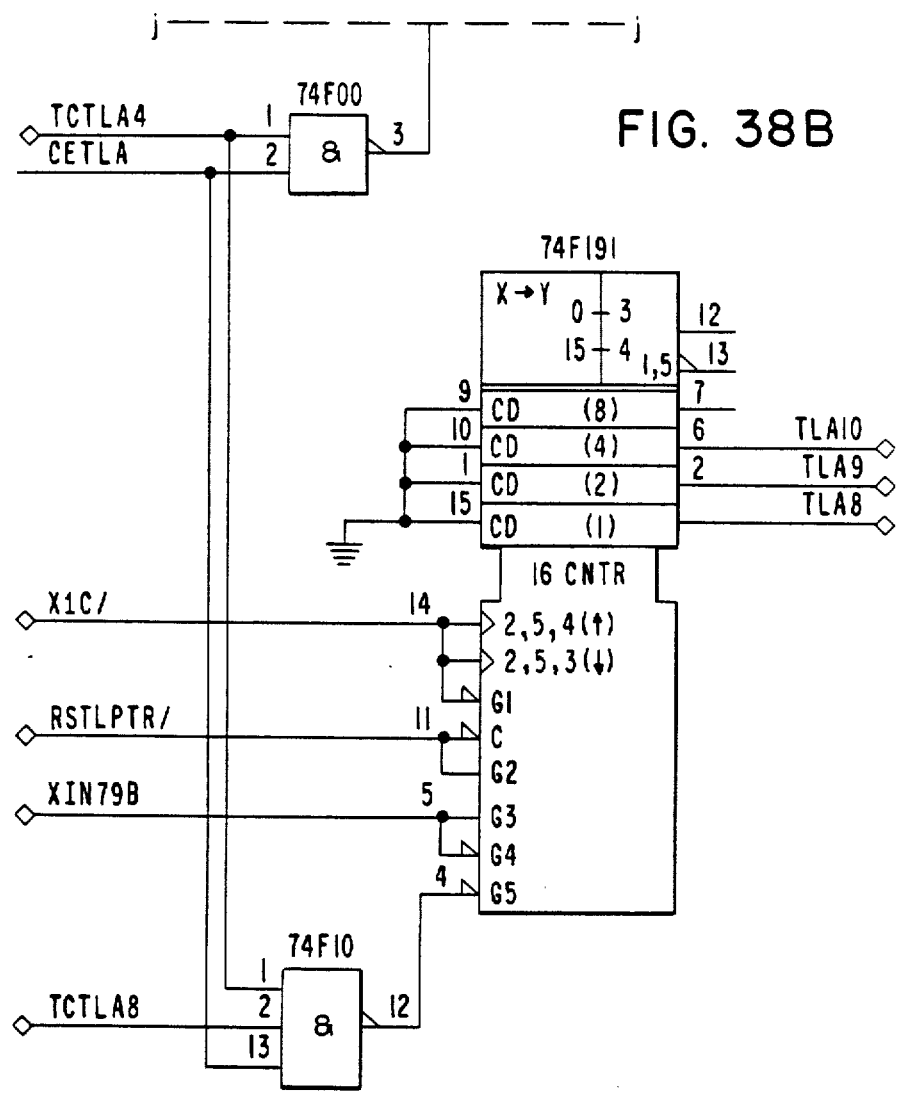
Figure 39:
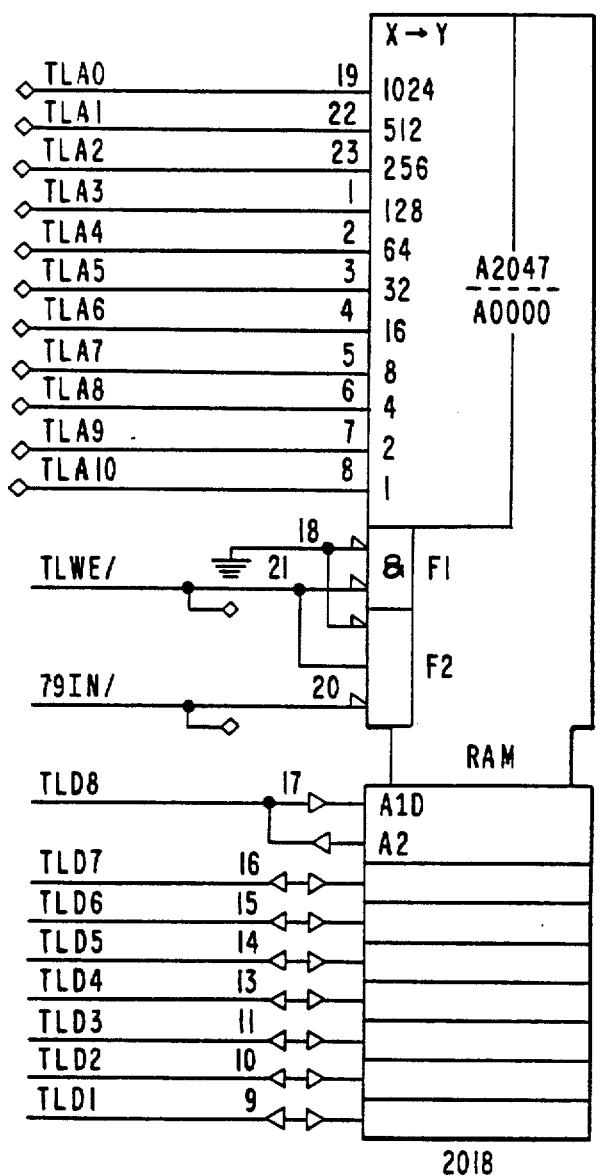
FIG. 39 is a schematic diagram of a portion of the memory of the trace log of the virtual command rollback module.
Figure 40:
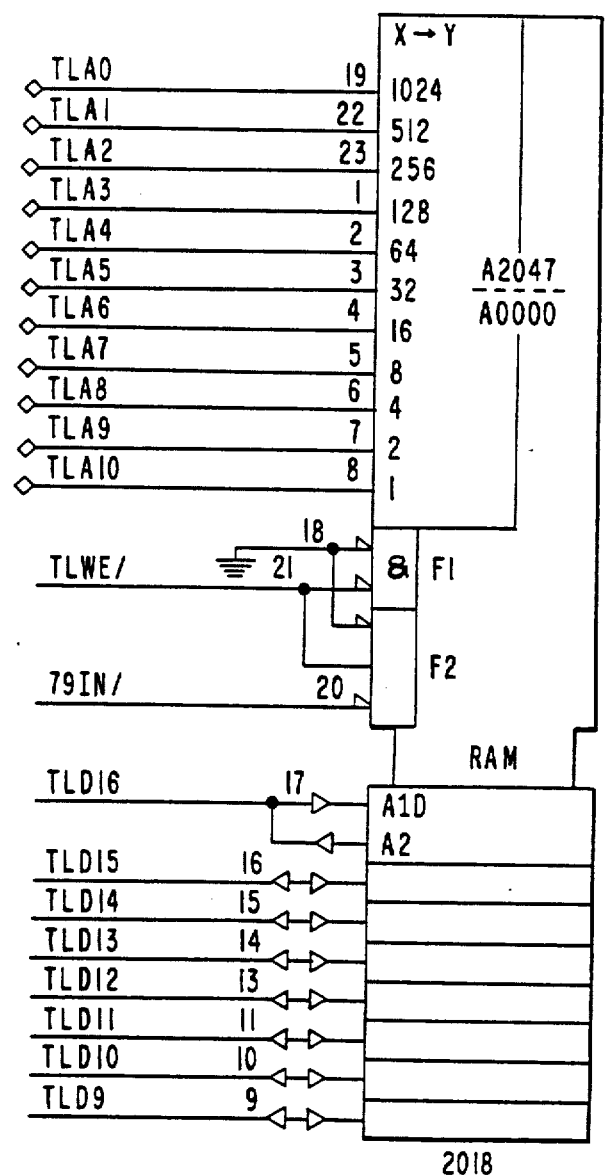
FIG. 40 is a scehmatic diagram of another portion of the memory of FIG. 39.
Figure 41A:
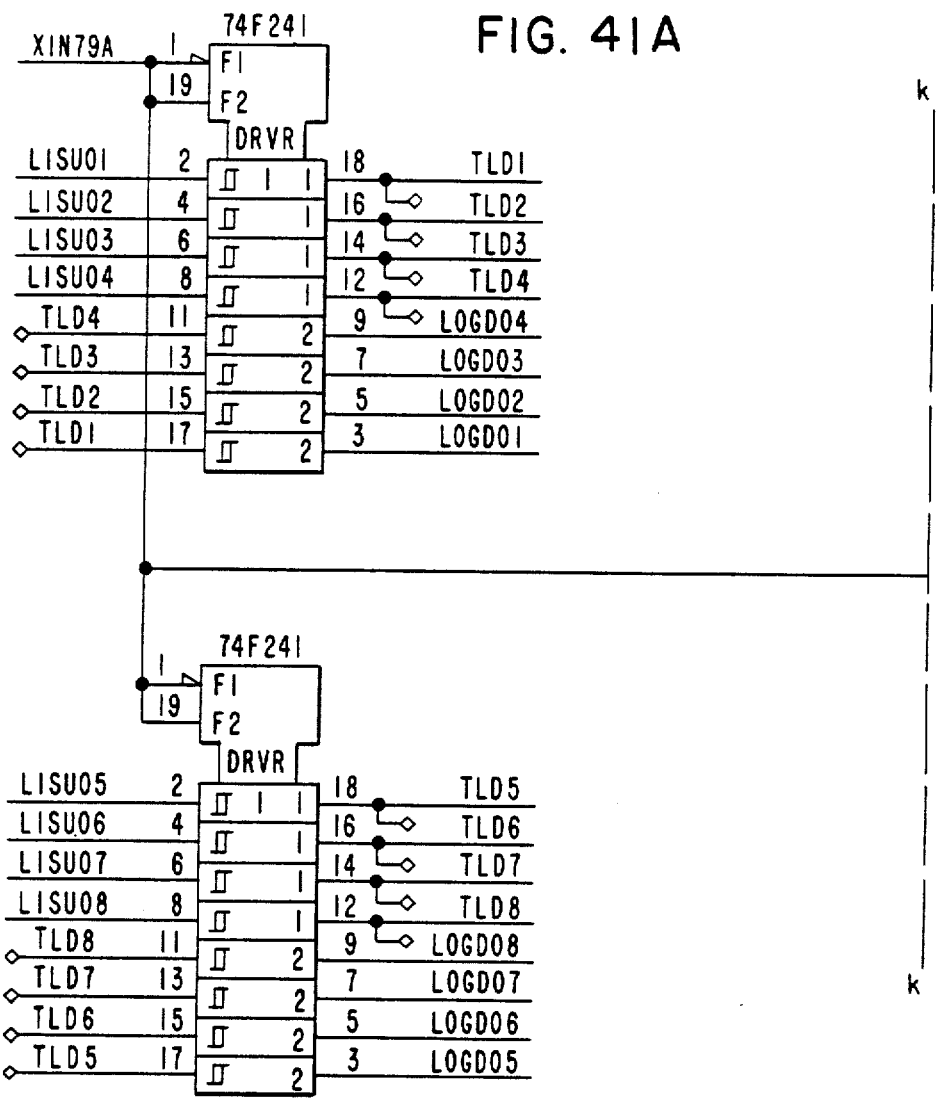
FIGS. 41A and 41B, when joined at line k—k, form a schematic diagram of a driver of the trace log of the virtual command rollback module.
Figure 41B:
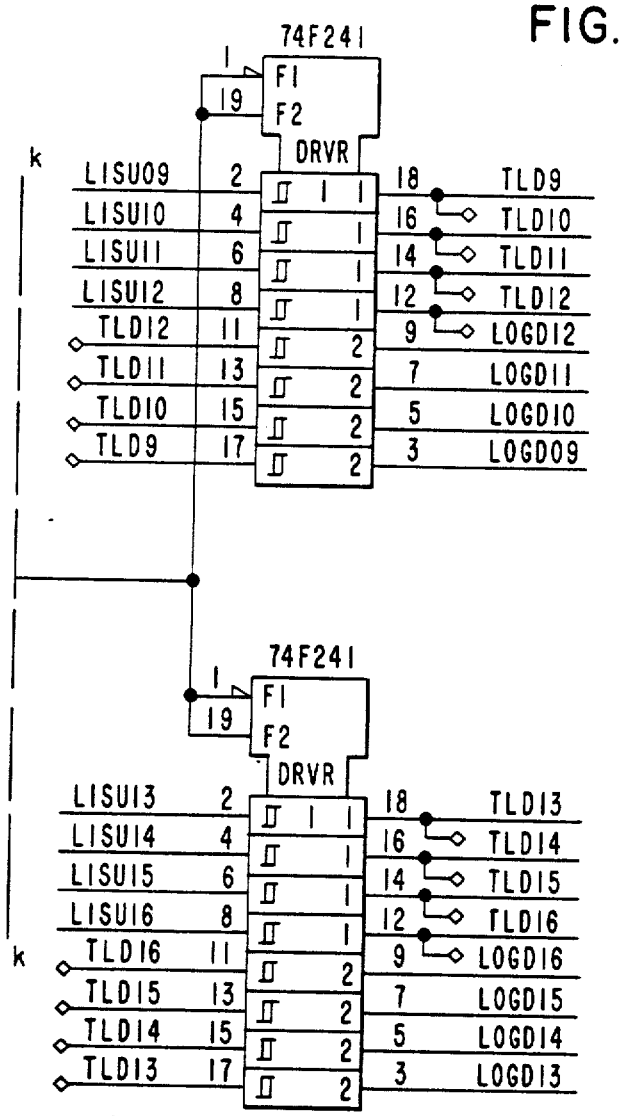

FIGS. 39 and 40 are schematic diagrams of RAM chips for storing the trace log, previously discussed. FIGS. 38A and 38B joined along line j—j is a schematic diagram of a counter for forming the trace log adress (TLA0-TLA10), and FIGS. 41A and 41B, joined along line k—k, is a schematic diagram for an input buffer from the LISU bus extension 75 to the VCRM 64 (see FIGS. 1A and 1B) for the trace log.

The control signals for the VCRM module 64 are as follows

| Signal | FIG. | Description |
|---|---|---|
| Input Signals to the VCRM 64 | | |
| PMRST/ | 9 | Processor memory reset (power-up). |
| CPPVTL/ | 9 | Processor virtual transfer over PM, bus 50 FIGS. 1A and 1B. |
| 78OUT/ | 9 | Send control register bits to the VCRM. |
| 78IN/ | 9 | Interrogate the status register. |
| CPMEMDIE/ | 9 | Signal from the memory subsystem 14 of FIGS. 1A and 1B saying data will be valid on the next X0. |
| NVCSU/ | 9 | Signal from the NAC 36 of FIGS. 1A and 1B to indicate the start of its interpret stage. |
| CPMAEL/ | 9 | Signal generated by a selected CPC, NAC or ATC chip that has been granted the PM bus to enable the transfer of a real memory message over the PM bus. |
| CPMDEE1 | 9 | Signal asserted by the ATC chip to indicate a double bit error. |
| 79IN/ | 9 | A CPC generated signal to enable reading of the trace log. |
| EBAV | 11 | This signal is sourced by the PM bus control logic to indicate whether the PM bus is available for the next bus cycle. |

-continued

Figure 16A:
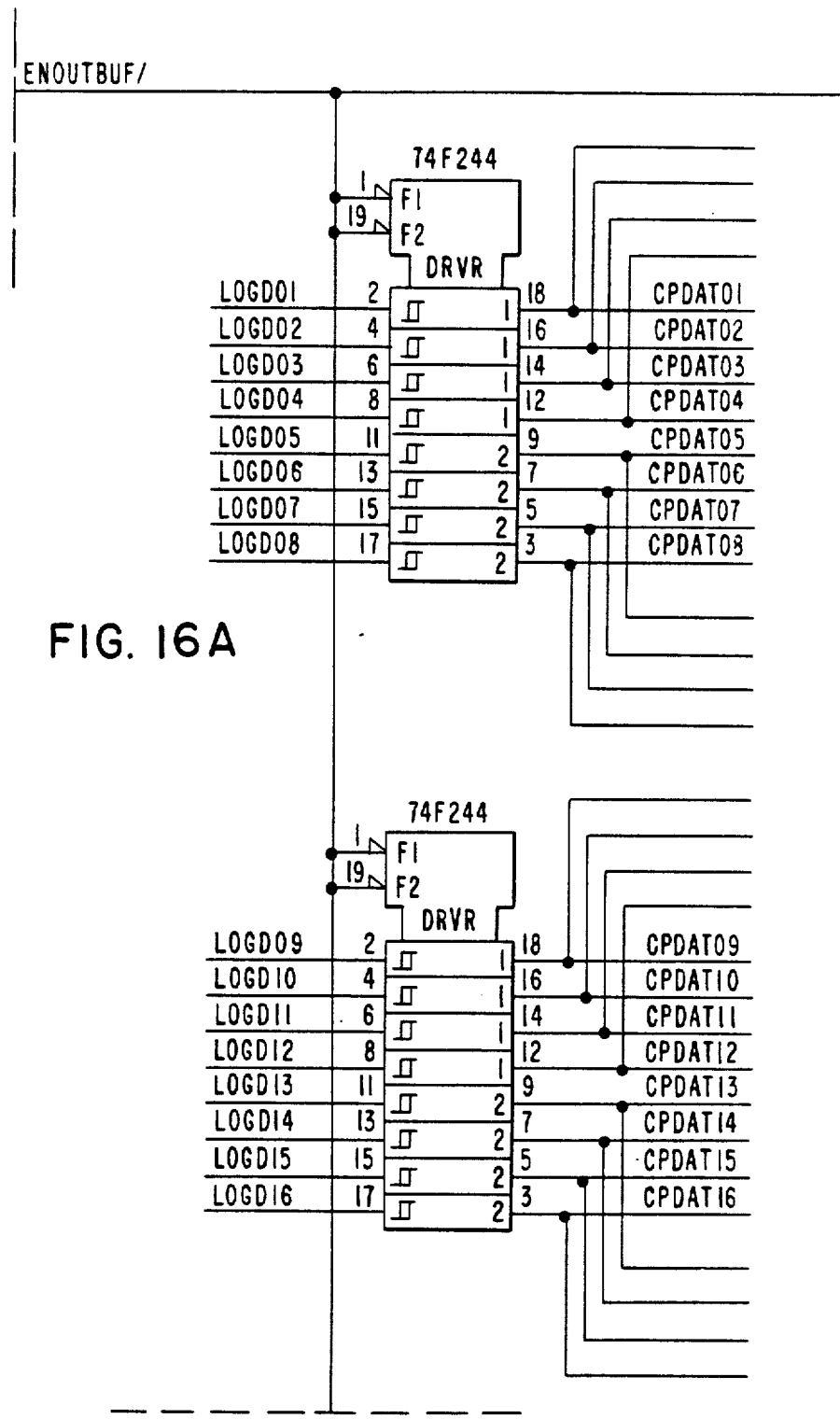
FIG. 16 is a map which shows the relationship of FIGS. 16A, 16B, 16C and 16D, which, when taken together, form a schematic diagram of a data output register of the virtual command rollback module.
Figure 16C:
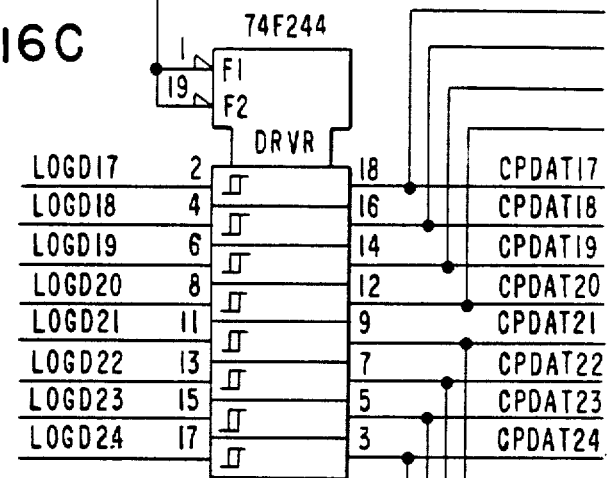
Figure 16D:
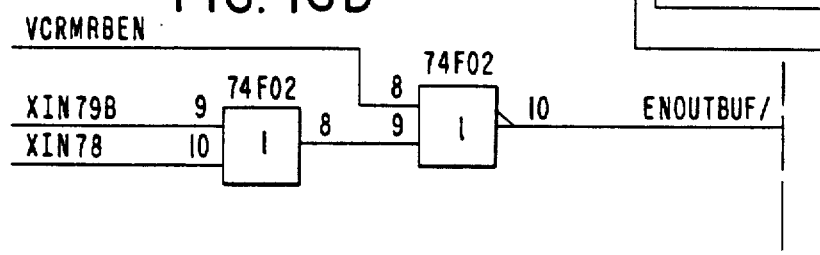
Figure 17:
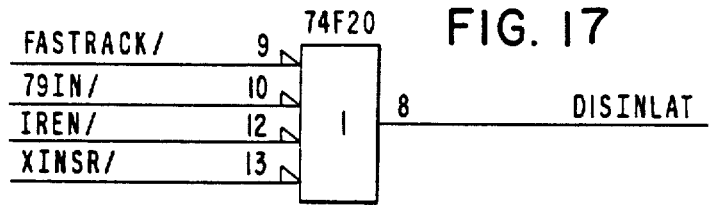
FIG. 17 is a NAND gate which is a part of the control circuitry of the virtual command rollback module.
Figure 16:
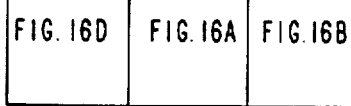

| Signal | FIG. | Description |
|---|---|---|
| DNM/ | 12B | A signal from the ATC to indicate that a DAT no match has occurred in in the virtual-to-real translation. |
| CPDINMINT/ | 12B | An interrupt signal for the DINM module 46 to indicate a miscompare has occurred. |
| TRACEN/ | 36A | A user generated signal from the SDFM module 78 to enable the trace log. |
| Output signals from the VCRM 64 | | |
| VCRMINT/ | 12B | A interrupt signal from the VCRM module 64 indicating the fetch log is full or that a parity error exists. |
| VCRMREN/ | 9 | A read enable signal from the VCRM module 64 indicating the output buffer of FIGS. 16A–16C is enabled. |

The PMRST/, CDPVTL/, CPMEMDIE, CPMAEL, CPMDEE, AND BEAV signals are fully explained in the aforementioned NCR/32 General Information publication under the signal names PMRST/, PVT/, DIE/, MAE/, MDEE/ and BAV signals, respectively.

The bits of the control register (XOUT78) input to the VCRM module 64 are as follows:

| Bit | Signal | FIG. | Description |
|---|---|---|---|
| 1 | LOGD01 | 12A | Enables the fetch log. |
| 2 | LOGD02 | 12B | Enables logging of CPC fetches. |
| 3 | LOGD03 | 13A | Enables VCRM logic for rollback. |
| 4 | LOGD04 | 36A | Reset trace log pointer to zero. |
| 5 | LOGD05 | 27 | Enables firmware to read the index register in XIN78. if this bit is not set, XIN78 reads VCRM status. Also, resets the IR log pointer to zero. |
| 6–8 | | | not used. |
| 9 | LOGD09 | 12A | Resets VCRM enable. |
| 10 | LOGD10 | 12B | Resets fetch log. |
| 11 | | | not used. |
| 12 | LOGD12 | 13C | Resets IR log parity failure. |
| 13 | LOGD13 | 27 | Resets IR log. |
| 14 | LOGD14 | 12B | Resets VCRM-full indicator. |
| 15 | LOGD15 | 13B | Resets fetch log pointer |

The bits of the status register (XIN78) are as follows:

| Bit | Signal | FIG. | Description |
|---|---|---|---|
| 1 | VCRMEN | 13A | Indicates VCRM is enabled. |
| 2 | LE | 13A | Indicates CPC is enabled for fetch logging. |
| 3 | RB | 13A | Indicates hardware is in rollback mode. |
| 4 | IRLPFAIL | 13A | Indicates interrupt due to a parity error while reading index register out of old copy. |
| 5 | VCRMFULL | 13A | Indicates interrupt due to a full log. |
| 6 | CPCMEMOP | 13A | Signals that the last memory operation was from the CPC. |
| 7 | DTRACEN | 13C | Indicates that the trace log has been enabled by the control register bit 4, and that no DINM trap has occurred. |
| 8 | XINIREN | 13C | Indicates that the control register bit has enabled transferring in of the index registers. |
| 9–19 | ALPTR0–ALPTR9 ALPTR10 | 13A 13C | Eleven fetch log address bits to indicate the number of entries in the fetch log. |

Figure 42:
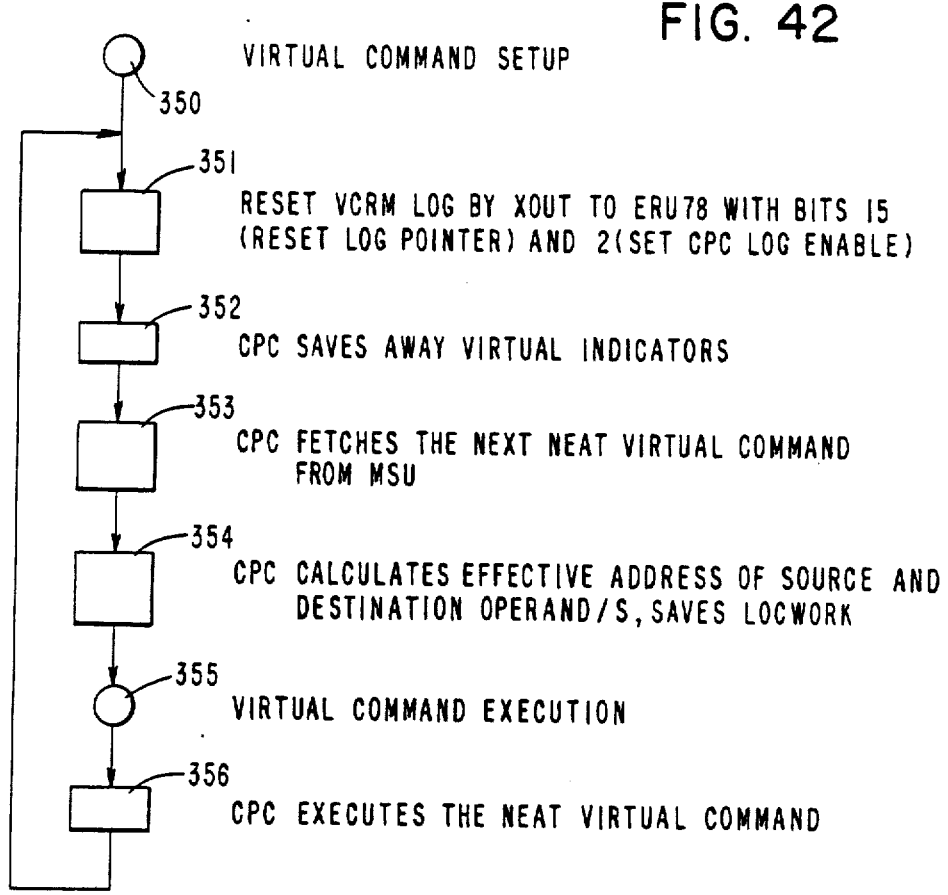
FIG. 42 is a flow chart for programming for a central processor chip of FIG. 2 to set up and emulate a virtual command.

FIG. 42 is a flow chart for programming for the CPC 22 of FIG. 2 for the CPC 22 to set up and execute a NEAT command when no NAC 36 is present or that the executed NEAT command is not supported by the NAC 36. The NEAT command to be emulated by the CPC are fully set out in a NEATVS manual available from the NCR Corporation, Dayton, Ohio 45479 under stock number 57-9481-47, and a NEATVS, VRX-3 manual available from the NCR Corporation under stock number ST-9481-46. This is done in a two step process, a virtual command setup starting at 350, and virtual command execution starting at 355. At 351, the CPC 22 resets the VCRM logs by signals to the command register XOUT78 in the VCRM, as explained, and also enables bit 15 to reset the fetch log pointer and bit 2 to enable the fetch log. At 352, the CPC 22 saves virtual indicators from ERU 17 (not shown) as may be needed by the CPC during its set up stage in the event of a rollback. At 353, the CPC fetches the next NEAT virtual command to be emulated from the main storage unit (MSU) made up of memory arrays 100 of FIGS. 1A and 1B of the memory subsystem 14. At 354 the CPC calculates the effective address of source and destination operands by decoding the type of NEAT instruction, by fetching the contents of operand index registers, and by adding the operand partial addresses to the index register contents, all of the above is explained in the aforementioned NEATVS manuals. Also, the CPC saves the variable LOCWORK in a convenient work register (not shown), which is the contents of the CPC's virtual control register (VCR) (not shown) and indicates the next virtual command to be fetched. The variable LOCWORK is used later in a rollback operation, to be explained in connection with FIGS. 44A and 44B.

At 355, the CPC starts to execute the virtual command. This is done at 356 by accessing the WCSM modules 35 and 36 to fetch from the ISU the proper microinstructions to emulate the NEAT command.

Figure 43:
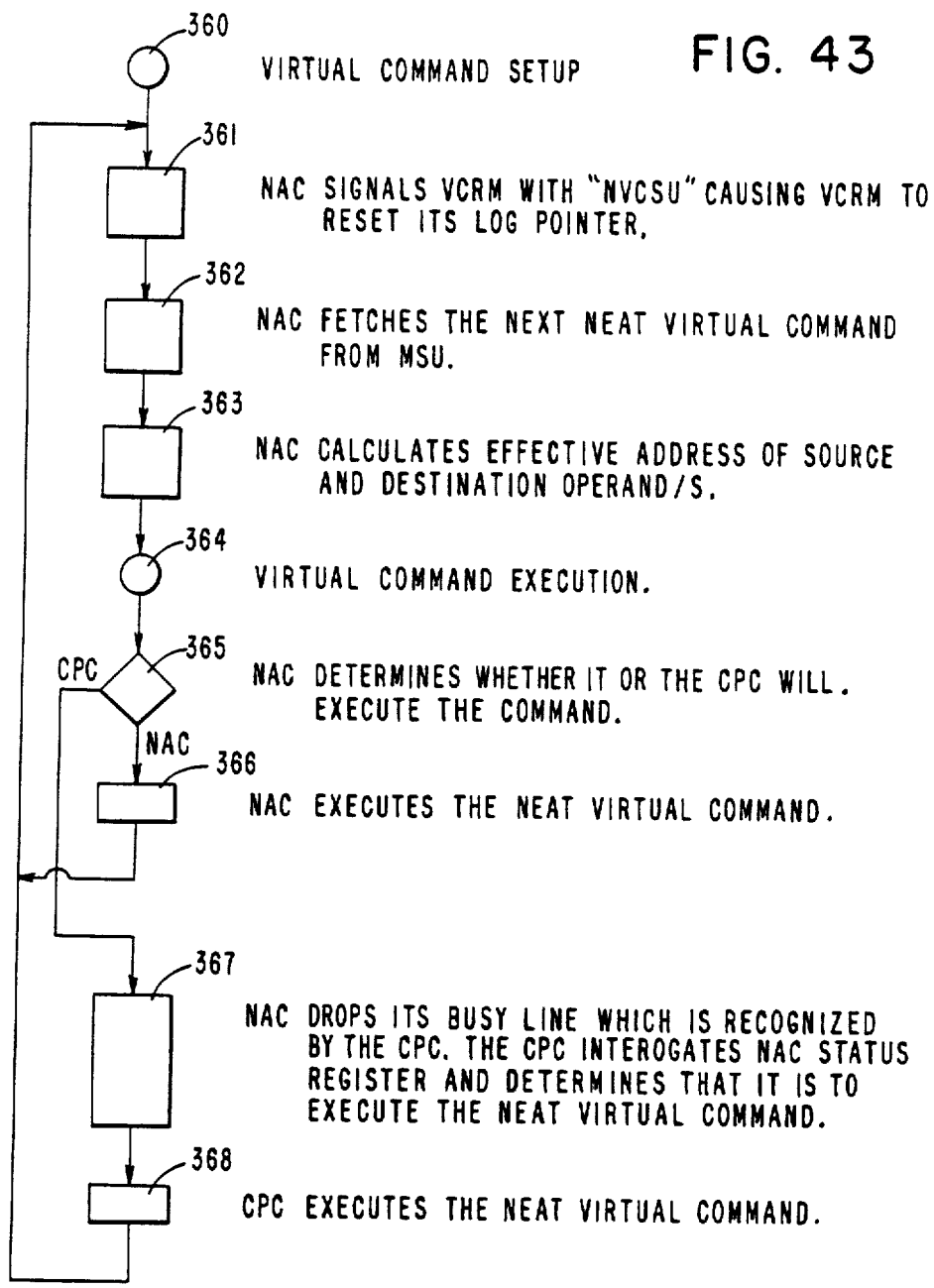
FIG. 43 is a flow chart for programming for a NEAT assist chip of FIG. 2 to set up and emulate a virtual command.

FIG. 43 is a flow chart for programming of the NAC 36 of FIG. 2 in order to set up and execute a NEAT virtual command. The NEAT virtual command set up starts at 360, and at 361 the NAC 36 signals the VCRM module 64 of FIGS. 1A and 1B by a NVCSU signal (see FIG. 2, line 37), to reset the log pointers in the VCRM. At 362, the NAC 36 fetches the next NEAT virtual command from the MSU of the memory subsection 14. At 363, the NAC 36 calculates the effective address of the source and destination operands similar to that discussed in connection with block 354 of FIG. 42. At 364, the virtual command execution phase starts. At 365, the NAC 36 determines whether the NAC supports the particular command to be emulated. If the NAC supports the NEAT command to be emulated, the microinstructions to emulate the NEAT command is fetched from the NAC ROM 70 (see FIG. 3), and the NEAT virtual command is implemented at 366.

If the NAC does not support the particular NEAT instruction to be emulated, the NAC drops its busy line (not shown) at 367. The CPC recognizes the drop, and interrogates the NAC status in the SSR1 of the state stack 182 of FIG. 3 to determine that it is to execute the NEAT virtual command, and gets a copy of the NEAT virtual command from bits 32–35 of SSR1. At 368, the CPC 22 executes the NEAT virtual command as discussed in connection with block 356 of FIG. 42.

Figure 44B:
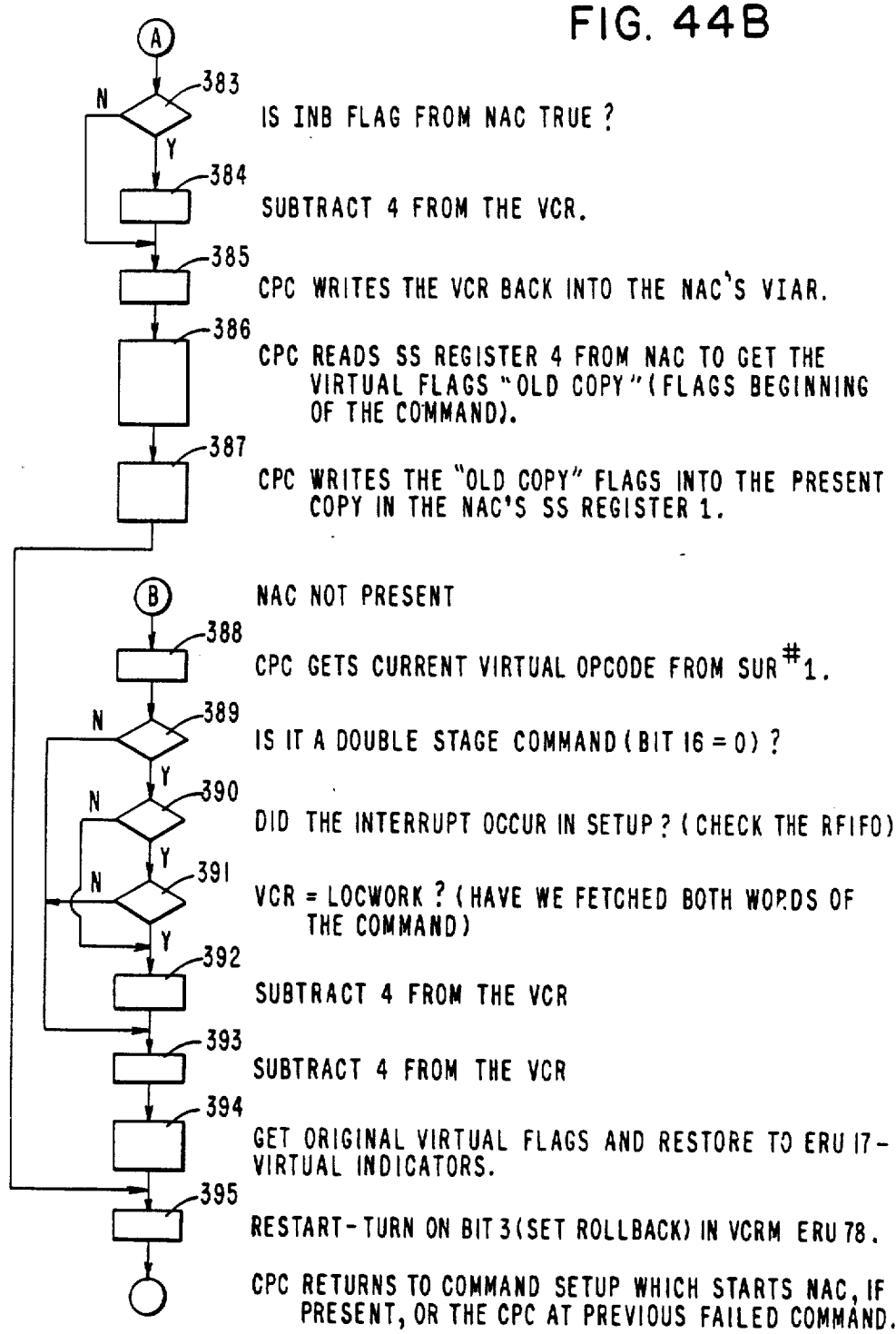

FIGS. 44A and 44B, when joined at connectors A and B, form a flow chart for programming of the CPC 22 and NAC 36 of FIG. 2, for effecting a rollback operation. In the event of an interrupt, block 370, the CPC 22 starts the execution of an interrupt routine. At 371, the CPC 22 turns off the log enable (LE) flag in the VCRM module 64 through its control register by turning off bit 10 with an XOUT78 signal. At 372, the CPC 22 vectors to various service routines, as indicated by the interrupt bits of the ERU 175 of the DINM module 46 (see FIG. 5). If the interrupt is from the DIMN module 46, the program goes to 373, wherein the firmware determines if a virtual command rollback using the VCRM module 64 should be invoked. If the interrupt is one which requires a virtual command rollback, the program goes to block 374 wherein the CPU 22 determines if a NAC 36 is present in the system. At 376, for a system wherein a NAC 36 is present, the CPC 22 sets bit 5 of the control register ERU (XOUT78) to set the virtual IR log address to zero. The CPC 22, at 377, then reads the first entry in the IR log of the VCRM 64 through the status register (XIN78). At 378, the CPC 22 writes the first IR log entry into the index register unit 74 (see FIG. 3) of the NAC 36, as previously discussed. The address is then incremented by 4 to address the next index register entry in the IR log of the VCRM 64. At 379, a test is made to see if the address is over 40H, which indicates if all 15 index registers have been read from the IR log. If not, the program returns to block 377 to get the next IR log entry.

When all index registers are thus restored to the NAC 36, the CPC 22, at 380, sets bit 13 in the control register XOUT78, to reset the IR log.

At 381, the CPC 22 reads the state stack register two (SSR2) of the NAC 36 to get the INB flag. If the INB flag is true, this indicates that the NEAT command being emulated at the time of the interrupt was in the set-up stage of the second word of a two word command.

The contents of the VIAR register 180 of FIG. 3, which contains the virtual address of the next command to be fetched by the NAC, and the virtual control register of the CPC 22, previously discussed, must be placed back in their initial condition. This is done in block 382 wherein the CPC 22 places the content of the NAC VIAR register 180 in the CPC's VCR register, and subtracts 4 from its VCR address to arrive at the initial VCR virtual command address. If the INB flag is true at 383, the NAC 36 was in the second word of a two word command when the interrupt occurred, and an additional 4 must be subtracted from the CPC's VCR to get back to the initial VCR address. At 385, FIG. 44B, the CPC 22 writes the VCR address determined in block 382–384, back into the NAC's VIAR register 180. At 385, the CPC 22 reads SSR4 of the state stack 182 of FIG. 3 to obtain the old copy of the virtual indicator flags. At 387, the old copy flags are written into the present copy in SSR1 to return the virtual indicators in SSR1 to their original, unmodified state. The CPC 22 and NAC 36 are now restored to their initial conditions. The program then goes to 395, wherein bit 3 of the control register of the VCRM module 64 is turned on, and rollback is started.

If no NAC 36 is present at 374 (or the NEAT command is not supported by the NAC 36), the program goes to 388 of FIG. 44B, wherein the CPC 22 gets the current virtual opcode from its set up register 1 (SUR1, not shown). At 389, bit 16 of SUR1 is checked to determine if a two word or double stage command was being executed when the interrupt occurred. If not, the program goes to 393. If yes, the restore first-in-first-out stack (RF1F0) (not shown) is checked to determine if the interrupt occurred in setup. If not, the program goes to 392. If the interrupt occurred in setup, the contents of the CPC VCR register is compared with the value of LOCWORK stored at 354 of FIG. 42, to determine if both words of the command were fetched when the interrupt occurred. If not, the program goes to 393. If yes, the second word was fetched, and 4 is subtracted at 392 from the address in the CPC's VCR to get back the first word of the command. At 393, 4 is subtracted in all cases from the address in the CPC's VCR to get back to the initial VCR address. In block 394 the CPC gets the original virtual indicator flags stored in block 352 of FIG. 42, and restores them to ERU 17 (not shown) as the original virtual indicators, and the rollback is started at block 395, as previously discussed. The virtual indicators of ERU 17, the VCR, the SUR1 and the RFIFO of the NCR 32 bit CPC 22 are fully explained in the aforementioned NCR/32 General Information publication, and are well understood.

Thus, a data processing system has been described which provides the aforementioned objects. It will be understood by those skilled in the art that the disclosed embodiment is exemplary only, and that the various elements disclosed may be replaced by equivalents without departing from the invention hereof, which equivalents are intended to be covered by the appended claims.

What is claimed is:

1. A circuit comprising:
   a multi-stage instruction pipeline having an execute stage of a current instruction partially overlap an interpret stage of the next instruction;
   a plurality of modifiable data registers connected and responsive to said pipeline, each of said data registers being modifiable such that its contents can be restored to an original state;
   a plurality of memory locations, each of said memory locations corresponding to a modifiable data register and having two data storage means, a first data storage means for storing the contents of each corresponding data register of each respective memory location in the original state thereof, and a second data storage means for storing the contents of corresponding data register of each respective memory location in a modified state thereof;
   a plurality of modified bit register means, one corresponding to each of said memory locations, each of said modified bit register means including means for selectively enabling a modified bit when the contents of the data register of its corresponding memory location in the modified state thereof is stored in one of its corresponding data storage means; and a plurality of valid bit register means, each having an input connected to a corresponding one of said modified bit register means, an output connected to its corresponding memory location, means for containing a valid bit whose condition is indicative of which one of the two data storage means of said corresponding memory location contains the original contents of the corresponding data register, and means for toggling the condition of said valid bit responsive to the enabling of the modified bit of said corresponding modified bit register means during the interpret stage and the execution stage of each multi-stage pipeline system instruction.

2. The circuit of claim 1 wherein each of said modified bit register means includes input means for receiving a control signal for causing previously selected modified bit register means to toggle the condition of its corresponding valid bit register means, thereby causing the condition of the valid bit of said corresponding valid bit register means to toggle such that the indication of which one of the two data storage means of said corresponding memory locations contains the original contents of the corresponding data register is changed from one data storage means to the other.

3. The circuit of claim 2 further comprising:
input/output means connected to each of said valid bit register means for writing data into and for reading data out of each of said plurality of memory locations responsive to the condition of each respective valid bit of each of said valid bit register means.

4. The circuit of claim 3 wherein said input/output means includes decode means for decoding the condition of the respective valid bit of the respective valid bit register means corresponding to a memory location, such that said input/output means writes data to and reads data from the indicated one of said corresponding data storage means responsive to said respective valid bit.

5. The circuit of claim 4 wherein said input/output means includes a counter for sequentially counting the count of said memory locations from which data is to be read, and access means connected to said counter for accessing each of said memory locations responsive to the count of said counter.

6. The circuit of claim 5 wherein said input/output means further includes:
addressable means for receiving an address of one of said memory locations into which data is to be written; and
multiplexer means having a first input connected to said counter, a second input connected to said addressable means, and an output connected to said access means;
said multiplexer means for multiplexing one of said count and said address for accessing one of said memory locations.

7. The circuit of claim 6 wherein said multiplexer means includes a control terminal for receiving a control signal having a first condition when data is to be written into one of said memory locations, and having a second condition when data is to be read from one of said memory locations.

8. The circuit of claim 7 wherein said input/output means further includes:
transmission means for transmitting data between said plurality of memory locations and the modifiable data registers.

9. The circuit of claim 8 further comprising a second decode means connected to the output of said multiplexer means, said second decode means for decoding the output of said multiplexer means and for accessing said plurality of valid bit register means responsive thereto for determining the condition of the valid bit corresponding to the memory location accessed by said accessing means.

* * * * *

UNITED STATES PATENT AND TRADEMARK OFFICE
CERTIFICATE OF CORRECTION

PATENT NO. : 4,805,095
DATED : February 14, 1989
INVENTOR(S) : Rolfe D. Armstrong et al.

It is certified that error appears in the above-identified patent and that said Letters Patent is hereby corrected as shown below:

On the front page, after the word "Inventors:" delete "Rolf" and substitute --Rolfe--.

On the front page, first line after the Abstract, delete "9 Claims, 57 Drawing Sheets" and substitute --9 Claims, 56 Drawing Sheets--.

In the drawings, delete sheet 1 (Fig. 1).

Change sheets 2 through 57 to sheets 1 through 56, respectively.

Signed and Sealed this

Fifth Day of September, 1989

Attest:

DONALD J. QUIGG

*Attesting Officer*       *Commissioner of Patents and Trademarks*